US012669692B2

(12) United States Patent
Fujimura et al.

(10) Patent No.: US 12,669,692 B2
(45) Date of Patent: Jun. 30, 2026

(54) MICROSCOPE SLIDE AND METHOD FOR SELECTING THE SAME

(71) Applicant: Hitachi High-Tech Corporation, Tokyo (JP)

(72) Inventors: Toru Fujimura, Tokyo (JP); Takahito Hashimoto, Tokyo (JP); Shigehiko Kato, Tokyo (JP); Eiko Nakazawa, Tokyo (JP); Masahiko Ajima, Tokyo (JP); Akira Sawaguchi, Miyazaki (JP)

(73) Assignee: Hitachi High-Tech Corporation, Tokyo (JP)

( * ) Notice: Subject to any disclaimer, the term of this patent is extended or adjusted under 35 U.S.C. 154(b) by 1097 days.

(21) Appl. No.: 17/766,962

(22) PCT Filed: Oct. 16, 2019

(86) PCT No.: PCT/JP2019/040686
§ 371 (c)(1),
(2) Date: Apr. 6, 2022

(87) PCT Pub. No.: WO2021/075000
PCT Pub. Date: Apr. 22, 2021

(65) Prior Publication Data
US 2024/0077712 A1     Mar. 7, 2024

(51) Int. Cl.
*G02B 21/34*        (2006.01)
*G01N 1/30*         (2006.01)

(52) U.S. Cl.
CPC ............... *G02B 21/34* (2013.01); *G01N 1/30* (2013.01); *G01N 2001/302* (2013.01)

(58) Field of Classification Search
CPC ......... G02B 21/34; C03C 15/00; C03C 17/23; C03C 17/30; C03C 2217/231;
(Continued)

(56) References Cited

U.S. PATENT DOCUMENTS 3,498,860 A * 3/1970 Pickett ................... G01N 1/312
                                                    359/396
4,545,831 A * 10/1985 Ornstein .................. G01N 1/28
                                                    435/40.52
(Continued)

FOREIGN PATENT DOCUMENTS

EP        0159603 B1 * 11/1991     .............. G01N 1/30
JP        S50-7451 U     1/1975
(Continued)

OTHER PUBLICATIONS

Restriction Requirement issued in U.S. Appl. No. 17/047,097 dated Sep. 6, 2023 (7 pages).
(Continued)

*Primary Examiner* — Binh X Tran
*Assistant Examiner* — Christopher Remavege
(74) *Attorney, Agent, or Firm* — Crowell & Moring LLP

(57) ABSTRACT
Provided is an efficient method for attaching a tissue section. In the invention, one of problems is solved by changing attachment conditions of the tissue section depending on an organ from which the tissue section is derived. A technique of achieving good adhesiveness between a microscope slide and a section by introducing unevenness on a front surface of the microscope slide using reactive ion etching as one of the attachment conditions is provided. Further, a technique of optimizing the attachment of the section using a machine learning technique or the like is provided.

10 Claims, 30 Drawing Sheets

(58) Field of Classification Search

CPC .......... C03C 2217/76; C03C 2217/948; C03C 2218/32; C03C 2218/119; C03C 17/322; C03C 23/006; G01N 1/28

See application file for complete search history.

(56) References Cited

U.S. PATENT DOCUMENTS

| | | | | |
|---|---|---|---|---|
| 4,705,705 | A * | 11/1987 | Bross | G02B 21/34 428/210 |
| 2004/0214326 | A1* | 10/2004 | Cousins | A61L 15/24 435/395 |
| 2009/0142396 | A1* | 6/2009 | Odar | A61P 43/00 424/484 |
| 2010/0308204 | A1 | 12/2010 | Taniguchi | |
| 2011/0076448 | A1 | 3/2011 | Agarwal et al. | |
| 2013/0052331 | A1* | 2/2013 | Kram | G01N 1/2813 118/100 |
| 2013/0053281 | A1 | 2/2013 | Zarrine-Afsar et al. | |
| 2013/0069272 | A1 | 3/2013 | Ootera et al. | |
| 2013/0280890 | A1 | 10/2013 | Lei et al. | |
| 2014/0202986 | A1 | 7/2014 | Renaldo et al. | |
| 2016/0168021 | A1 | 6/2016 | Goh et al. | |
| 2018/0250670 | A1 | 9/2018 | Le Berre et al. | |
| 2018/0318467 | A1 | 11/2018 | Esplin et al. | |
| 2019/0017908 | A1* | 1/2019 | Pettis | G01N 1/38 |
| 2020/0232891 | A1 | 7/2020 | Sawaguchi et al. | |
| 2020/0394825 | A1* | 12/2020 | Stumpe | G16H 30/40 |
| 2021/0149172 | A1 | 5/2021 | Fujimura | |
| 2022/0138945 | A1* | 5/2022 | Luengo Hendriks | G06V 20/70 382/133 |

FOREIGN PATENT DOCUMENTS

| | | | | | |
|---|---|---|---|---|---|
| JP | S51-98551 | U | 8/1976 | | |
| JP | 10333051 | A | 12/1998 | | |
| JP | 2007-107969 | A | 4/2007 | | |
| JP | 2007-328038 | A | 12/2007 | | |
| JP | 2009-31688 | A | 2/2009 | | |
| JP | 2009-36970 | A | 2/2009 | | |
| JP | 2010-63430 | A | 3/2010 | | |
| JP | 2011-56775 | A | 3/2011 | | |
| JP | 2012-229995 | A | 11/2012 | | |
| JP | 2013-63576 | A | 4/2013 | | |
| JP | 2014-144639 | A | 8/2014 | | |
| JP | 2014-175376 | A | 9/2014 | | |
| JP | 2015-227904 | A | 12/2015 | | |
| JP | 2016-118635 | A | 6/2016 | | |
| JP | 2016-528149 | A | 9/2016 | | |
| JP | 2016-197134 | A | 11/2016 | | |
| JP | 2016-198059 | A | 12/2016 | | |
| WO | WO-0008511 | A1 * | 2/2000 | ............ | G02B 21/34 |
| WO | WO 2016/090407 | A1 | 6/2016 | | |
| WO | WO 2017/042115 | A1 | 3/2017 | | |
| WO | WO 2018/084285 | A1 | 5/2018 | | |
| WO | WO 2019/082293 | A1 | 5/2019 | | |
| WO | WO 2019/202650 | A1 | 10/2019 | | |

OTHER PUBLICATIONS

U.S. Non-Final Office Action issued in U.S. Appl. No. 17/047,097 dated Dec. 20, 2023 (17 pages).

Wikipedia, "Glass " via https://en.wikipedia.org/wiki/Glass (26 pages).

Wikipedia, "Quartz" via https://en.wikipedia.org/wiki/Quartz (20 pages).

U.S. Notice of Allowance issued in U.S. Appl. No. 17/047,097, dated Mar. 29, 2024 (9 pages).

International Search Report (PCT/ISA/210) issued in PCT Application No. PCT/JP2019/040686 dated Dec. 24, 2019 with English translation (eight (8) pages).

Japanese-language Written Opinion (PCT/ISA/237) issued in PCT Application No. PCT/JP2019/040686 dated Dec. 24, 2019 (seven (7) pages).

Sawaguchi, Akira, et al., "Informative three-dimensional survey of cell/tissue architectures in thick paraffin sections by simple low-vacuum scanning electron microscopy", Scientific Reports, May 10, 2018, vol. 8, Article No. 7479.

Fujimura, Toru, et al., "Morphology and photonic band structure modification of polystyrene particle layers by reactive ion etching", Applied Physics Letters, Mar. 2001, vol. 78 No. 11, pp. 1478-1480.

International Search Report (PCT/ISA/210) issued in PCT Application No. PCT/JP2018/015800 dated Jul. 10, 2018 with English translation (four (4) pages).

Japanese-language Written Opinion (PCT/ISA/237) issued in PCT Application No. PCT/JP2018/015800 dated Jul. 10, 2018 (six (6) pages).

Japanese-language Office Action issued in Japanese Application No. 2020-514816 dated Sep. 28, 2021 with English translation (eight (8) pages).

U.S. Appl. No. 17/047,097, filed Oct. 13, 2020.

* cited by examiner

[FIG. 1]
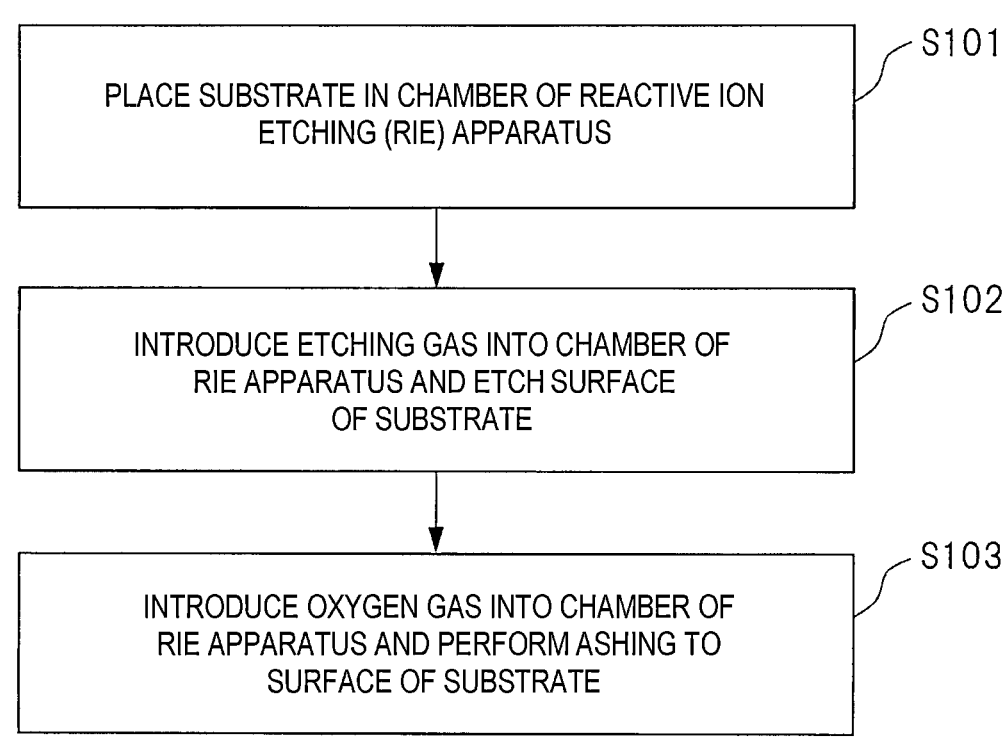
[FIG. 2]
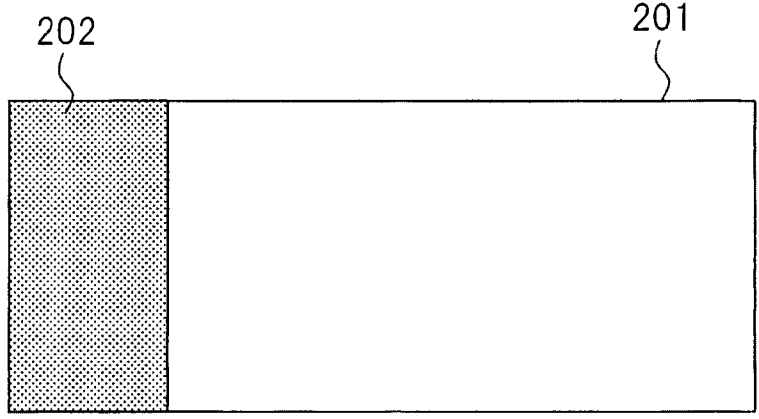

[FIG. 3]
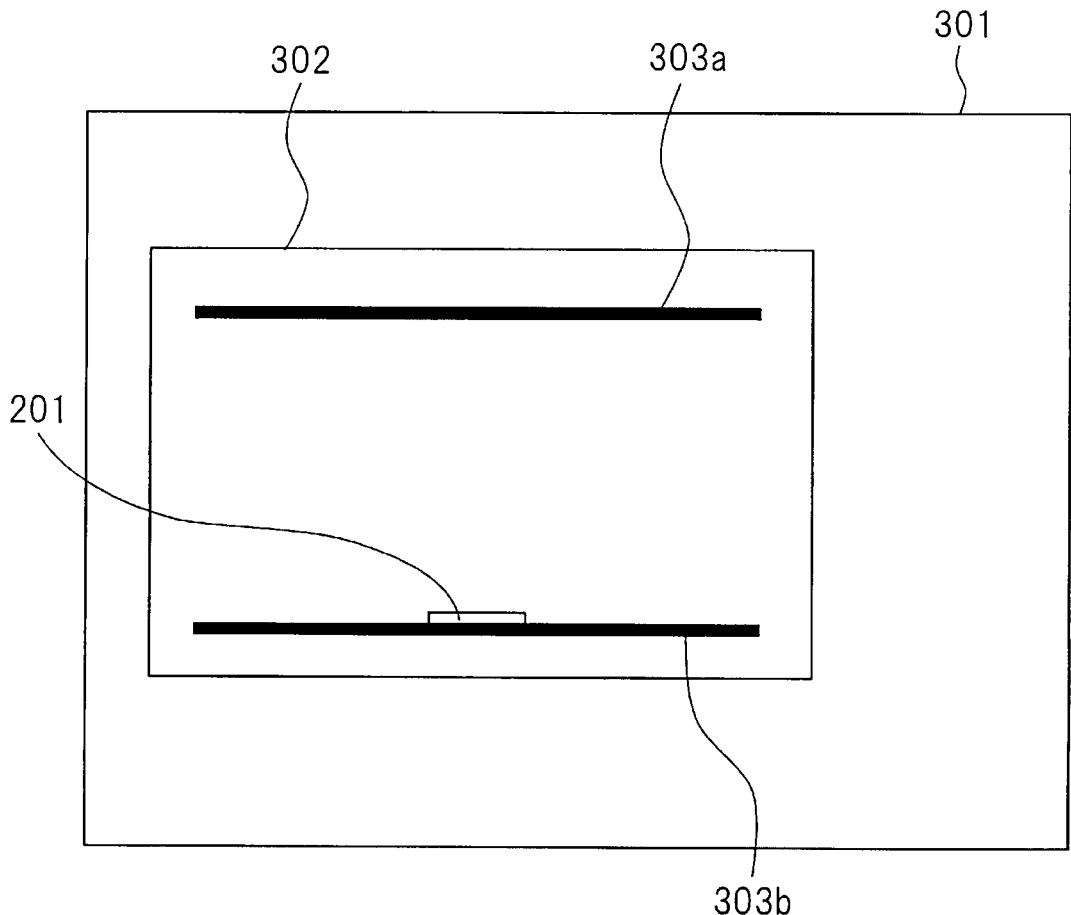
[FIG. 4]
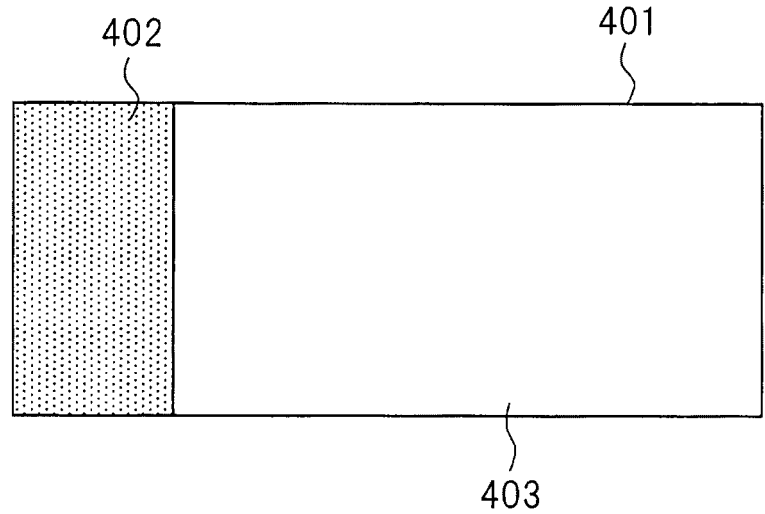

[FIG. 7]
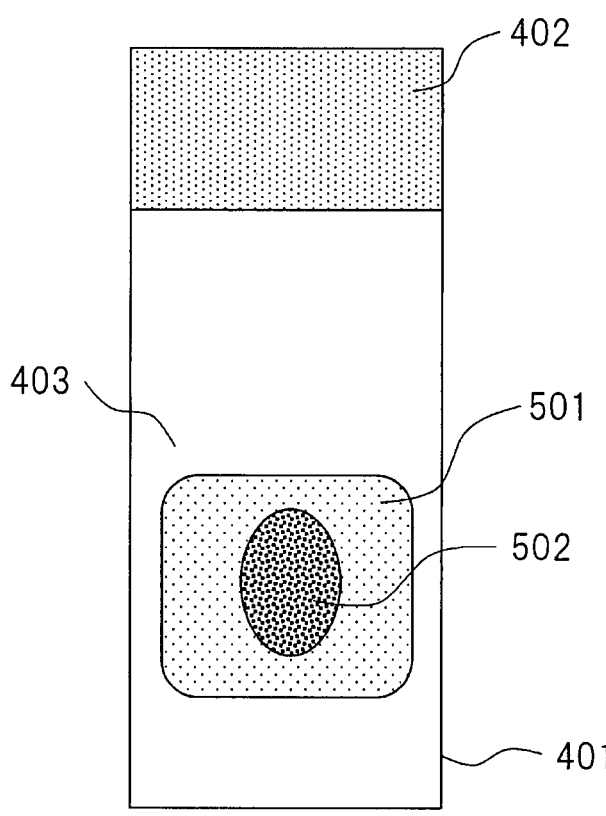

[FIG. 8]
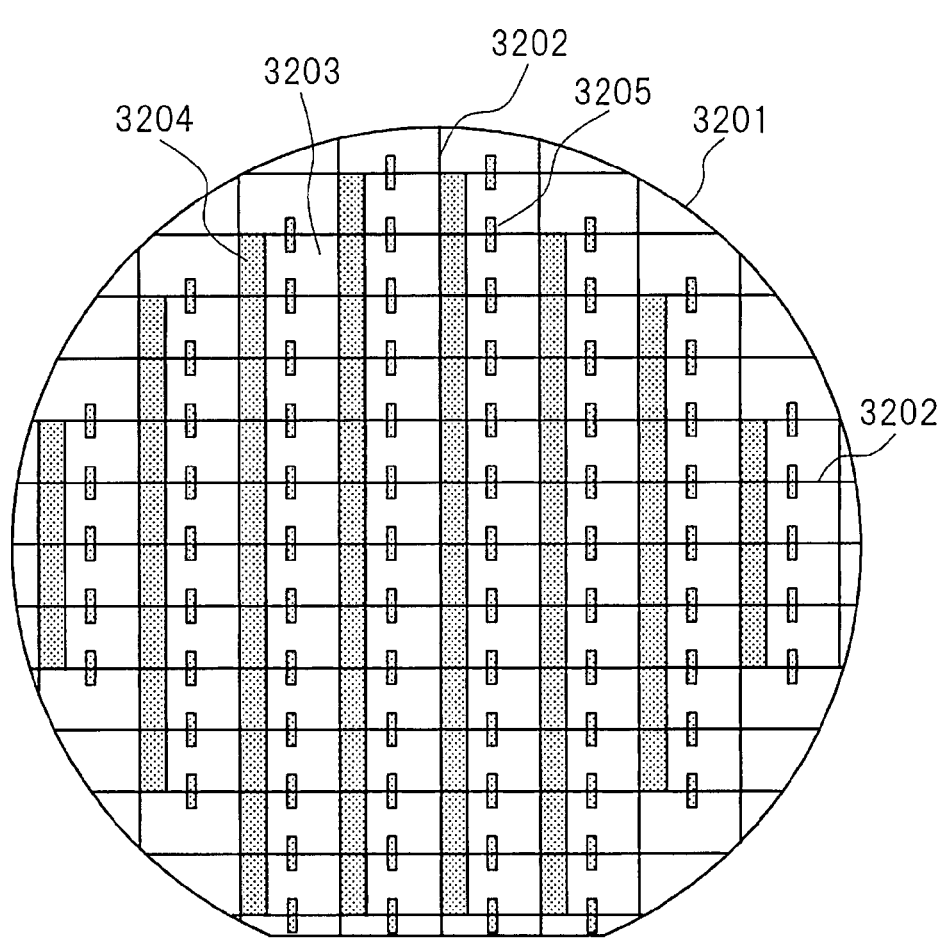

| ORGAN NAME | TYPE | THE NUMBER OF PEELED TISSUE SECTIONS | | | | | THE NUMBER OF PEELED TISSUE SECTIONS |
|---|---|---|---|---|---|---|---|
| | | IMMEDIATELY AFTER START | AFTER 4 HOURS | AFTER 12 HOURS | AFTER 18 HOURS | AFTER 24 HOURS | |
| SKIN | RIE TREATMENT | | | | | | 0/3 |
| | NO | | | | | | 0/3 |
| LIVER | RIE TREATMENT | | | | | | 0/3 |
| | NO | | | 1 | | | 1/3 |
| LUNG | RIE TREATMENT | | | | | 1 | 1/3 |
| | NO | | | | 2 | | 2/3 |
| HEART | RIE TREATMENT | | | | | 2 | 2/3 |
| | NO | | | | 3 | | 3/3 |
| KIDNEY | RIE TREATMENT | | | | 2 | 1 | 3/3 |
| | NO | | 2 | | 1 | | 3/3 |

[FIG. 10]
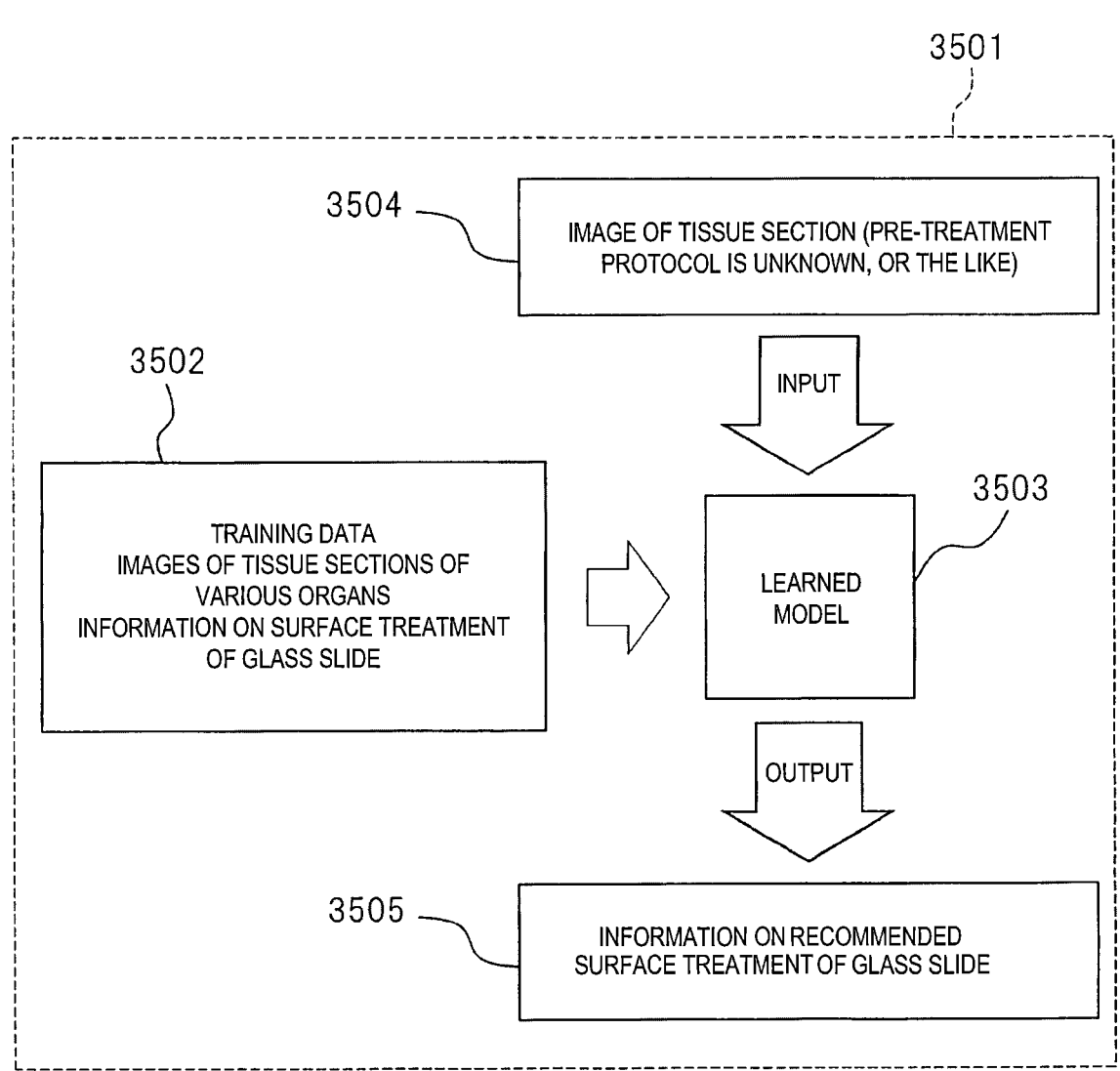

[FIG. 11]

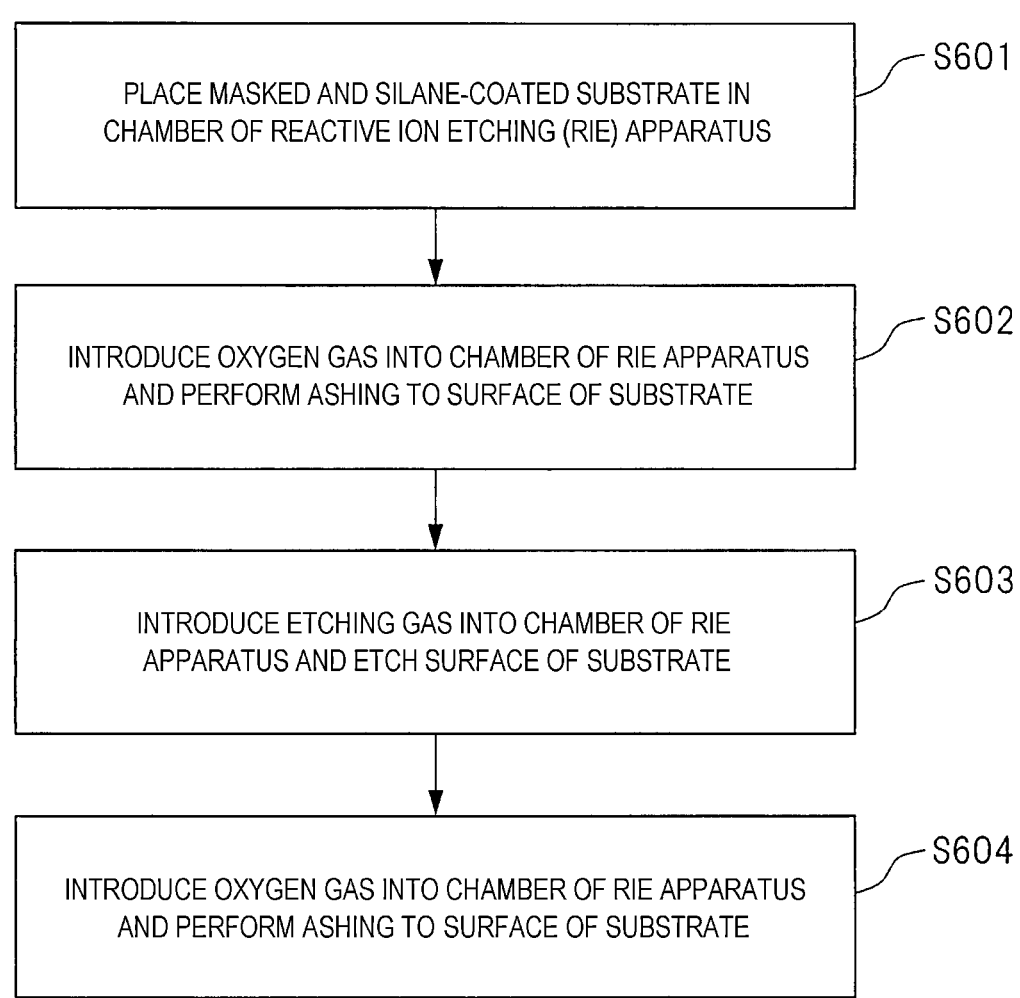

PLACE MASKED AND SILANE-COATED SUBSTRATE IN CHAMBER OF REACTIVE ION ETCHING (RIE) APPARATUS ⸺S601

INTRODUCE OXYGEN GAS INTO CHAMBER OF RIE APPARATUS AND PERFORM ASHING TO SURFACE OF SUBSTRATE ⸺S602

INTRODUCE ETCHING GAS INTO CHAMBER OF RIE APPARATUS AND ETCH SURFACE OF SUBSTRATE ⸺S603

INTRODUCE OXYGEN GAS INTO CHAMBER OF RIE APPARATUS AND PERFORM ASHING TO SURFACE OF SUBSTRATE ⸺S604

[FIG. 12]
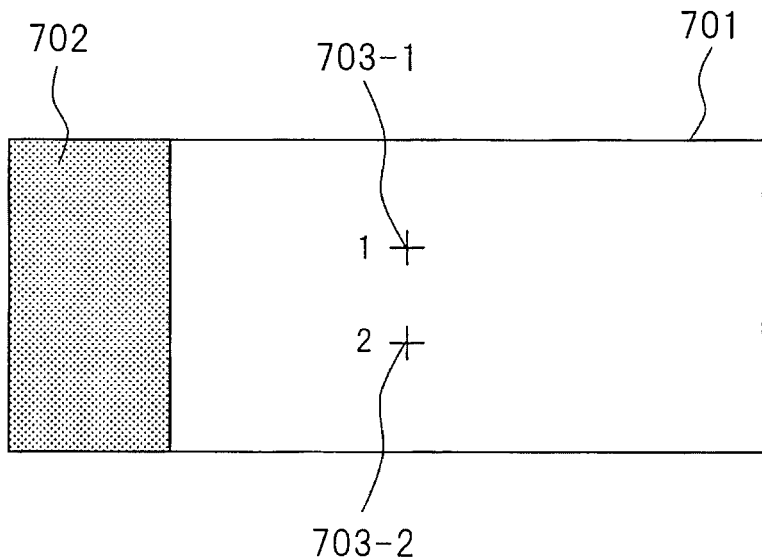
[FIG. 13]
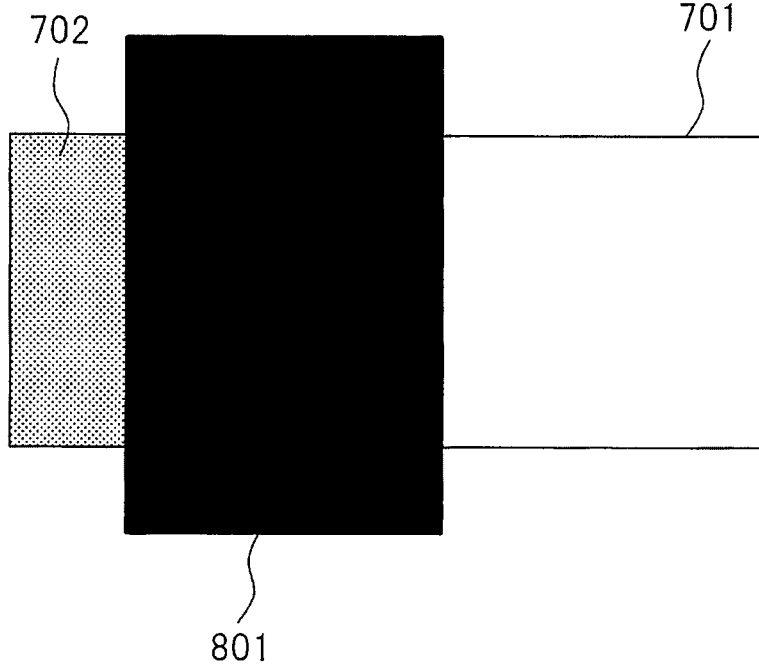

[FIG. 14]
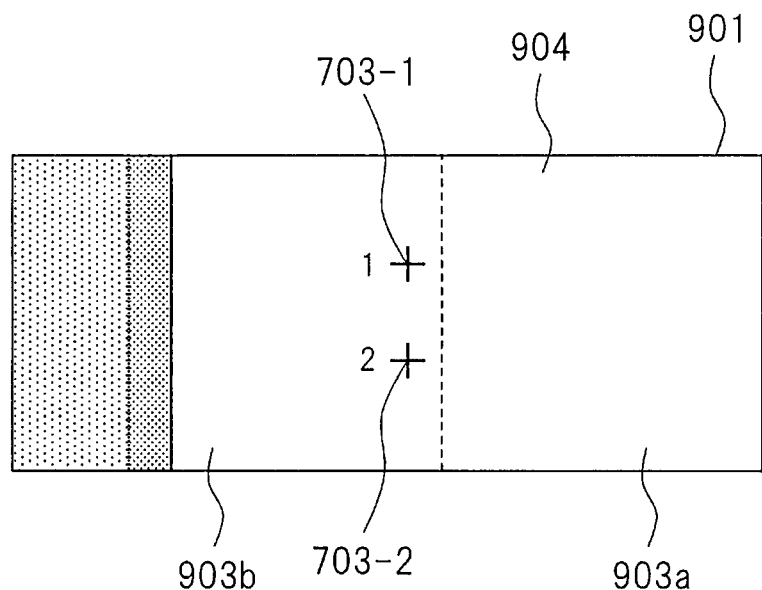
[FIG. 15]
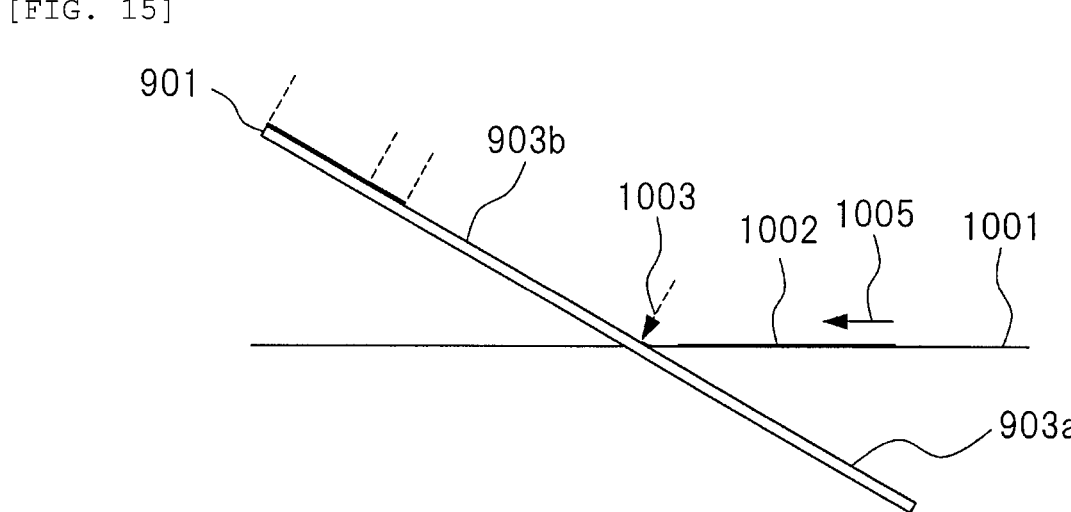

[FIG. 16]
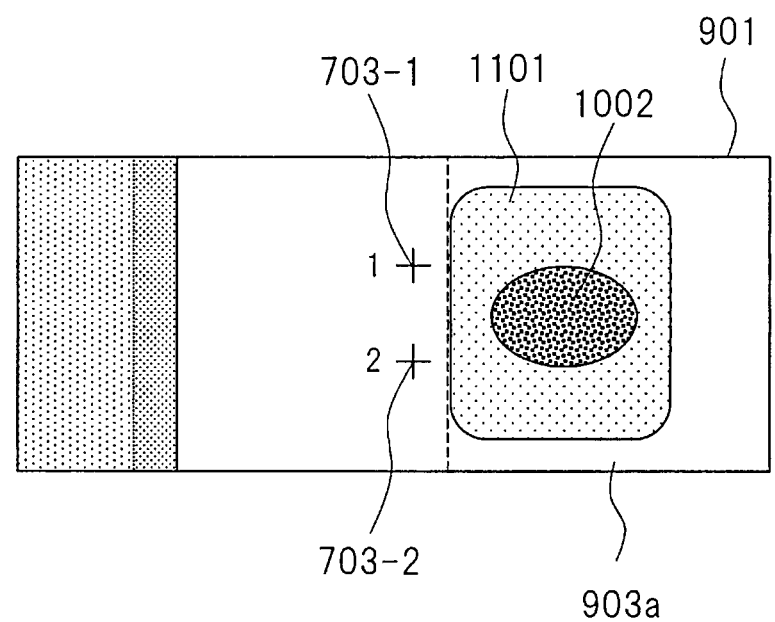
FIG. 17A
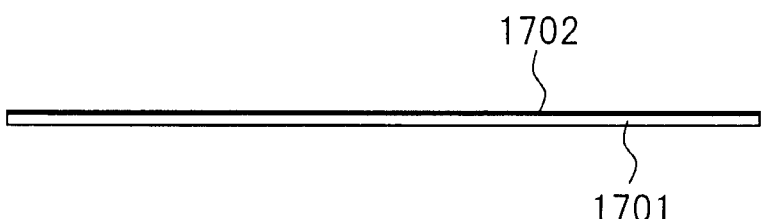
FIG. 17B
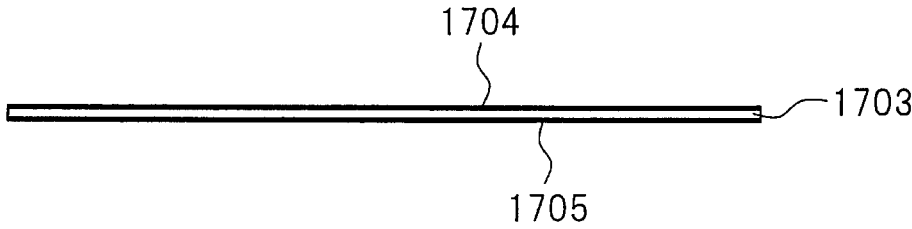

[FIG. 18]
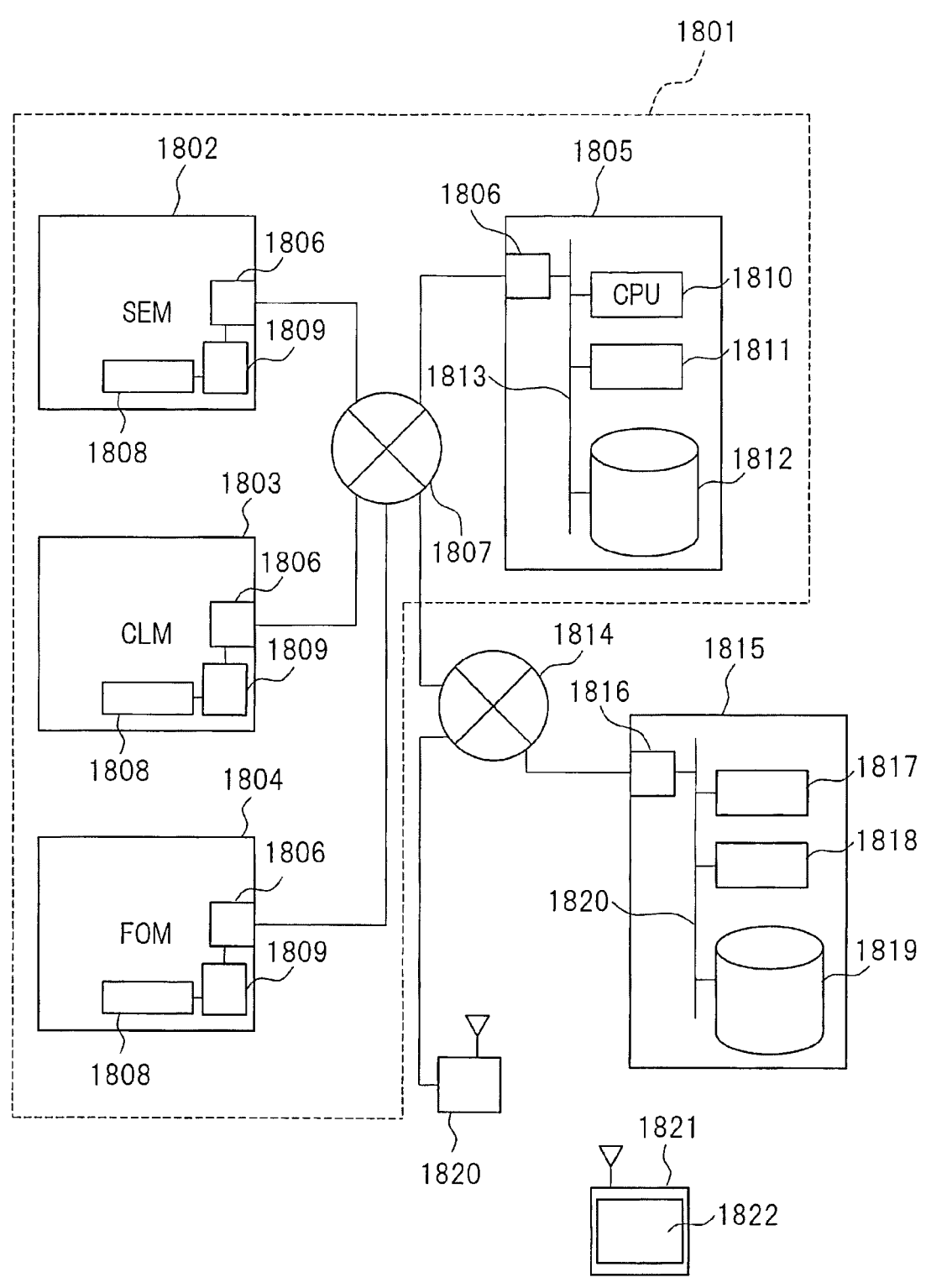

[FIG. 19]
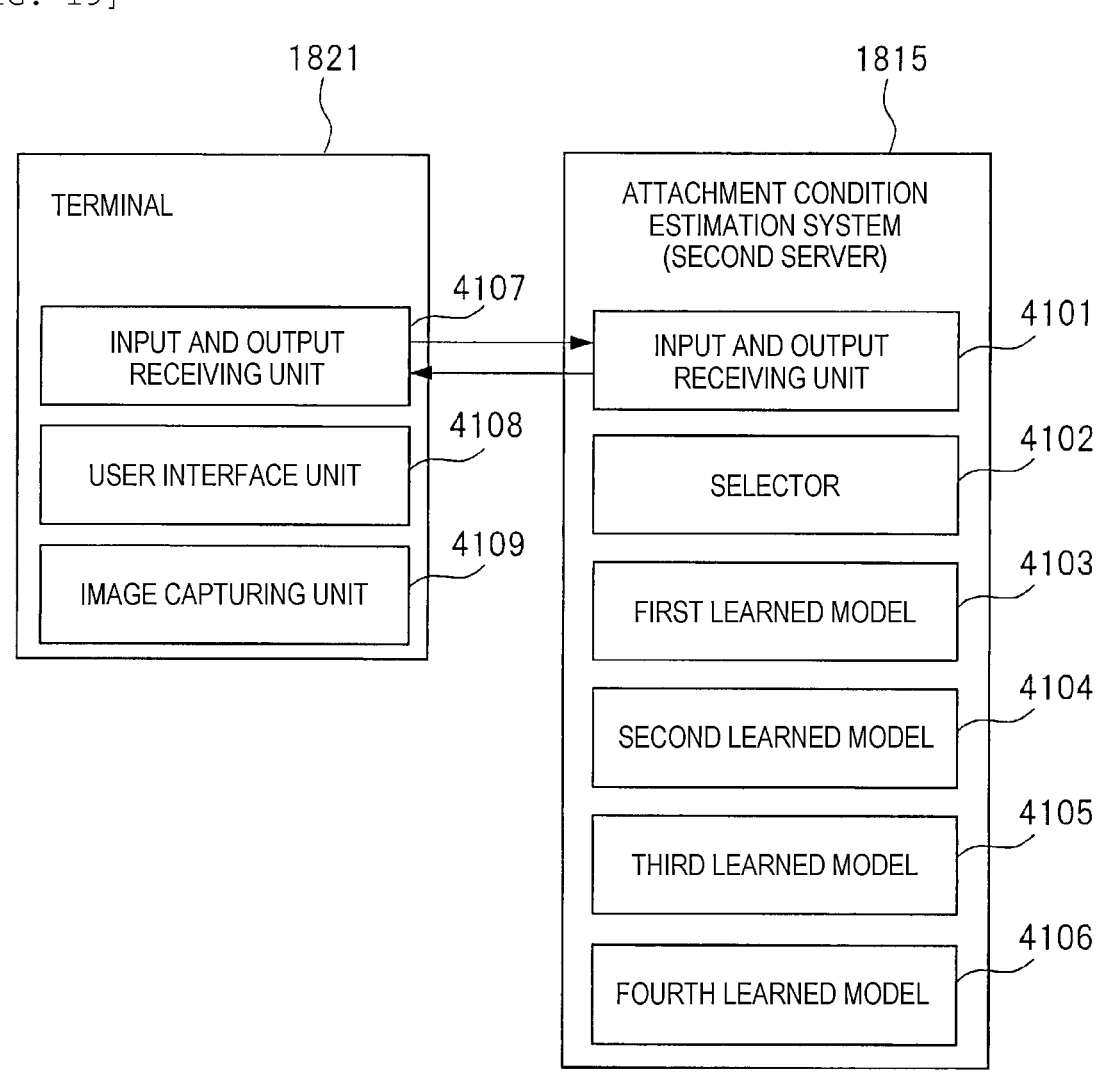

FIG. 20A

| IDENTIFICATION INFORMATION | SURFACE TREATMENT | HEATING DURING EXTENSION | STAINING METHOD | MICROSCOPE | STORAGE DESTINATION OF IMAGE FILE |
|---|---|---|---|---|---|
| IMAGE 1 | 3 | 1 | 1 | 1 | C:/*** |
| IMAGE 2 | 0 | 0 | 0 | 0 | C:/*** |
| IMAGE 3 | 0 | 1 | 1 | 1 | C:/*** |
| IMAGE 4 | 4 | 1 | 2 | 0 | C:/*** |

| IDENTIFICATION INFORMATION | SPECIES | ORGAN | FIXING STRENGTH | THICKNESS | STORAGE DESTINATION OF COMMENT |
|---|---|---|---|---|---|
| IMAGE 1 | 1 | 3 | 0 | 1 | C:/*** |
| IMAGE 2 | 1 | 1 | 1 | 0 | C:/*** |
| IMAGE 3 | 2 | 2 | 0 | 1 | C:/*** |
| IMAGE 4 | 3 | 3 | 0 | 0 | C:/*** |

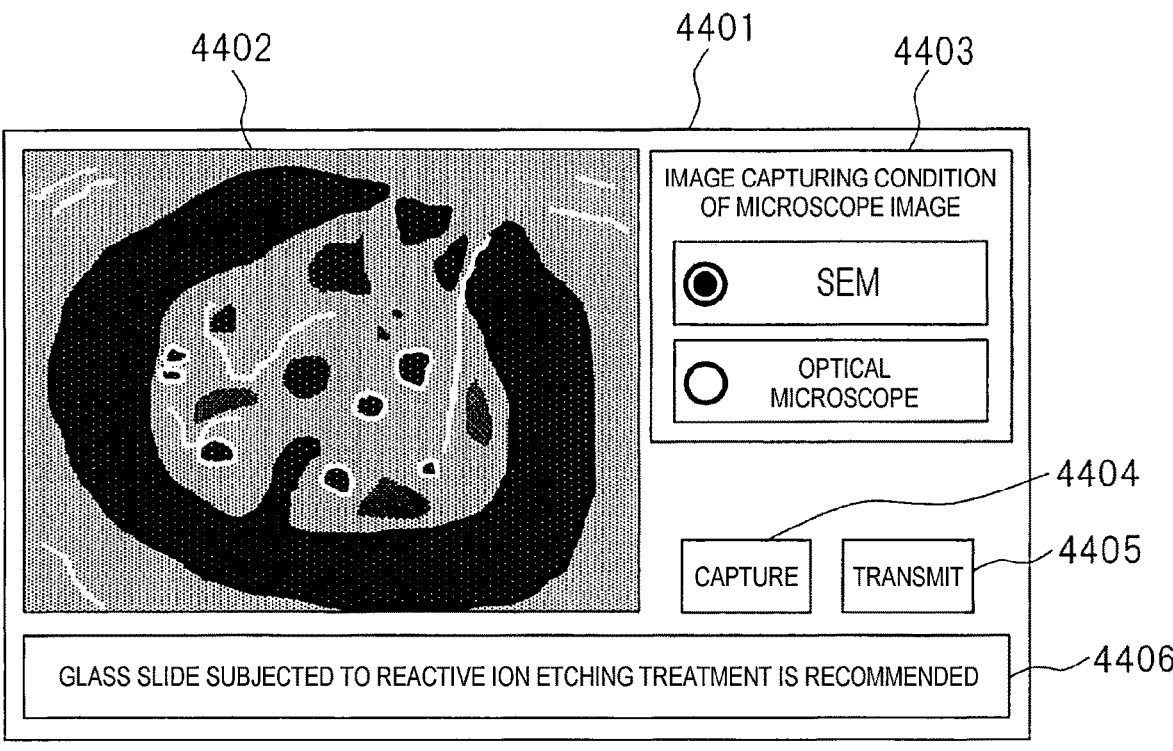

IMAGE CAPTURING CONDITION OF MICROSCOPE IMAGE

◉ SEM

◯ OPTICAL MICROSCOPE

CAPTURE     TRANSMIT

GLASS SLIDE SUBJECTED TO REACTIVE ION ETCHING TREATMENT IS RECOMMENDED

FIG. 21B

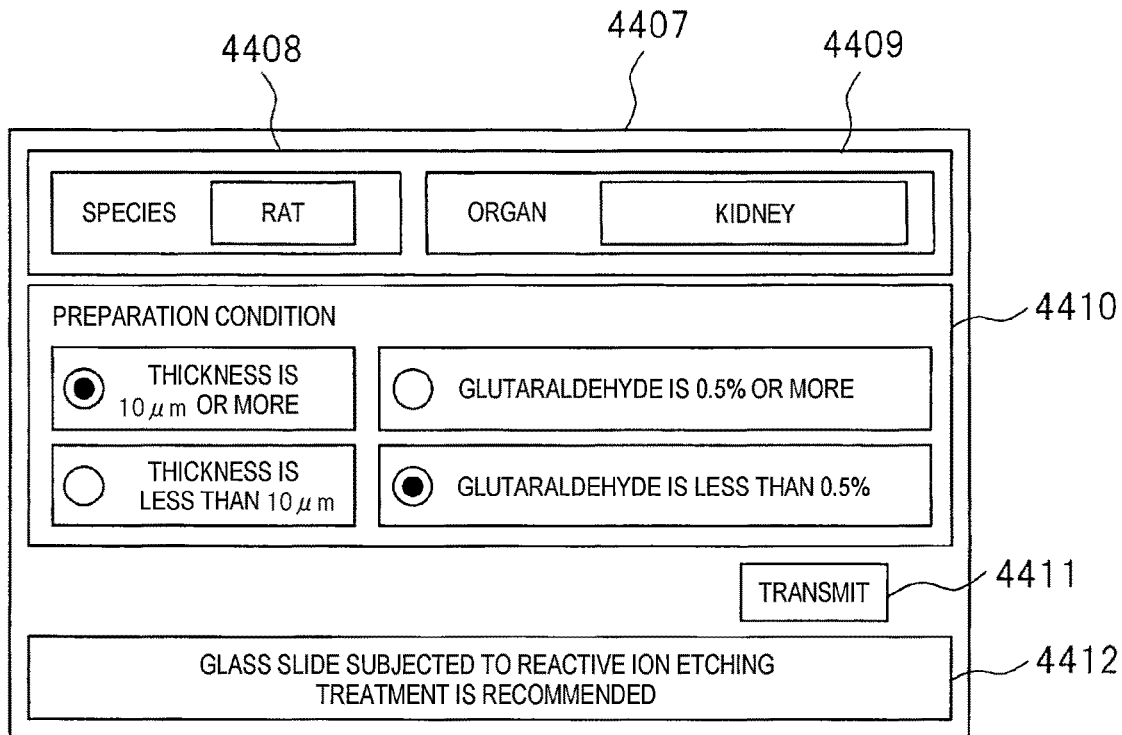

SPECIES     RAT          ORGAN          KIDNEY

PREPARATION CONDITION

◉ THICKNESS IS 10$\mu$m OR MORE          ◯ GLUTARALDEHYDE IS 0.5% OR MORE

◯ THICKNESS IS LESS THAN 10$\mu$m          ◉ GLUTARALDEHYDE IS LESS THAN 0.5%

TRANSMIT

GLASS SLIDE SUBJECTED TO REACTIVE ION ETCHING TREATMENT IS RECOMMENDED

[FIG. 22]
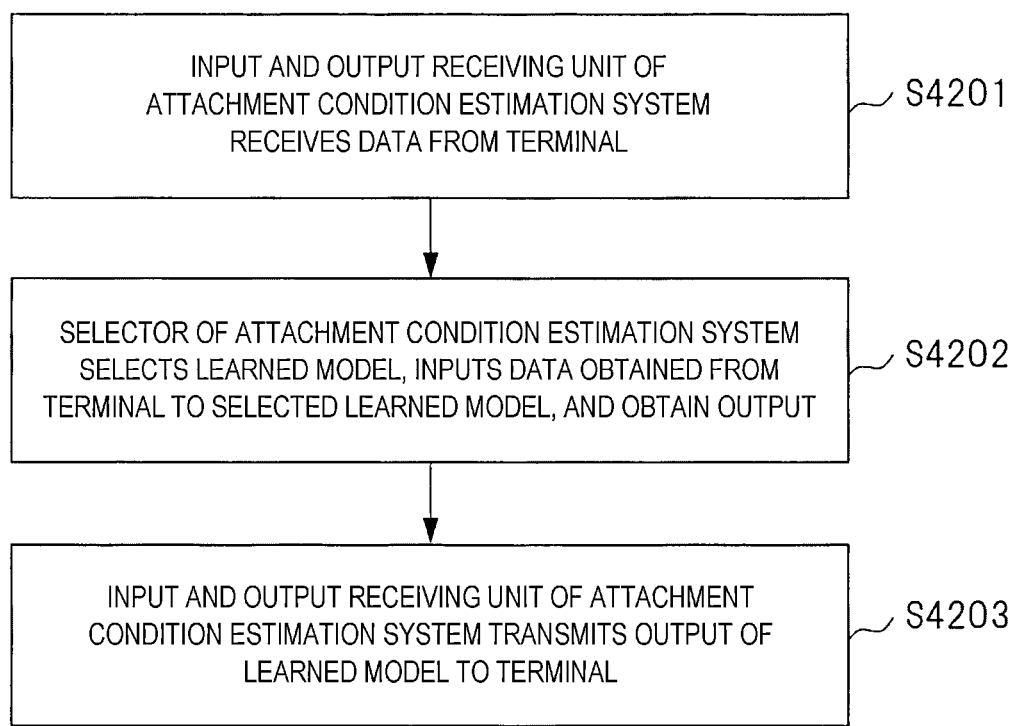
[FIG. 23]
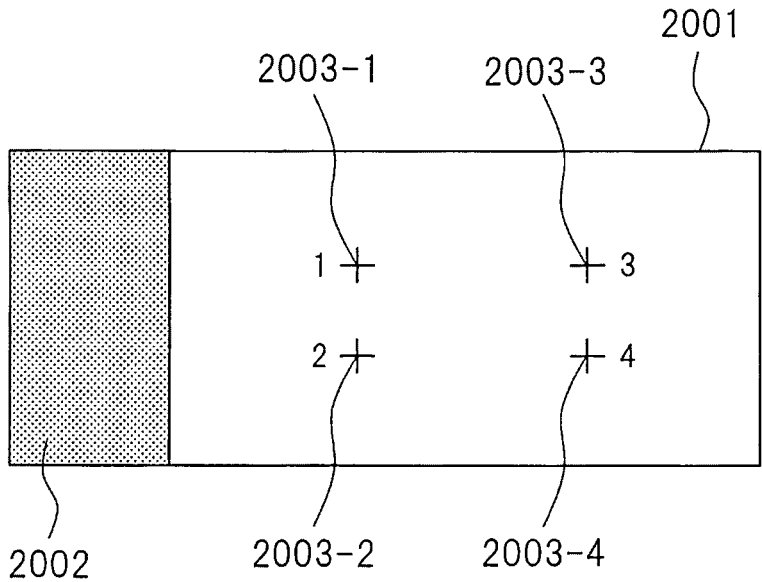

[FIG. 24]
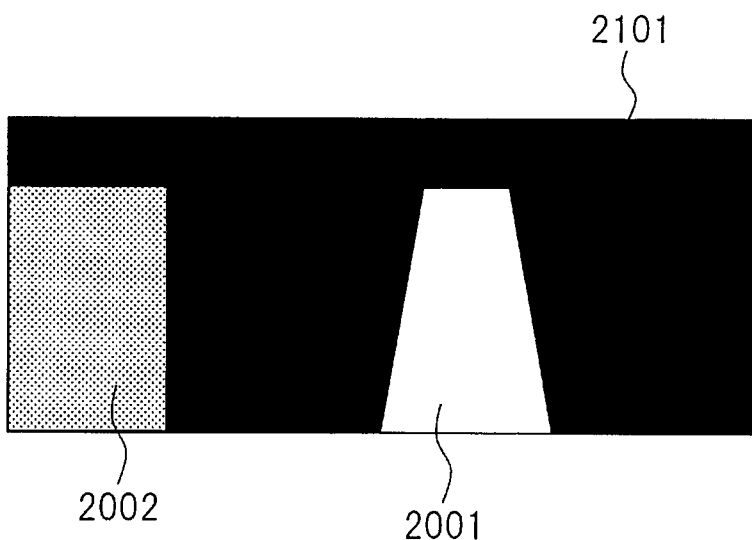
[FIG. 25]
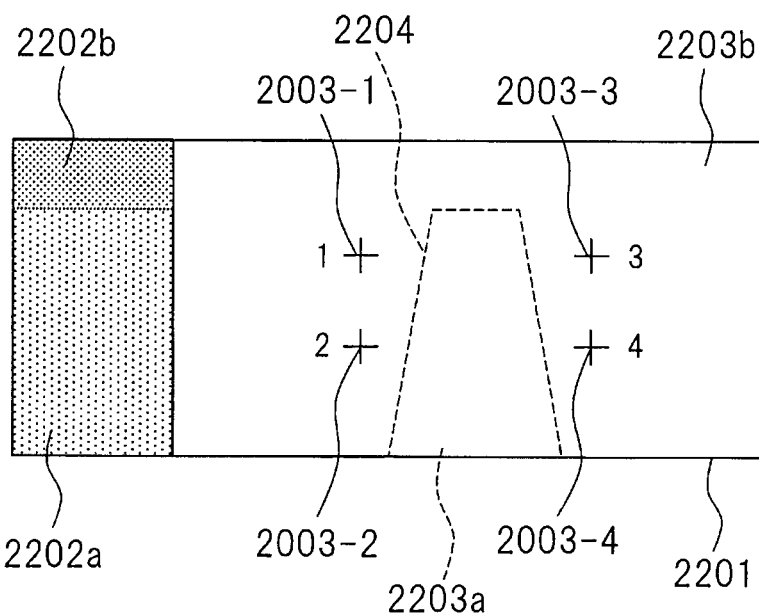

[FIG. 26]
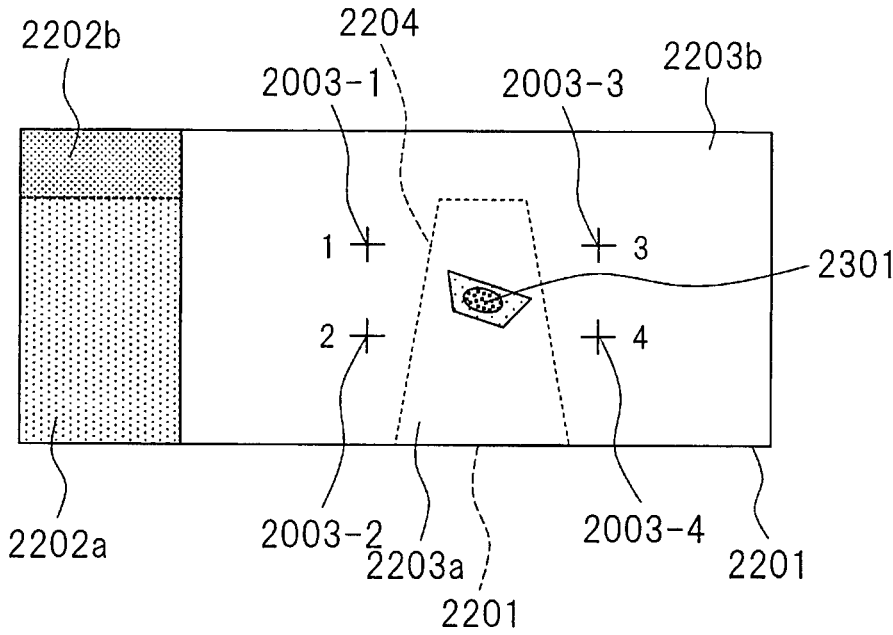
[FIG. 27]
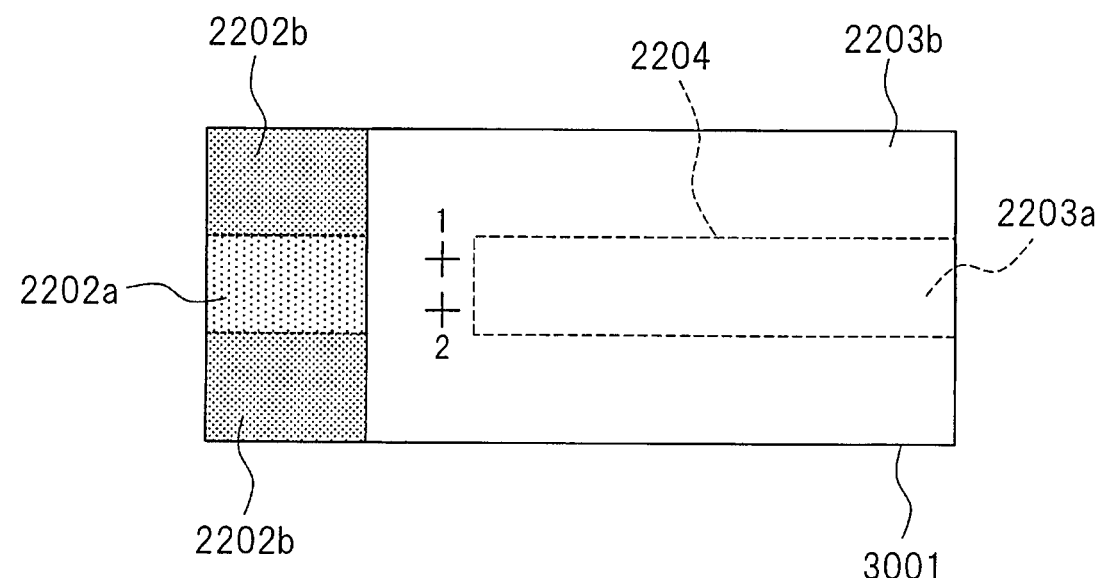

[FIG. 28]
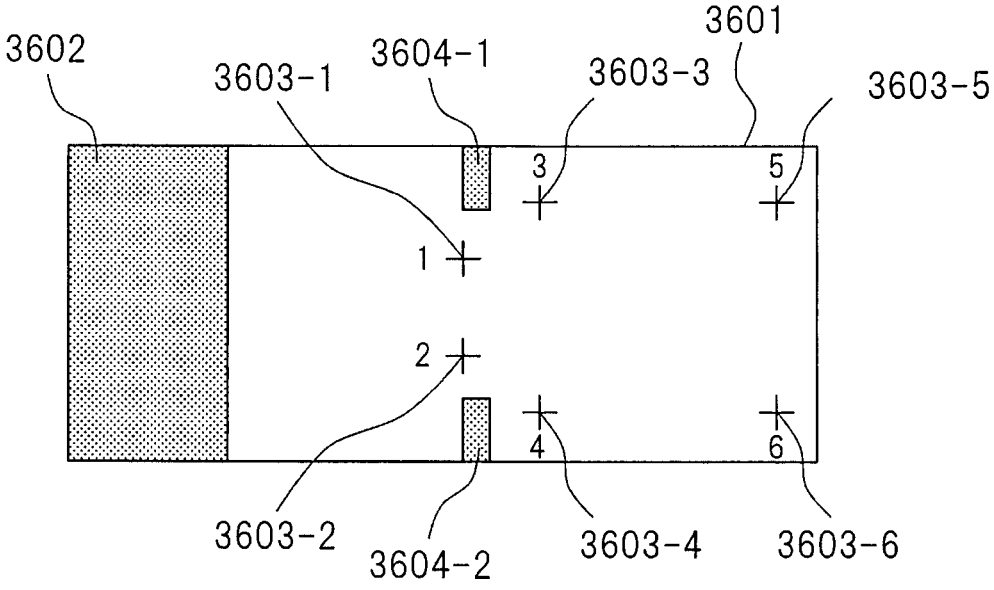
[FIG. 29]
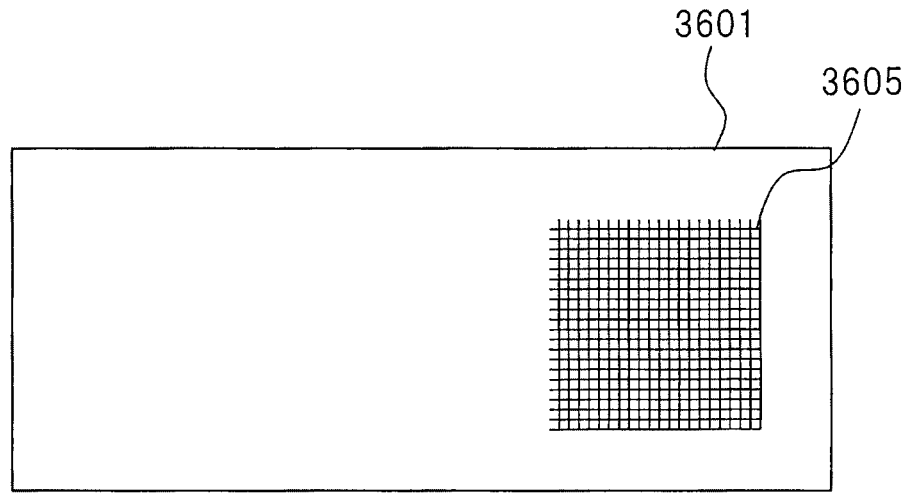

[FIG. 30]
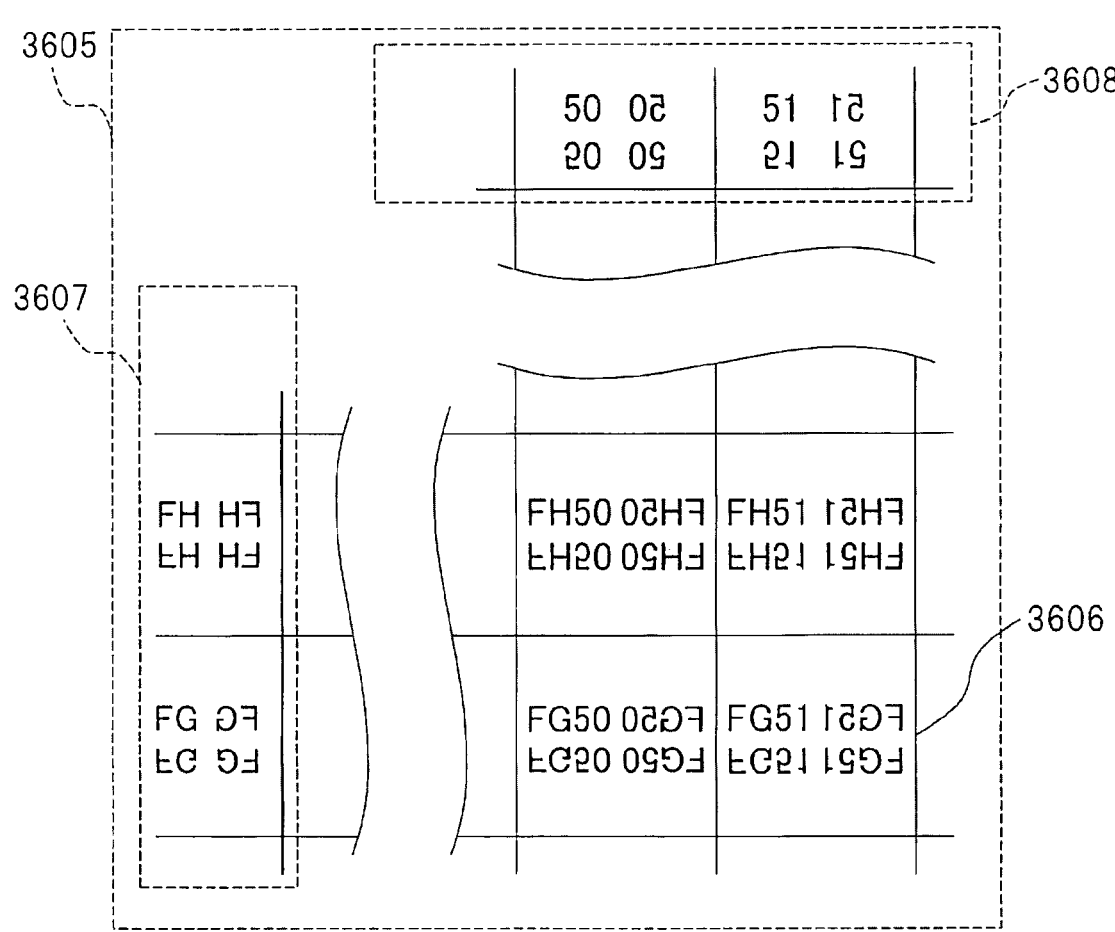

[FIG. 32]
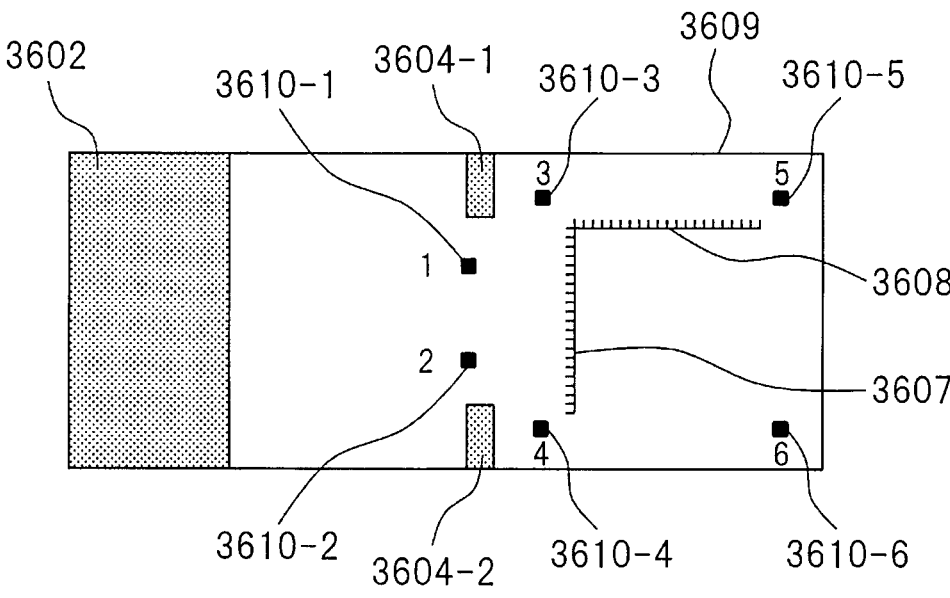

[FIG. 34]
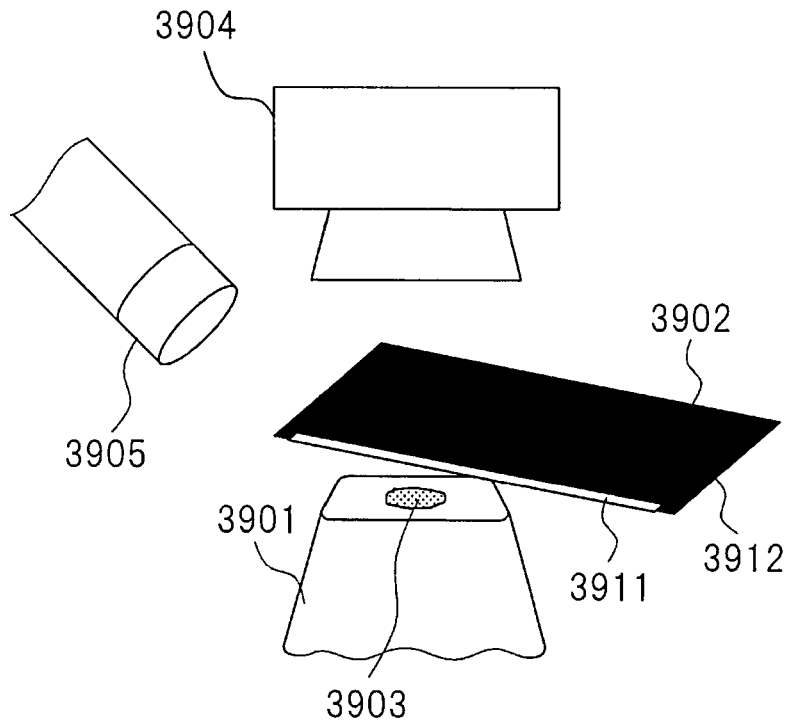

[FIG. 35]
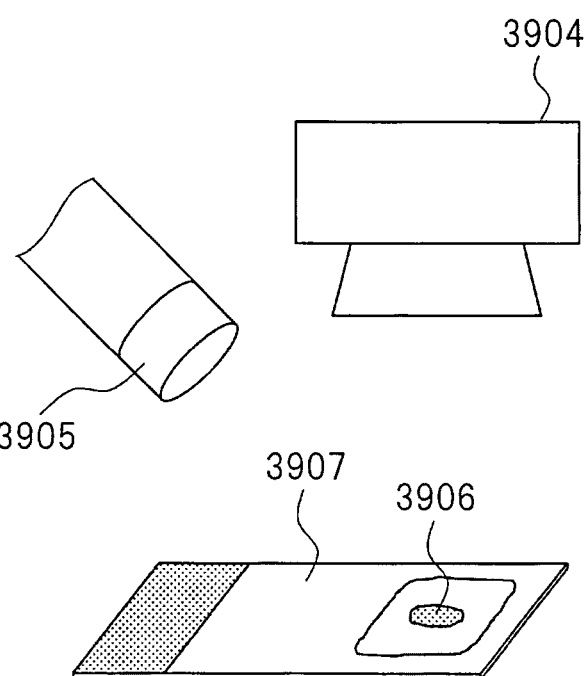

[FIG. 36]
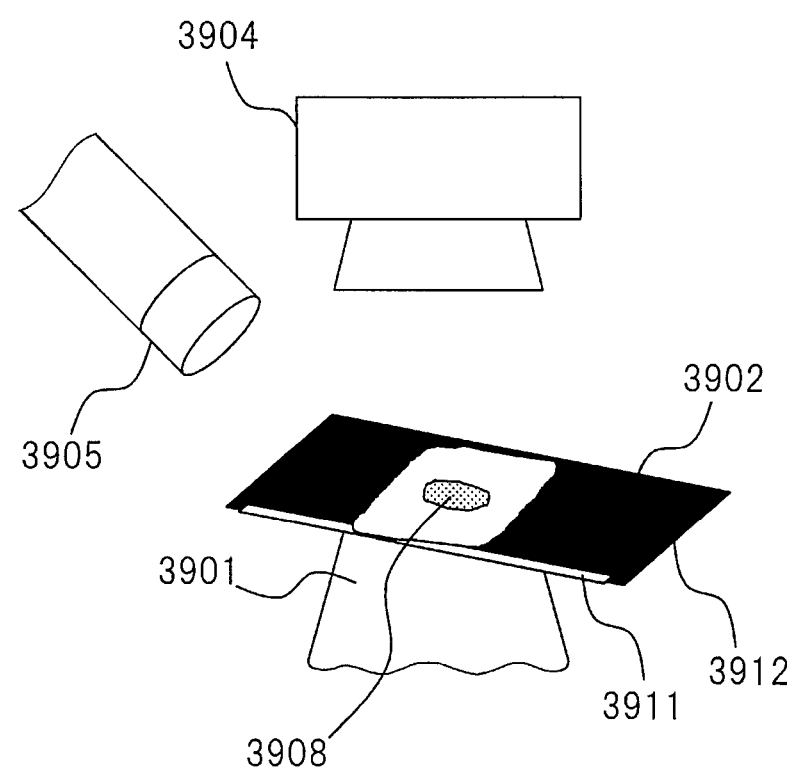

[FIG. 37]
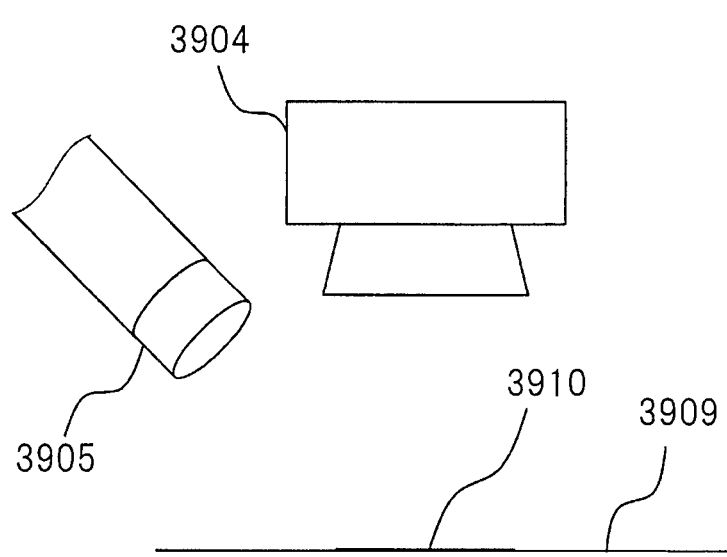

[FIG. 39]
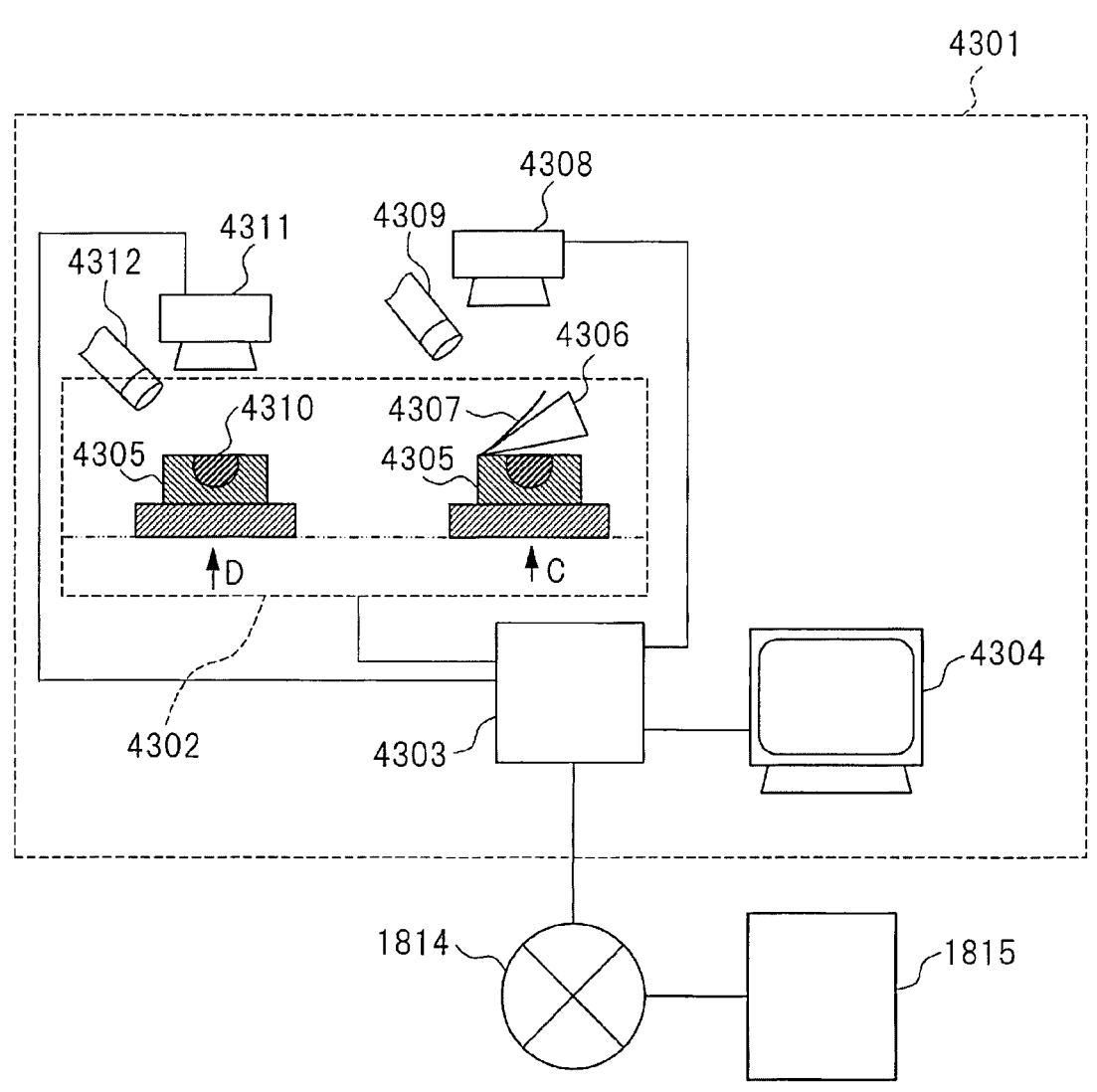

MICROSCOPE SLIDE AND METHOD FOR SELECTING THE SAME

TECHNICAL FIELD

The present invention relates to a microscope slide and a method for selecting the same.

BACKGROUND ART

PTL 1 and NTL 1 disclose a technique of observing a three-dimensional morphology of a biological tissue sample with a scanning electron microscope (SEM). A method for observing a biological tissue sample disclosed in PTL 1 is a method for observing a three-dimensional morphology of a biological tissue sample. In this method, a sample having a thickness of 15 to 50 μm is cut out from a sample block obtained by fixing, dehydrating, and paraffin-embedding a sample cut out from a biological tissue. The sample is transferred to a surface-treated glass slide, extended on the glass slide, deparaffinized, and then stained using a heavy metal based staining agent. The stained sample is observed by a SEM.

NTL 1 discloses a correlative light and electron microscopy (CLEM) method based on an observation result obtained by changing an angle at which a section subjected to staining is observed using a low-vacuum scanning electron microscope (low-vacuum SEM), a topographic image acquired by a four-segmented backscattered electron (BSE) detector, an observation result obtained by such an observation method, and an observation result based on hematoxylin-eosin staining (H&E staining) obtained by using an optical microscope.

In the related art, a silane coating is applied to a glass slide so that the glass slide and a specimen section are less likely to be peeled off. PTL 2 discloses a technique in which a specimen section positioning mark is printed on a transparent portion of a glass slide excluding a frosted portion, and a specimen section is placed on the glass slide with reference to the specimen section positioning mark. PTL 2 further discloses that a silane coating is applied to the glass slide so that the specimen section is less likely to be peeled off.

PTL 3 discloses a thin section sample preparation apparatus. The thin section sample preparation apparatus performs a rough cutting in which a surface layer part of a sample block is sliced thinly with a cutter, a cut surface is imaged with an image capturing unit, and the surface layer part of the sample block is sliced thinly by varying the slicing amount depending on an exposed surface area of a subject in the cut surface until the exposed surface area of the subject reaches a predetermined surface area or more. The thin section sample preparation apparatus then performs a main cutting in which, when the exposed surface area of the subject is greater than or equal to the predetermined surface area, the surface layer part of the sample block is sliced thinly by setting the slicing amount to a preset amount.

NTL 2 discloses that by performing reactive ion etching, a structure having random unevenness on a 10-nanometer scale is introduced onto surfaces of submicron-sized polystyrene particles.

CITATION LIST

Patent Literature

PTL 1: WO 2019/082293
PTL 2: JP-A-H10-333051
PTL 3: JP-A-2012-229995

Non Patent Literature

NTL 1: Akira Sawaguchi et al., "Informative three-dimensional survey of cell/tissue architectures in thick paraffin sections by simple low-vacuum scanning electron microscopy", Scientific Reports, May 10, 2018, Volume 8, Article number: 7479

NTL 2: Toru Fujimura et al., "Morphology and photonic band structure modification of polystyrene particle layers by reactive ion etching", Applied Physics Letters, March 2001, Vol. 78 No. 11, pages 1478-1480

SUMMARY OF INVENTION

Technical Problem

The inventor examined the adhesiveness of tissue sections cut out by the methods disclosed in PTL 1 and NTL 1 to a slide glass and found that the adhesiveness of the tissue sections cut out from a sample to the glass slide differs depending on organs from which the sample is obtained. Therefore, it is inefficient to attach tissue sections to the same microscope slide regardless of organs from which the tissue sections are obtained because it takes time and cost in contrast with the easy attachment.

Even when the attachment is not easy, a material other than materials used in the related art in order to improve the adhesiveness between the tissue section and the glass slide is not preferred because an influence on a process such as staining need to be eliminated even when the adhesiveness is improved.

An object of the invention is to provide an efficient method for attaching a tissue section.

Solution to Problem

The invention solves one of the above-mentioned problems by changing attachment conditions of a tissue section depending on an organ from which the tissue section is derived.

In addition, the inventor attempted expecting to improve the adhesiveness of tissue sections obtained from organs by introducing a structure similar to the unevenness introduced onto the front surface of the polystyrene particles shown in NTL 2 on a front surface of a microscope slide as one of attachment conditions, and succeeded in obtaining good adhesiveness. Therefore, a technique of achieving good adhesiveness between a microscope slide and a section by introducing unevenness onto the front surface of the microscope slide using reactive ion etching as one of attachment conditions is provided.

Further, a technique of optimizing the attachment of the section using a machine learning technique or the like is provided.

Advantageous Effect

According to the invention, a tissue section can be efficiently attached to a microscope slide.

BRIEF DESCRIPTION OF DRAWINGS

FIG. 1 is a flowchart of a method for manufacturing a microscope slide according to an embodiment of the invention.

FIG. 2 is a diagram showing a glass slide prepared in the first embodiment.

FIG. 3 is a diagram showing a reactive ion etching apparatus used in the embodiment.

FIG. 4 is a diagram showing the microscope slide of the first embodiment.

FIG. 7 is a diagram showing a use state of the microscope slide of the first embodiment.

FIG. 8 is a diagram showing a modification of the method for manufacturing the microscope slide according to the first embodiment.

FIG. 9 is a table showing a relation between shaking time in PBS of glass slides subjected to a RIE treatment by introducing a $CHF_3$ gas and untreated glass slides and the number of peeled sections in glass slides on which thick sections of various organs having a thickness of 15 to 20 $\mu$m were placed.

FIG. 10 is a schematic diagram showing an example of use of machine learning in the first embodiment.

FIG. 11 is a flowchart of a method for manufacturing a microscope slide according to an embodiment.

FIG. 12 is a diagram showing a glass slide prepared in the second embodiment.

FIG. 13 is a diagram showing a process of manufacturing the microscope slide of the second embodiment.

FIG. 14 is a diagram showing the microscope slide of the second embodiment.

FIG. 15 is a diagram showing a use state of the microscope slide of the second embodiment.

FIG. 16 is a diagram showing a use state of the microscope slide of the second embodiment.

FIG. 17(a) is a diagram showing a substrate prepared in the third embodiment, FIG. 17(b) is a diagram showing a modification of the substrate prepared in the third embodiment.

FIG. 18 is a diagram showing an example of an observation system and machine learning.

FIG. 19 is a functional block diagram of an attachment condition estimation system and a terminal according to an embodiment.

FIG. 20(a) and FIG. 20(b) are diagrams showing databases of the fourth embodiment.

FIG. 21(a) and FIG. 21(b) show graphical user interfaces (GUIs) of an embodiment.

FIG. 22 is a flowchart showing operations of the attachment condition estimation system of the embodiment.

FIG. 23 is a diagram showing a glass slide prepared in the fifth embodiment.

FIG. 24 is a diagram showing a process of manufacturing a microscope slide of the fifth embodiment.

FIG. 25 is a diagram showing the microscope slide of the fifth embodiment.

FIG. 26 is a diagram showing a use state of the microscope slide of the fifth embodiment.

FIG. 27 is a diagram showing a modification of the microscope slide of the fifth embodiment.

FIG. 28 is a diagram showing a microscope slide of the sixth embodiment.

FIG. 29 is a diagram showing a back surface of the microscope slide of the sixth embodiment.

FIG. 30 is a diagram showing a grid of the microscope slide of the sixth embodiment.

FIG. 32 is a diagram showing a modification of the microscope slide of the sixth embodiment.

FIG. 34 shows a state in which a sample block obtained by paraffin-embedding is cut with a cutter to obtain a tissue section, and an observation schematic diagram of a cut surface in the seventh embodiment.

FIG. 35 is an observation schematic diagram of the cut surface before deparaffinization after placing the cut-out tissue section on a microscope slide in the seventh embodiment.

FIG. 36 is an observation schematic diagram of the cut surface in a state where the tissue section is on the cutter in the seventh embodiment.

FIG. 37 is an observation schematic diagram of the cut surface in a state where the tissue section is on a water surface in the seventh embodiment.

FIG. 39 shows a tissue section preparation apparatus of an embodiment.

DESCRIPTION OF EMBODIMENTS

Figure 5A:
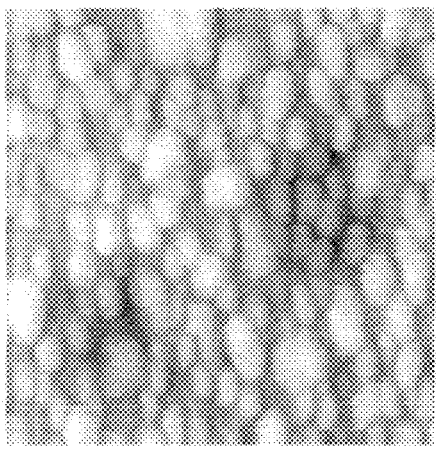
FIG. 5(a) shows an atomic force microscope image of a front surface of the microscope slide in the embodiment.

In the following embodiments, description may be divided into a plurality of sections or embodiments as necessary for convenience. Unless particularly specified, the sections or embodiments are not independent of each other but have a relation in which one section or embodiment is a modification, detailed description, supplementary description, or the like of a part or all of another section or embodiment.

Further, in the drawings used in the following embodiments, even a plan view may be hatched in order to make the drawings easy to see. In addition, in all the drawings showing the following embodiments, those having the same function are denoted by the same reference symbols in principle, and repeated description thereof will be omitted. Hereinafter, the embodiments of the invention will be described in detail with reference to the drawings.

First Embodiment

FIG. 1 is a flowchart of a method for manufacturing a microscope slide according to the first embodiment of the invention. In the present embodiment, a glass slide 201 shown in FIG. 2 is prepared as a substrate. The glass slide 201 contains silicon dioxide as a main component. The glass slide 201 has a size of 76 mm in length, 26 mm in width, and 1 mm in thickness. The glass slide 201 has a frosted portion 202 on one surface. The frosted portion 202 is formed by printing resin frost, and is a resin film containing a colorant and a frosting agent by, for example, color urethane printing. The frosted portion 202 is colored with the colorant, and is colored in pink, for example. The glass slide 201 is transparent except for the frosted portion 202.

FIG. 3 is a schematic diagram of a reactive ion etching apparatus (RIE) apparatus 301 that is a parallel plate type dry etching apparatus used in the present embodiment. The RIE apparatus 301 introduces an etching gas after evacuating a chamber 302 to high vacuum, applies high-frequency power between parallel plates constituted by an upper electrode 303a and a lower electrode 303b in the chamber 302 to generate plasma, and dry-etches an object (glass slide 201) on the lower electrode 303b.

In step S101 of FIG. 1, the glass slide 201 prepared as the substrate is placed in the chamber 302 of the RIE apparatus 301. Specifically, the glass slide 201 is placed such that a back surface without the frosted portion 202 faces the lower electrode 303b. As a result, a front surface with the frosted portion 202 is dry-etched. In FIG. 3, only one glass slide 201 is placed in the chamber 302 for clarity of description, and a plurality of the glass slides 201 can be placed in the chamber 302.

Next, in step S102, in order to etch silicon dioxide, which is the main component of the glass slide 201, with reactive ions, a $CHF_3$ gas is introduced as the etching gas into the chamber 302 of the RIE apparatus 301, the high-frequency power is applied between the upper electrode 303a and the lower electrode 303b to generate the plasma, and the front surface of the glass slide 201 is etched with the reactive ions. Conditions of the reactive ion etching are, for example, 0.6 $W/cm^2$ and 13 Pa, and etching time can be 1 minute. Further, a shape of unevenness introduced as surface roughness on the front surface of the glass slide 201 obtained by reactive ion etching can be controlled by the conditions of the reactive ion etching. For example, in the above-described example in which the $CHF_3$ gas is introduced, by extending the etching time, the surface roughness can be increased and the unevenness can be enlarged. On the contrary, by shortening the etching time, the surface roughness can be reduced and the unevenness can be reduced. At this time, in order to make the unevenness introduced as the surface roughness on the front surface of the glass slide 201 obtained by the reactive ion etching to be sufficiently finer than a wavelength of visible light, it is desirable to set a condition under which silicon dioxide is etched with an average depth of less than 0.4 μm shorter than the wavelength of the visible light. For example, a condition under which silicon dioxide is etched by about 0.1 μm in a depth direction as the average depth from the front surface of the glass slide 201 before etching can be set. By making the unevenness introduced as the surface roughness on the front surface of the glass slide 201 obtained by the reactive ion etching to be sufficiently finer than the wavelength of visible light, the unevenness can be made at a level that does not affect at least ordinary observation with an optical microscope.

For use in observation with an apparatus having a high resolution such as a scanning electron microscope (SEM), the surface roughness and the introduced unevenness are preferably reduced. Here, in the method for manufacturing the microscope slide of the present embodiment, by changing the conditions of the reactive ion etching in step S102 depending on spatial resolution of a microscope used to observe a tissue section, a size of the introduced unevenness can be changed. For example, as the spatial resolution of the microscope used to observe the tissue section increases, the etching time of the reactive ion etching in step S102 becomes shorter so that the surface roughness and the introduced unevenness are reduced. The shape of the unevenness introduced as the surface roughness can also be controlled by a type of a gas to be introduced, pressure, or an output of the reactive ion etching apparatus.

Next, in step S103, in order to remove a residue left on the front surface of the glass slide 201, an oxygen gas is introduced into the chamber 302 of the RIE apparatus 301, the high-frequency power is applied between the upper electrode 303a and the lower electrode 303b to generate the plasma, and the front surface of the glass slide 201 etched in step S102 is subjected to ashing. Ashing conditions in step S103 can be, for example, introduction of the oxygen gas, 0.5 $W/cm^2$, 40 Pa, and ashing time of 10 minutes.

As described above, the glass slide that is a microscope slide of the present embodiment can be manufactured.

FIG. 4 shows a glass slide 401 manufactured in the present embodiment. In the glass slide 401 manufactured in the present embodiment, as a result of etching with the reactive ions, the unevenness sufficiently finer than the wavelength of the visible light is introduced onto a front surface 403 (sample placement portion) having a frosted portion 402.

Figure 5B:
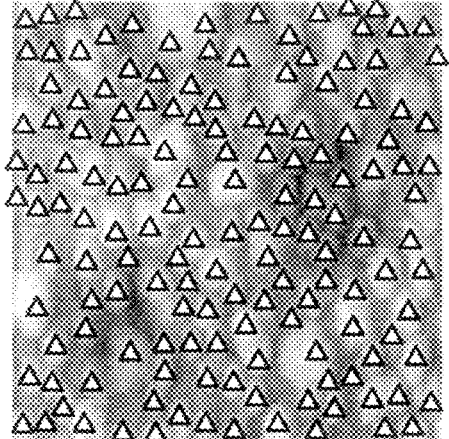
FIG. 5(b) is a diagram in which triangle marks are placed on convex portions of the atomic force microscope image of the front surface of the microscope slide in the embodiment.

FIG. 5(a) shows an atomic force microscope image of a region of 1.556×1.556 $μm^2$ on the front surface of the glass slide subjected to a reactive ion etching treatment of the present embodiment. It can be seen from FIG. 5(a) that the unevenness sufficiently finer than the wavelength of the visible light is introduced onto the front surface. Further, it can be found from FIG. 5(a) that the introduced unevenness has a surface shape of unevenness filled with convex portions. During the reactive ion etching in the step S102, on the surface of the glass slide 201, since the etching progresses more than the convex portions in regions between the adjacent convex portions, it is considered that grooves are formed between the adjacent convex portions, the formed grooves become recessed portions around each convex portion, and a surface shape of the unevenness filled with the convex portions is introduced onto the surface 403 of the glass slide 401. FIG. 5(b) shows an image obtained by superimposing triangle marks on positions that are considered to be the convex portions of the introduced fine unevenness on the atomic force microscope image of FIG. 5(a). There are 151 convex portions marked with the triangle marks in FIG. 5(b) in the region of 1.556×1.556 $μm^2$.

Figure 6A:
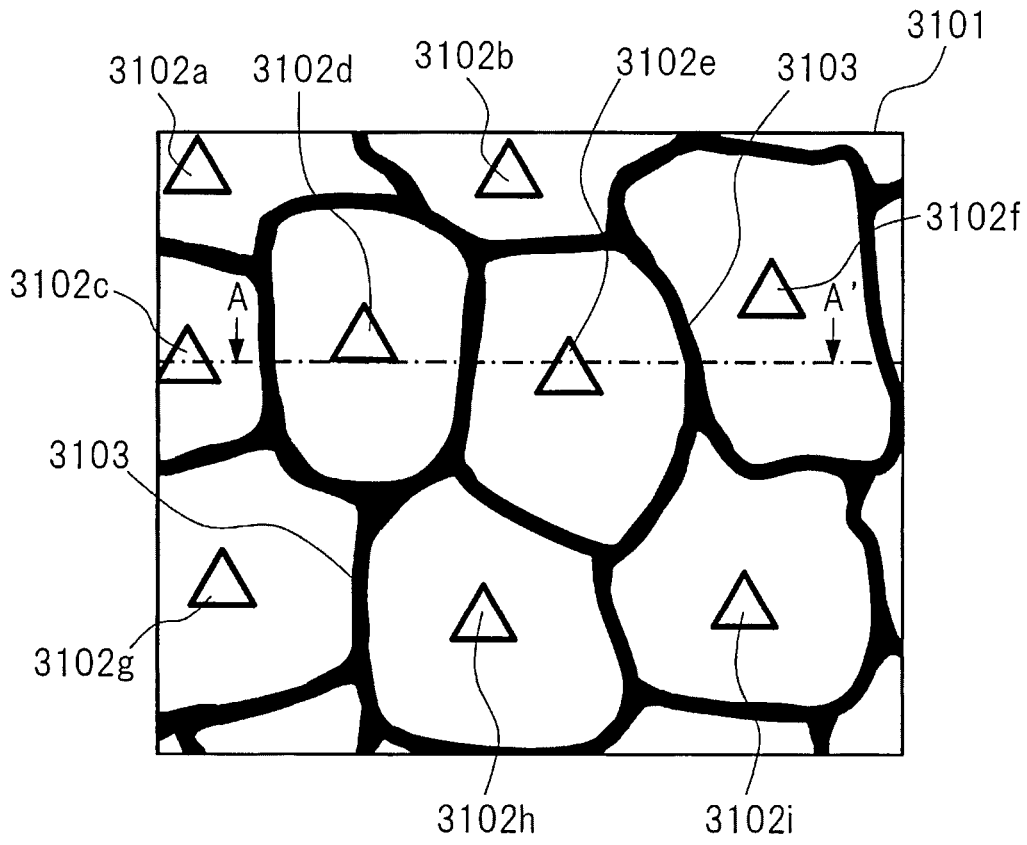
FIG. 6(a) is a schematic diagram showing an example of unevenness introduced onto the front surface of the microscope slide.
Figure 6B:
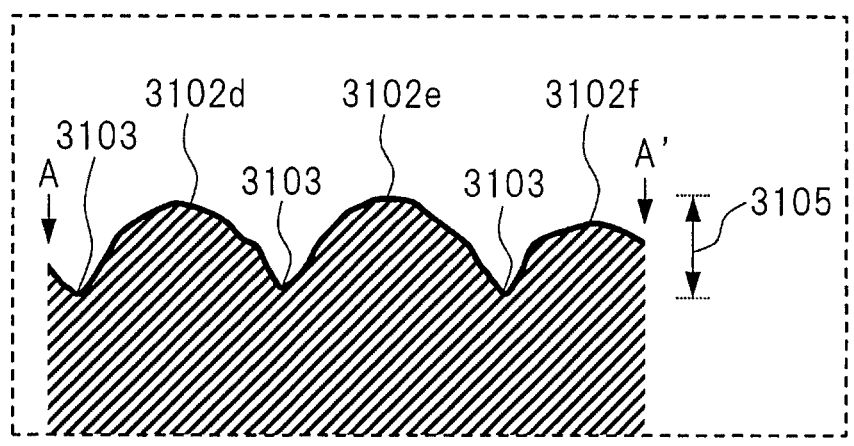
FIG. 6(b) is a schematic cross-sectional view at a portion along the dashed-dotted line in FIG. 6(a).

FIG. 6(a) shows a schematic diagram 3101 of the unevenness introduced onto the front surface of the microscope slide in the present embodiment. As shown in the schematic diagram 3101, on the front surface of the microscope slide of the present embodiment, grooves 3103 highlighted by solid lines surround convex portions 3102a to i indicated by the triangle marks. FIG. 6(b) shows a schematic diagram of a cross section taken along the line A-A' of a dashed-dotted line in FIG. 6(a). As shown in FIG. 6(b), the grooves 3103 are defined between the adjacent convex portions 3102d and 3102e and between the adjacent convex portions 3102e and 3102f. The grooves 3103 are the recesses. Therefore, the surface shape of the unevenness introduced onto the front surface of the microscope slide in the present embodiment is the surface shape of the unevenness filled with the convex portions.

In this way, the surface shape of the unevenness filled with the convex portions can be obtained by the process of the reactive ion etching of the present embodiment. A density of the introduced convex portions is preferably higher than 25 per 1 μm² in a plan view. Assuming that the visible light has a wavelength of 0.4 μm or more, a resolution limit of the optical microscope is about 0.2 μm. In the resolution limit of the optical microscope, 25 convex portions are included in 1 μm² when it is assumed that the convex portion has a size of 0.2 μm in a vertical direction and also 0.2 μm in a lateral direction in the plan view. Therefore, by providing the convex portions at a density higher than 25 per 1 μm² in the plan view, the resolution limit of the optical microscope is exceeded, and thus the influence of the surface shape of the introduced unevenness on the observation with the optical microscope can be significantly reduced.

When the grooves 3103 shown in FIG. 6(a) are described, by making an average area of regions including the convex portions surrounded by the grooves 3103 in the plan view smaller than 0.04 μm², the resolution limit of the optical microscope is exceeded, and thus the influence of the surface shape of the introduced unevenness on the observation with the optical microscope can be significantly reduced. For example, the average area in the plan view of the regions including the convex portions surrounded by the grooves 3103 is adjusted within a range of 0.00001 μm 2 to 0.03 μm² depending on the above-described etching conditions. Further, in a direction of the cross section shown in FIG. 6(b), by making an optical thickness of an average thickness 3105 of the unevenness corresponding to an average depth of the grooves 3103 smaller than a quarter of 0.4 μm with reference to visible light having a wavelength of 0.4 μm or more, the influence of light interference effect can be reduced, and the influence of the introduced unevenness on the observation with the optical microscope can be significantly reduced. Therefore, the average thickness 3105 of the unevenness is preferably 0.07 μm or less, with an average refractive index being 1.4. For example, the average thickness 3105 of the unevenness is adjusted in a range of 0.01 μm to 0.07 μm, for example, depending on the etching time of the etching conditions of step S102.

Figure 5C:
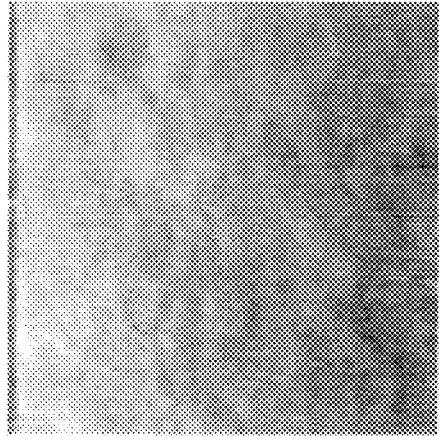
FIG. 5(c) shows an atomic force microscope image of the front surface of the glass slide before being subjected to a reactive ion etching treatment in the embodiment.

FIG. 5(c) shows an atomic force microscope image of the region of 1.556×1.556 μm² on the front surface of the glass slide before being subjected to the process of the reactive ion etching of the present embodiment. Since the front surface of the glass slide before being subjected to the process of the reactive ion etching of the present embodiment is flat, the surface shape of the unevenness filled with the convex portions seen in FIG. 5(a) cannot be seen from FIG. 5(c).

Here, since both surfaces of a float glass widely used for a glass slide and a cover glass are flat, the degree of unevenness on a front surface, which is subjected to the treatments of steps S102 and 103 to obtain the front surface of the glass slide 401 to which the tissue section is attached, is larger than the degree of unevenness on the back surface of the glass slide 401 that is not subjected to the treatments of steps S102 and 103. In addition to a plate glass obtained by the float process, both surfaces of a plate glass obtained by the fusion process are also flat. Thus, when the plate glass obtained by the fusion process is used, as in the case of the float glass, the degree of unevenness on a front surface, which is subjected to the treatments of steps S102 and 103 to obtain the front surface of the glass slide 401 to which the tissue section is attached, is larger than the degree of unevenness on the back surface of the glass slide 401 that is not subjected to the treatments of steps S102 and 103. The unevenness can be evaluated based on an arithmetic average surface roughness (Ra) or a root-mean-square surface roughness (Rq), and the front surface, which is subjected to the treatments of steps S102 and 103 to obtain the front surface of the glass slide 401 to which the tissue section is attached, has a larger arithmetic average surface roughness (Ra) or a larger root-mean-square surface roughness (Rq) than that of the back surface.

The front surface 403 etched with the reactive ions shows high hydrophilicity with a contact angle to water of about 10 degrees or less than 10 degrees. Since the front surface 403 shows high hydrophilicity, it is easy to place a tissue section 502 embedded with a paraffin 501 on the front surface 403 etched with the reactive ions as shown in FIG. 7. As a result of the above-described reactive ion etching treatment, the frosted portion 402 is lightly colored than the frosted portion 202 of the glass slide 201 prepared for manufacturing. Since the frosted portion 402 is lightly colored, it can be identified that the microscope slide is subjected to the above-described reactive ion etching treatment. In particular, the asking in step S103 is considered to be effective in decolorizing the colorant in the frosted portion 202. Further, as a result of the reactive ion etching treatment of the present embodiment, the frosted portion 402 maintains the color of the frosted portion 202 of the glass slide 201 prepared for manufacturing when the frosted portion 402 is viewed from a back surface since a portion that is lightly colored is the front surface of the frosted portion 402. That is, the color of the frosted portion 402 when viewed from a surface on which the frosted portion 402 is formed is lighter than the color of the frosted portion 402 when viewed from a side opposite to the surface on which the frosted portion 402 is formed. Therefore, based on a comparison of the frosted portion 402 viewed from both surfaces, it can be identified that the microscope slide is subjected to the reactive ion etching treatment of the present embodiment.

When comparing the adhesiveness between paraffin-embedded sections of mouse liver on the glass slide manufactured by the method of the present embodiment and a glass slide coated with aminosilane, it was known that peeling of the tissue section can be prevented on the glass slide manufactured by the method of the present embodiment similarly to the glass slide coated with the aminosilane. Effects of preventing the peeling were achieved by applying processes of deparaffinization, hydrophilization, H&E staining, dehydration, and encapsulation. Further, the contact angle of the glass slide coated with the aminosilane to water is about 25 to 60 degrees. Therefore, on the glass slide coated with the aminosilane, due to hydrophobicity, there is no water at the paraffin 501 around the tissue section during extension, and the tissue section is likely to have a wrinkle. On the contrary, since the microscope slide obtained by the method for manufacturing the present embodiment has high hydrophilicity, the microscope slide can hold water around the paraffin 501 around the tissue section, so that the tissue section is easy to extend and is less likely to have a wrinkle. As described above, the microscope slide of the present embodiment is suitable for attaching the tissue section. Further, in the method for manufacturing the present embodiment, since the front surface of the glass slide prepared as the substrate is etched, no additional material is required to improve the adhesiveness and hydrophilicity.

In the present embodiment, although the glass slide 201 is prepared as the substrate of silicon dioxide, a quartz glass substrate, a cover glass or the like can be prepared instead of the glass slide 201. For example, instead of the glass slide 201, a cover glass having a length and width of 18 mm and a thickness of 0.15 mm can be used as a substrate to be prepared. As described above, instead of the glass slide 201, when a substrate having a size of 76 mm or less in length, 26 mm or less in width, and 1 mm or less in thickness is used for manufacturing the microscope slide of the present embodiment, observation of the placed tissue section can be facilitated by mounting the manufactured microscope slide on a holder having a length of 76 mm, a width of 26 mm, and a thickness of 1 mm, which is a size of a general glass slide.

Further, after placing a glass wafer of silicon dioxide on the lower electrode 303b as a substrate in step S101 and performing the treatments by the RIE apparatus 301 in above-described steps S102 and S103, the treated wafer is cut with a dicing saw into chips, so that a microscope slide can be obtained with the chips in a desired size. As a result, a microscope slide suitable for mass manufacture can be obtained.

FIG. 8 shows a schematic diagram of a wafer as an example. A glass wafer 3201 treated by the RIE apparatus 301 in above-described steps S102 and S103 is cut with the dicing saw along vertical and horizontal scribe lines 3202. Chips 3203 cut out by cutting that are microscope slides each have a resin frosted portion 3204 and a mark 3205 for improving reproducibility of a position when placing a tissue section, on a surface subjected to the treatments by the RIE apparatus 301 in the above-described step S102 and step S103.

The frosted portion 3204 and the mark 3205 can be formed by printing in advance a resin film containing a colorant on one side of a prepared wafer by color urethane printing or the like along the scribe line 3202 and placing the wafer in step S101 such that a surface opposite to the printed surface faces the lower electrode 303b. Alternatively, after step S103, after printing the resin film along the scribe line 3202 by urethane printing or the like, the frosted portion 3204 and the mark 3205 can be obtained by cutting out each chip 3203 with the dicing saw. Alternatively, the frosted portion 3204 and the mark 3205 can be formed by cutting each chip 3203 with the dicing saw and then forming the resin film on each chip 3203 by urethane printing or the like.

By setting a length of one side of each chip 3203, for example, a length of a long side to be 26 mm, it is possible to use a general staining bottle for glass slide or the like and improve workability. Further, by setting a size of each chip 3203 that is a microscope slide to be 76 mm or less in length, 26 mm or less in width, and 1 mm or less in thickness, the manufactured microscope slide is mounted on a holder having a length of 76 mm, a width of 26 mm, and a thickness of 1 mm, which is the size of the general glass slide, and the observation of the placed section can be facilitated.

In the present embodiment, an example of attaching a paraffin-embedded section of an animal tissue is shown. Alternatively, the microscope slide of the present embodiment provides good adhesiveness even in a frozen section of a pea that is a plant sample. The invention can also be applied to attachment of cells such as yeast and stem cells to a surface of a substrate and attachment of a resin-embedded section to a microscope slide.

In the present embodiment, in step S102, the $CHF_3$ gas was introduced into the chamber 302 of the RIE apparatus 301 to etch silicon dioxide, which is the main component of the glass slide 201, with the reactive ions. Alternatively, another fluorine-based gas can be also introduced. For example, a gas in which $H_2$ is mixed with $CF_4$ of fluorocarbon can be used instead of the $CHF_3$ gas. Besides, the fluorocarbons such as $C_2F_6$, $C_3F_8$, $C_4F_8$, and $C_5F_8$ can be used as the etching gas. Further, the RIE apparatus is used in the present embodiment, and another dry etching apparatus can also be used.

In the present embodiment, the frosted portion 202 is obtained by the color urethane printing. Alternatively, when the frosted portion is not necessary, a resin containing the colorant without a frosting agent can be printed during the color urethane printing. Further, when the frosted portion 202 is obtained by shaving a glass to roughen the surface, no change in coloring due to the reactive ion etching can be seen. By performing the reactive ion etching treatment of the present embodiment on the surface having the frosted portion, the surface that is subjected to the reactive ion etching treatment of the present embodiment can be specified.

When both surfaces of a substrate such as a glass slide may be used for attaching sections, such as a case where no frosted portion is provided, the above-mentioned effect of preventing peeling can be achieved on both of the front surface and the back surface of the microscope slide by performing the treatments of steps S102 and S103 to both surfaces of the substrate.

Table 3301 of FIG. 9 is a table showing results of confirmation on the adhesiveness of tissue sections. Sample blocks obtained by fixing, dehydrating, and paraffin-embedding samples cut out from organs of skin, liver, lung, heart, and kidney of rats were cut into tissue sections having a thickness of 15 to 20 μm. The cut-out tissue sections were attached to glass slides subjected to the treatments of the above-mentioned steps S102 and 103 and untreated glass slides, and were shaken in phosphate buffered saline (PBS). Here, "organ" and "visceral organ" in Japanese are both "organ" when translated into English. In this application, "organ" in English is described as "organ and visceral organ" in the meaning of Japanese translation.

In particular, three sections of each organ were attached to each of the glass slides subjected to the treatments of steps S102 and 103 and the untreated glass slides. The sections were placed in an incubator at 37° C. for 24 hours and dried, and then the paraffin was dissolved with xylene. After alcohol replacement, the sections washed with water were shaken in the PBS. Peeling states of the tissue sections were confirmed after 4 hours, 12 hours, 18 hours, and 24 hours.

In the test shown in FIG. 9, the thickness is 15 to 20 μm, which is larger than that of a normal tissue section stained by the H&E staining as described above in the present embodiment. The thicker the tissue section, the more likely it is to peel off from the glass slide. A clear image of a biological tissue sample in a three-dimensional morphology can be obtained by cutting out such a thick tissue section, staining the sample with a heavy metal based staining agent, and observing the stained sample with the low-vacuum scanning electron microscope. The kinds of the heavy metal based staining agent includes lead and uranium, osmium tetroxide, platinum blue, lutetium acetate, samarium acetate, and gadolinium acetate.

As shown in Table 3301, in the case of skin, no peeling of the sections was observed after 24 hours of shaking in the PBS in both the glass slide subjected to the treatments of steps S102 and S103 and the glass slide not subjected to the treatments, and all of three sections remained. In Table 3301, the treatments of steps S102 and step S103 are described as "RIE treatment", and that the treatments are not applied is described as "no" (untreated). That is, the glass slide 401 corresponds to the glass slide subjected to the RIE treatment, and the glass slide 201 corresponds to the untreated glass slide.

Hereafter, the treatments of step S102 and step S103 are described as the "RIE treatment", and that the treatments are not applied is described as the "untreated" ("no").

In the case of liver, all three tissue sections remained on the glass slide subjected to the RIE treatment even after 24 hours, whereas on the untreated slide glass, peeling of one tissue section was confirmed after 12 hours.

In the case of lung, peeling of one tissue section and residual of two tissue sections on the glass slide subjected to the RIE treatment were confirmed after 24 hours, whereas on the untreated slide glass, peeling of two tissue sections was confirmed after 18 hours.

In the case of heart, peeling of two tissue sections and residual of one tissue section on the glass slide subjected to the RIE treatment were confirmed after 24 hours, whereas on the untreated slide glass, peeling of all three tissue sections was confirmed after 18 hours.

In the case of kidney, peeling of two tissue sections after 18 hours and peeling of one tissue section after 24 hours on the glass slide subjected to the RIE treatment were confirmed, whereas on the untreated slide glass, peeling of two tissue sections after 4 hours and peeling of the remaining one tissue section after 18 hours were confirmed.

As shown in Table 3301 of FIG. 9, regarding any one of the organs of skin, liver, lung, heart and kidney, an effect of preventing the peeling of the tissue section by the RIE treatment was observed. Since the effect of preventing the peeling was recognized even in the thick tissue section, it was found that the effect of preventing the peeling of a tissue section from a glass slide can be achieved by performing the treatments of steps S102 and S103 in the present embodiment even in a thick tissue section used for observing a three-dimensional morphology of a biological tissue sample, in which a sample having a thickness of 15 to 50 µm is cut out from a sample block obtained by fixing, dehydrating, and paraffin-embedding a sample cut out from the biological tissue, the cut-out sample is transferred onto a glass slide, extended on the glass slide, deparaffinized, stained using a heavy metal based staining agent, and observed by a scanning electron microscope.

It was also found that the adhesiveness of the tissue section to the microscope slide differs depending on the organs of skin, liver, lungs, heart and kidney, that is, the organ from which the tissue section is derived. In the results of the untreated glass slides, no peeling of sections was observed after 12 hours of shaking in the PBS in the organs of skin, lung and heart, whereas peeling of sections was observed in the liver and the kidney. Therefore, the untreated glass slide is applied for observation of organs having high adhesiveness such as skin, lung and heart. Therefore, a sufficient adhesive performance can be obtained at low cost while utilizing an advantage of the high hydrophilicity of the untreated glass slide.

On the other hand, regarding organs such as liver and kidney that require the effect of preventing peeling for the microscope slide, it is possible to use the glass slide 401 that is subjected to the reactive ion etching of the present embodiment and has the unevenness introduced onto the front surface and an enhanced effect of preventing peeling. Therefore, an efficient observation can be performed by reducing the degree of unevenness on a front surface of a microscope slide to be prepared for the organs having high adhesiveness such as skin, lung and heart, and increasing the degree of unevenness on the front surface of the microscope slide to be prepared for the organs such as liver and kidney that require the effect of preventing peeling for the microscope slide.

Here, the organs in the description of the present application are organs of vertebrates including humans and experimental animals. In addition, the organs may be derived from induced pluripotent stem cells. The organs in the description of the present application include a micro-organ derived from the induced pluripotent stem cells. The degree of unevenness on the front surface of the microscope slide to be prepared can be evaluated by an atomic force microscope, for example, can be evaluated based on the arithmetic average surface roughness (Ra) or the root-mean-square surface roughness (Rq). In the case of the organs such as liver and kidney that require the effect of preventing peeling for the microscope slide, the arithmetic average surface roughness or the root-mean-square surface roughness is larger as compared to those in the case of the organs having high adhesiveness such as skin, lung and heart.

Possible reasons why there are differences in the adhesiveness of the tissue sections to the microscope slides depending on the organs will be described below. First, macroscopically, the flexibility of the tissue section is considered to be related to the adhesiveness to the microscope slide. Since tissues of skin, lung and heart having high stretchability have spaces between cells, a tissue section thereof is soft and fits well on the front surface of the microscope slide. Therefore, it is considered that the tissue section of the organ having high stretchability such as skin, lung and heart is less likely to peel off from the microscope slide than the section of the solid organ having low stretchability such as liver and kidney that are densely packed in cells. The organ having high stretchability further includes spleen.

Microscopically, it is considered that contact of fibers contained in a tissue with the front surface of the microscope slide contributes to the prevention of the peeling of the tissue section from the microscope slide. The fibers contained in the tissue are, for example, collagen in extracellular matrixes. It is considered that in the tissues having spaces between cells such as skin and spleen, the tissue sections are less likely to peel off from the microscope slide due to the contact of the fibers abundant in the spaces between cells with the front surface of the microscope slide. However, in liver and kidney that are densely packed in cells, tissue sections are likely to peel off from the microscope slide.

It is considered that the unevenness of the front surface of the microscope slide introduced by the RIE treatment three-dimensionally increases a contact opportunity between the fibers contained in the tissue section and the front surface of the microscope slide, and effectively prevents the peeling of the section from the microscope slide. In a case of plants, it is considered that cellulose contained in the tissue section also effectively prevents the peeling of the section from the microscopic slide by contacting with the unevenness of the front surface of the microscope slide introduced by the RIE treatment. Therefore, it is considered that regarding not only the tissue sections of animals but also the tissue sections of plants and sections of materials containing fibers such as cellulose, the unevenness of the front surface of the microscope slide introduced by the RIE treatment has the effect of preventing the peeling.

As a method for further increasing the effect of preventing the peeling of the tissue section, there is a method for further coating the front surface of the microscope slide subjected to the treatments of steps S102 and 103 of the present embodiment with a silane coupling agent or a polymer. Therefore, by further three-dimensionally complicating and increasing the contact opportunity with the fibers contained in the tissue section due to the unevenness introduced by the treatments of steps S102 and S103, and by an effect of ionic bonding with functional groups such as amino groups introduced by the coating, it can be expected to increase the effect of preventing the peeling of the tissue section. At this time, as the silane coupling agent used for silane coating, for example, 3-aminopropyltrimethoxysilane, which is a silane coupling agent having an amino group, can be used. Further, as the polymer used for coating, for example, a polymer having an amino group such as polylysine or polyethylene-imine can be used. Here, when the coating is performed with 3-aminopropyltrimethoxysilane, the surface becomes hydrophobic. Therefore, it is possible to obtain a front surface showing high hydrophilicity again by introducing hydrophilic functional groups onto the front surface coated with 3-aminopropyltrimethoxysilane using a method such as oxygen plasma irradiation, corona treatment, or UV treatment under a condition of radiating plasma that is sufficiently weaker than the asking in step S103. As described above, it is possible to achieve both the high hydrophilicity and the further increased effect of preventing the peeling by a hydrophilization treatment that introduces hydrophilic functional groups for the coating.

The introduction of the hydrophilic functional groups to the surface may be applied to the uncoated glass slide 401. Since in the glass slide 401, the adhesiveness due to chemically introduced functional groups is not relied upon, there is no need to concern about reducing the number of functional groups that contribute to the adhesiveness due to the introduction of the hydrophilic functional groups, and in particular, a surface showing fairly high hydrophilicity can be obtained by introducing the hydrophilic functional groups immediately before use.

According to the above description, it is explained that a surface treatment of the microscope slide is changed depending on the organ, and by using a machine learning technique, it is possible to obtain recommended information on an optimal surface treatment of the microscope slide more finely.

As described above, macroscopically, the flexibility of the tissue section is considered to be related to the adhesiveness to the microscope slide. However, since an adjustment of the hardness of a frozen block due to an adjustment of temperature of each organ at the time of slicing from the frozen block is based on an empirical rule, it is considered that the recommended information on the surface treatment of the microscope slide from a learned model is useful. Further, as macroscopically and microscopically described, the sections of liver and kidney that are packed in cells are likely to peel off from the microscope slides. A brain tissue is also densely packed in cells. Therefore, similar to the liver and the kidney, the brain tissue is strongly stained by the H&E staining and is observed with an optical microscope. However, the brain tissue is rich in fats and oils, the fats and oils are removed in a process of deparaffinization, and nerve fibers remain. The remaining nerve fibers prevent the peeling from the microscope slide. As described above, it does not mean that the section is likely to peel off from the microscope slide simply because the cells are densely packed, and thus the machine learning technique is useful.

Morphological features of tissues of organs appear in images for observing tissue sections of the organs. Therefore, as shown in a schematic diagram 3501 of machine learning utilization of FIG. 10, when a learned model 3503 is generated by learning an image obtained by observing the tissue sections from the organs with a microscope with training data 3502 that uses surface treatment information on the microscope slide used for attaching the tissue sections as a correct answer and when an image 3504 is input, surface treatment information 3505 on a recommended microscope slide determined by the learned model 3503 that is a learned classifier is output. The machine learning of the present embodiment can use a deep learning technique. More specifically, images to be input at the training data 3502 are, for example, optical microscope images of the tissue sections stained by the H&E staining and low-vacuum scanning electron microscope images of the tissue sections having a thickness of 15 to 50 μm of the organs stained with a heavy metal based staining agent. The surface treatment information on the microscope slide used for attachment, which is output at the training data 3502, may be surface treatment information on the microscope slide used to actually capture images, and may be surface treatment information on the recommended microscope slide given to the images by an expert. As the surface treatment information on the microscope slide, in addition to the above-mentioned options of being untreated, the RIE treatment, and the treatment in which the coating using the silane coupling agent or the polymer is further added to the RIE treatment, for example, surface treatment information on a commercially available glass slide is included.

Here, when an image that shows an artifact such as wrinkles in the tissue section is input into the learned model 3503 by learning the image showing the artifact while including training data, which uses an improvement proposal regarding the attachment conditions provided by an expert based on use of the microscope slide subjected to the RIE treatment or the hydrophilization treatment by introducing the hydrophilic functional group to the microscope slide as a correct answer, at the time of generation of the learned model 3503, it can be expected that an output of the improvement proposal regarding the attachment conditions based on the use of the microscope slide subjected to the RIE treatment or the introduction of the hydrophilic functional group is obtained. The image 3504 input to the learned model is, for example, an image of the tissue section. Although a pre-treatment protocol for image capturing that includes information on the attachment of the section to the glass slide is unknown, the image 3504 is an optical microscope image or a scanning electron microscope image to be referred to when observing the sample. For example, the image 3504 input to the learned model is an image captured by a beginner and showing an artifact such as wrinkles of the section.

An observation magnification of a scanning electron microscope can be set up to hundreds of thousand times, and in the present embodiment, the observation magnification may be about hundreds of times to thousands of times, and is a magnification that partially overlaps with the observation magnification of the optical microscope. In an observation using the low-vacuum scanning electron microscope, at least one of a secondary electron image and a back-scattered electron image can be obtained, and the back-scattered electron image is often used.

As an advantage of the learned model obtained by learning an image with the training data using the attachment conditions as the correct answer, it can be expected to obtain recommended surface treatment information on a suitable microscope slide by including an image of a sample with a lesion in the training data and learning the image even when the lesion may affect the adhesiveness of the tissue section to the microscope slide. As described above, by using the machine learning technique, it can be expected to obtain the suitable surface treatment information on the microscope slide more finely.

Second Embodiment

The second embodiment of the invention will be described with reference to FIGS. 11 to 16. The present embodiment is different from the above-described first embodiment in that a silane-coated glass slide is prepared as the substrate, a region for performing the reactive ion etching is limited, and alignment markers to be used when observing or analyzing with a plurality of apparatuses are provided. Here, a combination of the plurality of apparatuses is, for example, a combination of a scanning electron microscope (SEM) and a fluorescence microscope (FOM), or a combination of the SEM and a confocal laser microscope (CLM). With these combinations, for example, an image morphologically with high resolution observed using the SEM, which is a charged particle beam apparatus, and an image observed with fluorescence using the FOM or the CLM, which is the optical microscope, are superimposed, so that the observing or the analyzing can be performed.

FIG. 11 is a flowchart of a method for manufacturing the microscope slide according to the second embodiment of the invention.

In step S601 of FIG. 11, a glass slide 701 shown in FIG. 12 is prepared and placed in the chamber 302 of the RIE apparatus 301. Specifically, similar to the first embodiment, the glass slide 701 is placed such that a back surface without a frosted portion 702 faces the lower electrode 303b. As a result, a front surface with the frosted portion 702 is dry-etched. Here, the glass slide 701 contains silicon dioxide as a main component.

The front surface of the glass slide 701 is silane-coated. In the present embodiment, the front surface of the glass slide 701 is coated with 3-aminopropyltrimethoxysilane that is a silane coupling agent having an amino group. Similar to the first embodiment, the glass slide 701 has the frosted portion 702 on one surface. Further, the frosted portion 702 is colored. The frosted portion 702 is colored, for example, in pink.

In addition, an alignment marker 703-1 and an alignment marker 703-2 are provided on the front surface of the glass slide 701 on a side where the frosted portion 702 is provided. The alignment marker 703-1 and the alignment marker 703-2 are provided with numbers "1" and "2" for specifying the markers. The alignment marker 703-1 and the alignment marker 703-2 can be provided on the front surface of the glass slide 701 on the side where the frosted portion 702 is provided by, for example, laser marking, focused ion beam (FIB) etching, or FIB material deposition. Further, for example, the alignment marker 703-1 and the alignment marker 703-2 can be formed by printing a resin while printing the frosted portion 702 with a resin such as color urethane. Alternatively, the alignment marker 703-1 and the alignment marker 703-2 are formed of a fluorescent material so that the alignment marker 703-1 and the alignment marker 703-2 can be suitable for alignment in an image observed with fluorescence.

Further, as shown in FIG. 13, a mask member 801 is disposed on the glass slide 701 to cover a part of the frosted portion 702, the alignment marker 703-1, and the alignment marker 703-2. By covering a part of the front surface of the glass slide 701 that is the prepared substrate with the mask member 801, a region into which a surface shape of unevenness is introduced is limited. The mask member 801 can be formed of, for example, a plate of polytetrafluoroethylene (PTFE). Alternatively, the mask member 801 can be formed of a sheet of polydimethylsiloxane (PDMS) that is transparent silicone rubber. By forming the mask member 801 with the PDMS sheet, a jig for fixing the glass slide 701 and the mask member 801 is not necessary due to self-adsorption action of the PDMS sheet. Further, since the PDMS sheet can be easily cut, the mask member 801 can be easily formed in any shape.

Next, in step S602, in order to remove a silane coat on a part of the glass slide 701 that is not covered with the mask member 801, the oxygen gas is introduced into the chamber 302 of the RIE apparatus 301, the high-frequency power is applied between the upper electrode 303a and the lower electrode 303b to generate plasma, and the part of the front surface of the glass slide 701 that is not covered with the mask member 801 is subjected to ashing. Ashing conditions in step S602 can be, for example, introduction of the oxygen gas, 0.5 W/cm$^2$, 40 Pa, and ashing time of 10 minutes.

In the following step S603, the CHF$_3$ gas is introduced as the etching gas, the plasma is generated between the upper electrode 303a and the lower electrode 303b, and the part of the front surface of the glass slide 701 that is not covered with the mask member 801 is etched with reactive ions.

Next, in step S604, in order to remove a residue left on the front surface of the glass slide 701, the oxygen gas is introduced into the chamber 302 of the RIE apparatus 301, the plasma is generated between the upper electrode 303a and the lower electrode 303b, and the front surface of the glass slide 701 that is etched in step S603 is subjected to asking. After the treatment of step S604, the mask member 801 is removed from the microscope slide.

As described above, the glass slide that is a microscope slide of the present embodiment can be manufactured. FIG. 14 shows a glass slide 901 manufactured according to the present embodiment. In the glass slide 901 manufactured according to the present embodiment, as a result of etching with the reactive ions, unevenness is introduced in a region 903a of the front surface that is not covered with the mask member 801. The region 903a etched with the reactive ions shows high hydrophilicity with a contact angle to water of about 10 degrees or less than 10 degrees. On the other hand, since the silane coat by 3-aminopropyltrimethoxysilane is maintained, a contact angle to water in a region 903b of the front surface that is covered with the mask member 801 is larger than the contact angle to water in the region 903a. The glass slide 901 that is a microscope slide of the present embodiment has a boundary 904 that has wettability with water between the region 903b on which the silane coat is maintained and that shows hydrophobicity, and the region 903a that is dry-etched and shows hydrophilicity. After the entire surface of the substrate is treated with silane coating, which is a wet process easy to apply uniformly, a region for placing a tissue section is formed by a dry-etching process that can easily process a desired region by a mask process, so that the microscope slide of the present embodiment can be manufactured with good reproducibility.

FIG. 15 shows how a tissue section 1002 floating on a water surface 1001 is placed on the glass slide 901. A position corresponding to the boundary 904 in FIG. 14 is indicated by a dashed arrow 1003. The water surface 1001 rises to a position of the arrow 1003 by surface tension due to the high hydrophilicity of the region 903a and a difference in the hydrophilicity between the region 903a and the region 903b on which the silane coat is maintained. As a result, regardless of skills of a worker, the position of the arrow 1003 is a target when the tissue section 1002 is moved in a direction of an arrow 1005, and as shown in FIG. 16, the tissue section 1002 embedded with a paraffin 1101 can be placed at a desired position on the glass slide 901 with good reproducibility.

Here, the region 903a of the front surface that is not covered with the mask member 801 is subjected to the above-mentioned reactive ion etching treatment up to an end of the glass slide 901, and thus the region 903a has high hydrophilicity up to the end of the slide glass 901. Therefore, when the tissue section 1002 floating on the water surface 1001 is placed on the glass slide 901 as shown in FIG. 15, the water surface is hardly disturbed, and for example, it is easy to place a paraffin-embedded tissue section having a thickness of 15 to 50 μm to be stained with a heavy metal-based staining agent and a paraffin-embedded tissue section to be stained by the H&E staining on the microscope slide. The end of the glass slide may be formed by chamfering.

Further, in the present embodiment, since the alignment marker 703-1 and the alignment marker 703-2 are further formed on the region 903b along the boundary 904, by using the alignment markers 703-1 and 703-2, a position of an observation region can be aligned between different microscope observations. For example, an image morphologically observed with a transmission microscope, an epi-illumination microscope, or a phase contrast microscope, which is an optical microscope, an image morphologically with high resolution observed with the SEM, which is a charged particle beam apparatus, and an image observed with fluorescence by the FOM or the CLM, which is an optical microscope, are easily superimposed, so that the observing or the analyzing can be performed.

In the present embodiment, the example in which 3-aminopropyltrimethoxysilane is used for the silane coating of the prepared glass slide 701 is shown. Alternatively, for example, by using octadecyltrimethoxysilane, which is a silane coupling agent having an alkyl group, in the silane coating, the contact angle to water of the region 903b in which the silane coat is maintained can be made larger than that in the case where 3-aminopropyltrimethoxysilane is used, so as to make the region 903b water repellent. By making the region 903b in which the silane coat is maintained water repellent, the boundary 904 between the region 903a and the region 903b can be more easily visually recognized from the water surface.

Further, by additionally providing the mark 3205 shown in FIG. 8 on the glass slide 901, the tissue section 1002 can be further placed at the desired position on the glass slide 901 with good reproducibility.

Further, instead of preparing the silane-coated glass slide, even by preparing a substrate whose front surface is coated with a polymer such as polyethyleneimine or polylysine, similarly as above, the region 903a etched with the reactive ions and the front surface that is coated with the polymer such as polyethyleneimine or polylysine and is maintained by the mask member 801 can have a hydrophilicity difference. Also in this case, the observing or the analyzing can be performed depending on visual recognition using the surface tension of the boundary 904 and the superimposed images using the alignment marker 703-1 and the alignment marker 703-2.

Third Embodiment

The third embodiment of the invention is different from the above-described embodiments in that a substrate to be prepared has a layer to be etched with the above-mentioned reactive ions. FIG. 17(a) is a schematic side-surface view of the substrate showing an example in which a substrate 1701 to be prepared has an indium tin oxide (ITO) layer 1702. The substrate 1701 has the ITO layer 1702 on an upper surface of a silicon dioxide glass plate. Here, a thickness of the ITO layer 1702 to be prepared is larger than a thickness of the ITO layer 1702 etched with the reactive ions to be described later. Therefore, since the ITO layer 1702 remains even after introducing unevenness to a front surface by performing etching with reactive ions of the present embodiment, conductivity is ensured, and it is possible to facilitate observation by the SEM, which is a charged particle beam apparatus, of a tissue section placed on the ITO layer 1702 remaining on the manufactured microscope slide.

In the present embodiment, in the manufacturing method described in FIGS. 1 and 11, the substrate 1701 is placed such that a back surface opposite to the front surface on which the ITO layer 1702 is formed faces the lower electrode 303b, and instead of introducing the $CHF_3$ gas into the chamber 302 of the RIE apparatus 301, a hydrogen iodide (HI) gas or a $CH_4$ gas and an $H_2$ gas are introduced as the etching gas, so that the ITO layer 1702 is etched with the reactive ions and a surface shape of unevenness is introduced onto the ITO layer 1702.

In the present embodiment, the substrate 1701 is a glass plate on which the ITO layer 1702 is formed. Alternatively, for example, a glass wafer can be used as the glass plate.

Further, instead of the ITO layer 1702 of the present embodiment, FIG. 17(b) shows a schematic side-surface view of a substrate of a modification in which a substrate 1703 having a silicon nitride layer 1704 whose thickness is larger than a thickness to be subjected to the reactive ion etching on the silicon dioxide glass plate is prepared.

As the etching gas for etching the silicon nitride layer 1704, for example, a fluorine-based gas is used to etch the silicon nitride layer with the reactive ions to introduce the surface shape of the unevenness, so that the silicon nitride layer remaining after the etching can impart chemical resistance to the microscope slide. Further, as shown in FIG. 17(b), the substrate 1703 has a silicon nitride layer 1705 on the back surface opposite to the front surface having the silicon nitride layer 1704, so that the microscope slide has higher chemical resistance. A thickness of the silicon nitride layer 1705 can be, for example, the same as the thickness of the silicon nitride layer 1704 before etching.

Fourth Embodiment

The fourth embodiment of the invention will be described with reference to FIG. 18. In the present embodiment, an observation and analysis method using the alignment marker shown in each embodiment will be described. The machine learning shown in the first embodiment will be described.

FIG. 18 is a diagram showing an observation system 1801 and machine learning used in the present embodiment.

The observation system 1801 includes a scanning electron microscope (SEM 1802), a confocal laser microscope (CLM 1803), a fluorescence microscope (FOM 1804), and a first server 1805. The SEM 1802, the CLM 1803, the FOM 1804, and the server 1805 each have an interface 1806, and are connected to each other via a first network 1807. For example, the first network 1807 is a local area network.

The SEM 1802, the CLM 1803, and the FOM 1804 each have an XY stage 1808 for changing an observation position or an analysis position of a sample and a stage controller 1809 for controlling an operation of the XY stage 1808, so that a positional relation between the alignment marker of the above-described embodiments and an observation target or an analysis target on a tissue section can be imported into the stage controller 1809, and the XY stage 1808 can perform alignment based on the imported positional relation.

The first server 1805 includes a central processing unit (CPU) 1810, a memory 1811, and a storage 1812 that are connected to a bus 1813. The positional relation imported into each stage controller 1809 is transferred to the first server 1805, and the first server 1805 stores the imported positional relation in the storage 1812. Each positional relation is stored in the storage 1812 in association with information on a sample to be observed or analyzed, and acquired image data or analysis result. The positional relation stored in the storage 1812 is called by the SEM 1802, the CLM 1803, or the FOM 1804, and image capturing for reproducing the called positional relation or analysis is performed. The information on the sample to be observed or analyzed, newly acquired image data or analysis result and the reproduced positional relation are stored in the storage 1812.

The first server 1805 can superimpose images captured by reproducing the positional relation using the same sample and output the superimposed images. As a result, for example, a tissue section image morphologically observed with high resolution with the SEM, which is a charged particle beam apparatus, and a tissue section image observed with fluorescence by the FOM or the CLM, which is an optical microscope, are easily superimposed, so that the observing or the analyzing can be performed.

In the present embodiment, an example in which the SEM 1802, the CLM 1803, and the FOM 1804 are connected to the first server 1805 is shown. Alternatively, the transmission microscope, the epi-illumination microscope, the phase contrast microscope, or the like can be similarly connected to the first server 1805.

The observation system 1801 is connected to a second server 1815, which is an information processing apparatus for executing the machine learning of the first embodiment, via a second network 1814. The second network 1814 is, for example, the Internet. The second server 1815 functions as an attachment condition estimation system for a tissue section.

The second server 1815 includes an interface 1816, a computing device 1817, a memory 1818, and a storage 1819 that are connected to a bus 1820. Further, the second server 1815 may be a virtual server. The interface 1816 is connected to the second network 1814. The computing device 1817 includes a CPU and a graphics processing unit (GPU). The computing device 1817 includes the GPU so that machine learning computation can be performed efficiently.

FIG. 18 further shows a wireless device 1820 connected via the second network 1814 and a terminal 1821 wirelessly connected to the wireless device 1820. The terminal 1821 is, for example, a tablet terminal having a camera function. The terminal 1821 includes a display device on which a graphical user interface (GUI) 1822 is displayed, and an output result of a learned model from the second server 1815 is displayed the graphical user interface (GUI) 1822.

FIG. 19 shows a functional block diagram of the terminal 1821 and the second server 1815 that is an attachment condition estimation system. The second server 1815 that is an attachment condition estimation system includes an input and output receiving unit 4101 and a selector 4102. Further, the second server 1815 includes at least one learned model stored in the storage 1819 that is a storage medium, for example, includes a first learned model 4103, a second learned model 4104, a third learned model 4105, and a fourth learned model 4106. The terminal 1821 includes an input and output receiving unit 4107, a user interface unit 4108, and an image capturing unit 4109.

The input and output receiving unit 4101 functions as an interface, receives an input such as image data from the terminal 1821, and further receives an output of the learned model from the selector 4102 and outputs the output to the terminal 1821. Based on identification information from the terminal 1821, the selector 4102 selects a learned model associated with the identification information as a learned model to be used. In the example of FIG. 19, the selector 4102 selects the learned model to be used from the first learned model 4103, the second learned model 4104, the third learned model 4105, and the fourth learned model 4106.

The input and output receiving unit 4107 outputs an image from the image capturing unit 4109 and an input from the user interface unit 4108 to the second server 1815, and receives an output of the learned model from the second server 1815. In addition to the GUI 1822, the user interface unit also can input and output audio. The image capturing unit 4109 is implemented by, for example, the camera function of the tablet terminal. The camera function may be provided with a macro mode and a macro lens.

The second server 1815 includes a database 3401 shown in FIG. 20(a) inside the storage 1819. The database 3401 stores information on a surface treatment 3402b of the microscope slide, information on heating 3402c during extension of the tissue section on the microscope slide, information on a staining method 3402d, information on a microscope 3402e to be used, and path information on image files (storage destinations of image files) 3402f in association with identification information 3402a on images such as optical microscope images of tissue sections stained by the H&E staining, which are observed in a transmitting observation mode of the FOM 1804, and images of tissue sections having a thickness of 15 to 50 μm and stained with a heavy metal based staining agent, which are captured by the SEM 1802 or the like. Since the identification information 3402a on the images is associated with the path information 3402f on the image files, which is information indicating the storage destinations of the images in the storage 1819, the identification information 3402a is associated with the image data of the images.

For example, the information on the surface treatment 3402b of the microscope slide can store corresponding reference numerals by associating with the reference numerals, for example, associating the untreated glass slide with "0", associating the coating of polylysine on the untreated glass slide with "1", associating the coating of aminosilane on the untreated glass slide with "2", associating the introduction of the unevenness by the reactive ion etching shown in the first embodiment with "3", associating the coating of polylysine on the front surface on which the unevenness is introduced by the reactive ion etching as shown in the first embodiment with "4", associating the coating of aminosilane on the front surface on which the unevenness is introduced by the reactive ion etching as shown in the first embodiment with "5", and associating an improvement proposal of attachment conditions based on the use of the microscope slide subjected to the RIE treatment in the case of the image that shows tan artifact as shown in the first embodiment with "6".

For example, the information on the heating 3402c during extension of the tissue section on the microscope slide may be information on whether to heat at a relatively high temperature within a range of −10° C. from a melting point of the paraffin used for embedding. The case of heating at 50° C. for 10 seconds on the microscope slide described in NTL 1 can be associated with "1", and the case without heating can be associated with "0".

For example, the information on the staining method 3402d may be information that the case of the image obtained by the H&E staining is associated with "0", the case of the image stained with a heavy metal is associated with "1", and the case of an image obtained by immunostaining is associated with "2".

For example, the information on the microscope 3402e to be used may be information that the case of the optical microscope is associated with "0", the case of the image observed by the scanning electron microscope is associated with "1", the case of a scanning electron microscope provided with a stage capable of tilting a sample, which is used for such a case where a tissue section stained with a heavy metal is observed in an oblique direction using the scanning electron microscope, is associated with "2", and the case of a scanning electron microscope equipped with a four-segmented BSE detector that is used for a topographic image is associated with "3".

The data stored in the database 3401 is input from a terminal provided in an image capturing device such as the FOM 1804 and the SEM 1802 or the first server 1805. When the machine learning is performed on images obtained by observing tissue sections of organs with the training data 3502 using the surface treatment information on the microscope slide used for attaching the tissue sections as the correct answer as shown in the first embodiment, the computing device 1817 can generate a learned model using training data generated by labeling the images with selection information on the surface treatment to the microscope slide from a set of the path information 3402f on the image files for reading out the image data and the information on the surface treatment 3402b, and can store the generated learned mode in the storage 1819.

The second server 1815 uses the generated learned model, for example, to receive an input of an image, in which attachment conditions of the tissue section are unknown, obtained by the camera of the terminal 1821 from a user, and outputs an output from the learned model to the terminal 1821 via the interface 1816. The output to the terminal 1821 may be, for example, an output that only shows a most probable surface treatment from the learned model, or may show at least a plurality of upper-ranked surface treatments attached with information on probability from the learned model. The terminal 1821 displays the information on a recommended surface treatment from the learned model on the GUI 1822.

FIG. 21(a) shows a GUI 4401 as an example of the GUI 1822 of the terminal 1821. The GUI 4401 includes an image display region 4402 that displays a microscope image captured by the camera of the terminal 1821, a condition receiving portion 4403 that receives the input of image capturing conditions of the microscope image to be transmitted to the second server 1815 that is an attachment condition estimation system, a capture button 4404 that executes the image capturing of the microscope image with the camera of the terminal 1821, a transmit button 4405 that transmits captured image data and input image capturing conditions to the second server 1815, and a display portion 4406 that displays the output result of the learned model transmitted from the second server 1815.

The condition receiving portion 4403 receives, for example, information on the microscope used for the image capturing of the microscope image by the camera of the terminal 1821. In an example of FIG. 21(a), the microscope used can be selected from the SEM and the optical microscope. The selection of the SEM or the optical microscope in the condition receiving portion 4403 is used as identification information for the selection of the learned model in the selector 4102. Here, in the example of FIG. 21(a), based on the information on the microscope 3402e used by database 3401, the training data is created by using each of the SEM image and the optical microscope image and is machine-learned, and a learned model is generated for each of the SEM image and the optical microscope image in advance. Therefore, the accuracy of outputs of the learned model for the SEM image that is often expressed in grayscale and the learned model for the optical microscope image that is often expressed in color like the image obtained by the H&E staining can be improved.

Operations of the second server 1815 will be described with reference to the flowchart of FIG. 22. The second server 1815 is an attachment condition estimation system using the learned models generated according to the present embodiment. In step S4201, the input and output receiving unit 4102 of the second server 1815 receives, from the terminal 1821, the image data of the microscope image capture by the camera of the terminal 1821 and information on the microscope used as the identification information for the selection of the learned models received by a condition receiving portion 4403.

Next, in step S4202, the selector 4102 selects the learned model learned with the corresponding training data based on the identification information for the selection of the learned models received by the input and output receiving unit 4102 in step S4201, inputs the received image data to the selected learned model, and outputs the output from the learned model to the input and output receiving unit 4101.

In step S4203, the input and output receiving unit 4101 transmits the output from the learned model received from the selector 4102 in step S4202 to the terminal 1821.

Based on the output from the learned model, a recommended method for attaching a section to a microscope slide is output to the display portion 4406 that displays the output result of the learned model as shown in FIG. 21(a).

FIG. 21(a) shows an example of an output that the glass slide 401 etched with the reactive ions is recommended.

As described above, the user can obtain the recommended surface treatment information on the microscope slide from the images that are captured in the past and whose attachment conditions of the tissue sections are unknown. Therefore, the surface treatment of the microscope slide to be used can be selected based on the obtained information, and the tissue section can be efficiently attached. When an artifact can be seen in the image from the user, the user can obtain an improvement proposal of the attachment conditions for the use of the microscope slide subjected to the RIE treatment from the second server 1815. In the present embodiment, the user inputs the image obtained by the camera of the terminal 1821. Alternatively, the user may also select one from the stored images via the GUI 1822 and input the image.

By creating training data from a set of the information on the surface treatment 3402b and the information on the heating 3402c during the extension with respect to the path information 3402f on the image files, and generating a learned model, it is possible to output recommended combination information including the surface treatment information on the microscope slide and the information on the heating during the extension of the tissue section in response to the image input from the user.

As a result of this output, the user can obtain recommended information on the heating during the extension from the learned model in addition to the surface treatment on the microscope slide. Further, an attachment work by the user becomes efficient. Alternatively, by creating the training data from the set of the path information 3402*f* on the image files and the information on the surface treatment 3402*b* and from the set of the path information 3402*f* on the image files and the information on the heating 3402*c* during the extension, generating the learned models by the second server 1815, and combining the outputs of the learned models in response to the image input by the user, it is possible to output to the user the recommended combination information on the surface treatment on the microscope slide and the heating during the extension of the tissue section in response to the image input from the user from the second server 1815.

Similarly, when training data is created from a set of the path information 3402*f* on the image files and the information on the staining method 3402*d* and a learned model is generated, information on a recommended staining method in response to the image input by the user is output. When training data is created from a set of the path information 3402*f* on the image files and the information on the microscope 3402*e* to be used and a learned model is generated, information on a recommended microscope in response to the image input by the user is output. By combining these outputs with the above-described recommended information on the attachment conditions, not only the recommended information on the attachment conditions but also the recommended information on the staining method and the microscope to be used can be added to the output from the second server to the terminal 1821, and the convenience for the user can be further enhanced.

According to the above description, the machine learning using correct answer information corresponding to the image as the training data is shown, and it is also possible to learn data including the information on the organs from which the tissue sections are obtained with the training data using information including the surface treatment information on the microscope slide to be used for attaching the tissue section as the correct answer and generate the learned model, input information including organ information on the sample to be observed in the generated learned model, and then output information on a recommended attachment method, which includes the surface treatment on the microscope slide to be used, to the learned model. The user can select the attachment method that includes the surface treatment on the microscope slide to be used based on the output information. Therefore, it is possible to obtain a recommended method for attaching the tissue section even when there is no image.

Specifically, a database 3403 shown in FIG. 20(*b*) is stored in the storage 1819 in association with the database 3401. When the data of database 3401 is stored, the data stored in the database 3403 is stored in association with the data in the database 3401. Therefore, information on species 3404*a* from which the tissue section is derived, information on an organ 3404*b* from which the tissue section is derived, information on fixing strength 3404*c* of the sample, information on a thickness 3404*d* to which the tissue section is cut out, a comment 3404*e*, which is text data in which information on the staining agent used in the image capturing and information such as the presence or absence of a tissue lesion and a state of the lesion are freely described, are stored in the storage 1819 in correspondence with the identification information 3402*a* on the images and the information on the surface treatment 3402*b* of the microscope slide. The information on the fixing strength 3404*c* of the sample and the information on the thickness 3404*d* to which the tissue section is cut out are related to the hardness of the tissue section. When the sample is strongly fixed, the sample is hard, and the adhesiveness of the tissue section to the microscope slide is reduced. When the thickness to which the tissue section is cut out is large, the sample is also hard, and the adhesiveness of the tissue section to the microscope slide is reduced. Therefore, by using at least one of the information on the fixing strength 3404*c* of the sample and the information on the thickness 3404*d* to which the tissue section is cut out for the machine learning, it is possible to improve the output accuracy of the recommended surface treatment information on the glass slide from the learned model. Regarding the information on the species 3404*a* from which the tissue section is derived, there is not many differences in the adhesiveness of the tissue section to the microscope slide due to different species, but it is considered that the improvement of the output accuracy of the surface treatment information on the recommended glass slide from the learned model can be expected by using the information on the species 3404*a* for the machine learning. At least one of the information on the surface treatment 3402*b*, the information on the heating 3402*c* during the extension, the information on the staining method 3402*d*, the information on the microscope 3402*e* to be used, the information on the species 3404*a*, the information on the organ 3404*b*, the information on the fixing strength 3404*c*, and the information on the thickness 3404*d* to which the tissue section is cut out can be used as information extracted from the text data of the comment 3404*e* by a technique such as morphological analysis.

The information on the species 3404*a* and the information on the organ 3404*b* can store corresponding reference numerals by associating with the reference numerals with the species and the organs, for example, by associating a rat with "1", associating a pig with "2", associating the skin with "1", associating the lung with "2", and associating the kidney with "3".

In the information on the fixing strength 3404*c* related to the hardness of the tissue section, a case of containing 0.5% or more of glutaraldehyde for the fixing may be associated with "1", and a case of not containing 0.5% or more of glutaraldehyde for the fixing may be associated with "0".

The information on the thickness 3404*d* to which the tissue section is cut out can store corresponding reference numerals by associating with ranges of thickness, for example, by associating less than 10 μm with "0", and associating 10 μm or more and less than 50 μm with "1". In FIG. 20(*b*), registered contents into the comment 3404*e* are path information on the files of the comments, which is information indicating storage destinations of electronic data of the comments in the storage 1819.

In order to include at least information on the organ from which the tissue section is derived instead of the image data obtained by capturing the above-described microscope image, for example, input information is freely selected from the information on the species 3404*a* from which the tissue section is derived, the information on the organ 3404*b*, the information on the fixing strength 3404*c*, the information on the thickness 3404*d* to which the tissue section is cut out, and the comment 3404*e*. A learned model can be generated using the training data obtained by labelling the freely selected input information with the information on the surface treatment 3402*b* on the microscope slide or with a combination of the information on the surface treatment 3402*b* and the information on the heating 3402*c* during the extension.

For example, the training data can be obtained by labeling the input of the combination of the information on the species 3404*a* from which the tissue section is derived and the information on the organ 3404*b* with the information on the surface treatment 3402*b* on the microscope slide. Further, when the information on the fixing strength 3404*c* and the information on the thickness 3404*d* to which the tissue section is cut out are combined as the input, the output accuracy of the learned model can be improved. In such a case, for example, the training data uses the information on the species 3404*a* from which the tissue section is derived, the information on the organ 3404*b*, the information on the fixing strength 3404*c* and the information on the thickness 3404*d* to which the tissue section is cut out as the input, and uses the information on the surface treatment 3402*b* on the microscope slide as the output. When a plurality of learned models are prepared for each of these training data, as described above, each training data is associated with the identification information, and the learned model to be used is selected by the selector 4102 based on the identification information from the terminal 1821. A learned model for a normal tissue also can be generated by extracting only the data of the case where there is no lesion from the information on the presence or absence of the lesion in the comment 3404*e* and creating training data.

FIG. 21(*b*) shows a GUI 4407 as an example of the GUI 1822 of the terminal 1821. The GUI 4407 includes an input portion 4408 for the information on the species from which the tissue section is derived, an input portion 4409 for the information on the organ from which the tissue section is derived, a condition receiving portion 4410 that receives an input of preparation conditions to be transmitted to the second server 1815 that is an attachment condition estimation system, a transmit button 4411 that transmits data input via the GUI 4407 to the second server 1815, and a display portion 4412 for the output result of the learned model to be transmitted from the second server 1815. In FIG. 21(*b*), "rat" is shown in the input portion 4408 as an input example, and "kidney" is shown in the input portion 4409 as an input example. In the example of FIG. 21(*b*), the condition receiving portion 4410 can select and input the information on the fixing strength that whether glutaraldehyde is 0.5% or more and the information on the thickness to which the tissue section is cut out that whether the thickness is 10 μm or more.

The operations of the second server 1815 will be described with reference to the flowchart of FIG. 22, the second server 1815 is an attachment condition estimation system using the learned models generated according to the present embodiment.

In step S4201, the input and output receiving unit 4102 of the second server 1815 receives the information on the species from which the tissue section is derived, the information on the organ from which the tissue section is derived, and the preparation conditions, which are input to the terminal 1821, from the terminal 1821. The input and output receiving unit 4102 also receives the identification information on the learned model to be used from the terminal 1821.

Next, in step S4202, based on the identification information received by the input and output receiving unit 4102 in step S4201, the selector 4102 selects the learned model learned with the training data corresponding to the identification information, inputs the received data to the selected learned model, and outputs the output from the learned model to the input and output receiving unit 4101. The learned model selected at this time is obtained by learning with the training data obtained by labeling the input of the combination of the information on the species 3404*a* from which the tissue section is derived, the information on the organ 3404*b*, the information on fixing strength 3404*c*, and the information on the thickness 3404*d* to which the tissue section is cut out with the information on the surface treatment 3402*b* on the microscope slide.

In step S4203, the input and output receiving unit 4101 transmits the output from the learned model received from the selector 4102 in step S4202 to the terminal 1821.

Based on the output from the learned model, a recommended method for attaching a tissue section to a microscope slide is output to the display portion 4412 that displays the output result of the learned model as shown in FIG. 21(*b*). FIG. 21(*b*) shows an example of an output that the glass slide 401 etched with the reactive ions is recommended.

As described above, by inputting information including at least information on the organ to be captured via the GUI 1822 instead of inputting the image, the user can obtain the output, which includes at least the recommended surface treatment information on the microscope slide, regarding the recommended method for attaching the tissue section from the learned model even when there is no image. Therefore, the attachment work of the tissue section by the user is easy. When the information including the information on the organ that the user wants to capture an image thereof is input via the GUI 1822, a chatterbot can also be used in addition to a text input and a selection from given choices by the user from the GUI, and it is also possible for the second server 1815 to extract, for example, the information on the organ of the sample to be captured from the information from the user by the morphological analysis, encode the extracted information like the above-described database 3401 and the database 3403 and use the extracted information as the input to the learned model, and output for the recommended method for attaching the tissue section.

Instead of using the learned model, it is also possible to output the recommended attachment conditions for the tissue section by rule-based programming. In order to include at least the information on the organ 3404*b*, for example, based on the information on the species 3404*a* from which the tissue section is derived, the information on the organ 3404*b*, the information on the fixing strength 3404*c*, and the information on the thickness 3404*d* to which the tissue section is cut out, the second server 1815 can, for example, output the attachment conditions for the tissue section recommended by majority decision, or output the attachment conditions for multiple tissue sections whose registration number of data to the database 3401 and the database 3403 is high from the information on the surface treatment 3402*b* on the microscope slide for each combination of these conditions. On the other hand, when the learned model is used, the recommended attachment conditions for the tissue section can be output even regarding an input of a combination that is not registered in the database 3401 or the database 3403.

FIGS. 20(*a*) and 20(*b*) are described on the premise of the paraffin-embedded section. Alternatively, in the case of the frozen section, for example, it is possible to create a database by excluding items of conditions specific to the paraffin embedding such as the information on the presence or absence of the heating at a relatively high temperature within a range of −10° C. to the melting point of the paraffin used for embedding during the extension, and perform the machine learning in the same manner as described above.

Fifth Embodiment

The fifth embodiment of the invention will be described with reference to FIGS. 23 to 26. The present embodiment is different from the second embodiment mainly in that a structure of a mask member is provided in both a longitudinal direction and a lateral direction of a glass slide.

A flow of a method for manufacturing a microscope slide of the present embodiment will also be described with reference to FIG. 11 of the second embodiment.

In the present embodiment, in step S601, a glass slide 2001 shown in FIG. 23 is prepared and placed in the chamber 302 of the RIE apparatus 301. Specifically, similar to the first embodiment, the glass slide 2001 is placed such that a back surface without a frosted portion 2002 faces the lower electrode 303b. As a result, a front surface with the frosted portion 2002 is dry-etched. Here, the glass slide 2001 contains silicon dioxide as the main component.

The front surface of the glass slide 2001 is silane-coated as in the second embodiment. In the present embodiment, the front surface of the glass slide 2001 is coated with 3-aminopropyltrimethoxysilane. The glass slide 2001 has the frosted portion 2002 on one surface. Further, the frosted portion 2002 is colored. The frosted portion 2002 is colored, for example, in pink. Further, on the front surface of the glass slide 2001 on which the frosted portion 2002 is provided, alignment markers 2003-1 to 2003-4 are provided.

As shown in FIG. 24, a mask member 2101 is disposed on the glass slide 2001 to cover a part of the frosted portion 2002 and the alignment markers 2003-1 to 2003-4. Here, one side of the mask member 2101 on the frosted portion 2002 and one side of the mask member 2101 on the glass are aligned and disposed on a straight line as shown in FIG. 24.

Next, in step S602, in order to remove the silane coat on parts of the glass slide 2001 that are not covered with the mask member 2101, the oxygen gas is introduced into the chamber 302 of the RIE apparatus 301, the plasma is generated between the upper electrode 303a and the lower electrode 303b, and surfaces of the parts of the front surface of the glass slide 2001 that are not covered with the mask member 2101 are subjected to ashing.

In the following step S603, the $CHF_3$ gas is introduced, the plasma is generated between the upper electrode 303a and the lower electrode 303b, and the parts of the front surface of the glass slide 2001 that are not covered with the mask member 2101 are etched with reactive ions.

Next, in step S604, in order to remove a residue left on the front surface of the glass slide 2001, the oxygen gas is introduced into the chamber 302 of the RIE apparatus 301, the plasma is generated between the upper electrode 303a and the lower electrode 303b, and the surfaces of the glass slide 2001 that are etched in step S603 are subjected to ashing. After the processing of step S604, the mask member 2101 is removed from the microscope slide.

As described above, the glass slide that is a microscope slide of the present embodiment can be manufactured.

FIG. 25 shows a glass slide 2201 manufactured in the present embodiment. In the glass slide 2201 manufactured in the present embodiment, as a result of etching with the reactive ions, unevenness is introduced into a region 2203a that is not covered with the mask member 2101. The region 2203a etched with the reactive ions shows high hydrophilicity with a contact angle to water of about 10 degrees or less than 10 degrees. On the other hand, since the silane coat by 3-aminopropyltrimethoxysilane is maintained, a contact angle to water in a region 2203b that is covered with the mask member 2101 is larger than the contact angle to water in the region 2203a. A frosted portion 2202a that is not covered with the mask member 2101 is less colored than the frosted portion 2002 of the glass slide 2001 prepared for manufacturing as a result of the above-described reactive ion etching treatment. Since the frosted portion 2202a is lightly colored, it can be identified that the glass slide is subjected to the above-described reactive ion etching treatment. Further, since a frosted portion 2202b that is covered with the mask member 2101 maintains an original color, the frosted portion 2202b can be visually identified from the frosted portion 2202a. Further, a boundary 2204 between the region 2203a etched with the reactive ions and the region 2203b that is covered with the mask member 2101 can be visually inferred from a boundary between the frosted portion 2202a and the frosted portion 2202b.

In the present embodiment, it is easy to guide a section floating on the water surface to the region 2203a that is more likely to be wet due to having higher hydrophilicity than that of the peripheral region 2203b. As a result, regardless of skills of a worker, as shown in FIG. 26, a tissue section 2301 can be placed in the region 2203a on the glass slide 2201 with good reproducibility. Here, the region 2203a of the front surface that is not covered with the mask member 2101 is subjected to the above-mentioned reactive ion etching treatment up to the end of the glass slide 2201, and thus the region 2203a has high hydrophilicity up to the end of the glass slide 2201 at a base edge of a trapezoidal shape of the region 2203a. Therefore, when the section floating on the water surface is placed on the glass slide 2201, the water surface is hardly disturbed, and it is easy to place a paraffin-embedded section having a thickness of 15 to 50 μm to be stained with a heavy metal-based staining agent and a paraffin-embedded section to be stained by the H&E staining on the microscope slide. The end of the glass slide may be formed by chamfering.

In the present embodiment, since the alignment markers 2203-1 to 2203-4 are further formed in the region 2203b along the boundary 2204, a position of an observation region can be aligned between different microscope observations by using the alignment markers 2203-1 to 2203-4. For example, an image morphologically observed with the transmission microscope, the epi-illumination microscope, or the phase contrast microscope, which is an optical microscope, an image morphologically observed with high resolution with the SEM, which is a charged particle beam apparatus, and an image observed with fluorescence by the FOM or the CLM, which is an optical microscope, are easily superimposed, so that the observing or the analyzing can be performed.

In the present embodiment, an example in which 3-aminopropyltrimethoxysilane is used for the silane coating of a substrate to be prepared is shown. Alternatively, in order to obtain the water repellency, octadecyltrimethoxysilane, which is a silane coupling agent having an alkyl group, can be used.

FIG. 27 shows a microscope slide 3001 manufactured by changing a shape of the mask member 2101 and changing a direction of an unmasked part. By changing the shape of the mask member 2101, in the microscope slide 3001, a longitudinal direction of the unmasked reactive ion-etched region 2203a surrounded by the U-shaped boundary 2204 in the region 2203b that is masked and not subjected to the reactive ion etching is aligned with a longitudinal direction of the microscope slide 3001. As a result, the microscope slide 3001 is also suitable for attaching a serial tissue section.

Sixth Embodiment

The sixth embodiment of the invention will be described with reference to FIGS. 28 to 31 and FIGS. 32(a) to (c). The present embodiment is different from the second embodiment mainly in that the present embodiment includes a step of forming the alignment markers and that the microscope slide has a grid.

FIG. 28 is a diagram showing a glass slide 3601 of the present embodiment. A front surface of the glass slide 3601 is not silane-coated, which is different from the second embodiment. Similar to the first embodiment, the glass slide 3601 has a frosted portion 3602 on one surface, and the frosted portion 3602 is colored. The frosted portion 3602 is colored, for example, in pink. The glass slide 3601 has a mark 3604-1 and a mark 3604-2 for enhancing the reproducibility of a position when a tissue section is placed. The frosted portion 3602, the mark 3604-1 and the mark 3604-2 can be formed of a colored resin film containing a colorant by color urethane printing or the like.

Further, on the front surface of the glass slide 3601 on a side on which the frosted portion 3602 is provided, alignment markers 3603-1 to 3603-6 are provided. The alignment markers 3603-1 to 3603-6 can be provided as cavities on the front surface of the glass slide 3601 on the side on which the frosted portion 3602 is provided by, for example, laser marking, FIB etching, or a lithography technique. For example, the alignment markers 3603-1 to 3603-6 can be formed by printing a resin while printing the frosted portion 3602 with a resin such as the color urethane.

A flow of a method for manufacturing a microscope slide of the present embodiment will be described with reference to FIG. 1.

In the present embodiment, in step S101, a glass slide on which the frosted portion 3602, the mark 3604-1, the mark 3604-2 and the alignment markers 3603-1 to 3603-6 shown in FIG. 28 are provided is prepared and is placed in the chamber 302 of the RIE apparatus 301. Specifically, the glass slide 3601 is placed such that a back surface without the frosted portion 3602 faces the lower electrode 303b. As a result, the front surface with the frosted portion 3602 is dry-etched. Here, the glass slide 3601 contains silicon dioxide as the main component.

In the following step S102, the CHF₃ gas is introduced, the plasma is generated between the upper electrode 303a and the lower electrode 303b, and the front surface of the glass slide 3601 is etched with the reactive ions.

Next, in step S103, in order to remove a residue left on the front surface of the glass slide 3601, the oxygen gas is introduced into the chamber 302 of the RIE apparatus 301, the plasma is generated between the upper electrode 303a and the lower electrode 303b, and the front surface of the glass slide 3601 that is etched in step S102 is subjected to the asking. As described above, the glass slide 3601 that is a microscope slide of the present embodiment can be manufactured.

The glass slide 3601 can be provided with the grid. FIG. 29 and FIG. 30 shows examples of the grid. FIG. 29 is a diagram showing the back surface of the glass slide 3601. A grid 3605 is provided on the back surface of the glass slide 3601. The grid 3605 is formed on a back side of a region where a tissue section is placed on a right side of the mark 3604-1 and the mark 3604-2 in FIG. 28.

FIG. 30 is an enlarged view of the grid 3605. As shown in FIG. 30, fractions divided by the grid are provided with information indicating the positions of the fractions by a method such as printing. The information indicating the positions of the fractions can be printed in combination with characters that are inverted in at least one of up and down directions or left and right directions so that the characters appear in directions that are easy to observe when observed with various microscopes. For example, in a fraction 3606, characters "FG51" assigned to the fraction, characters inverted in the up and down direction, characters inverted in the left and right direction, and characters inverted in the up and down directions and the left and right directions are shown so that the characters appear in directions that are easy to observe when observed with various microscopes. In addition to differences in appearances of the images of the microscopes, the inverted characters are useful when observed by rotating an orientation of the microscope slide. The first two alphabet letters of the "FG51" indicate a row of the grid. Since the first two alphabet letters are "FH" in one row above the fraction 3606, the "FH51" is assigned to the fraction. The remaining two letters "51" of the "FG51" indicate a column of the grid. Since the remaining two characters are "50" in a left column of the fraction 3606, the "FG50" is assigned to the fraction. At an end of the grid 3605, the characters "FG" and "FH" are printed as information 3607 indicating rows of the fractions, and the characters "50" and "51" are printed as information 3608 indicating the columns of the fractions. The characters of the information indicating the lines and the fractions of the grid 3605 can be printed with an ink having resistance to a liquid such as xylene used for observing a tissue section.

As a result, the grid 3605 is provided on the back side of the region to which the tissue section is attached, and thus an observer can easily identify the location of the tissue section observed with the optical microscope by focusing on the grid 3605 on the back surface and reading the character information shown in the fractions. In this case, in order to avoid a collision between an objective lens and the glass slide, the thickness of the glass slide is preferably less than 1 mm.

Figure 31A:
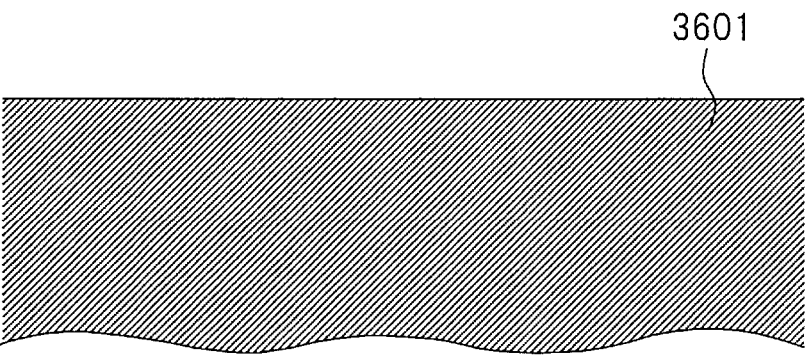
FIG. 31(a) is a schematic cross-sectional view showing a process of manufacturing the microscope slide of the sixth embodiment.
Figure 31B:
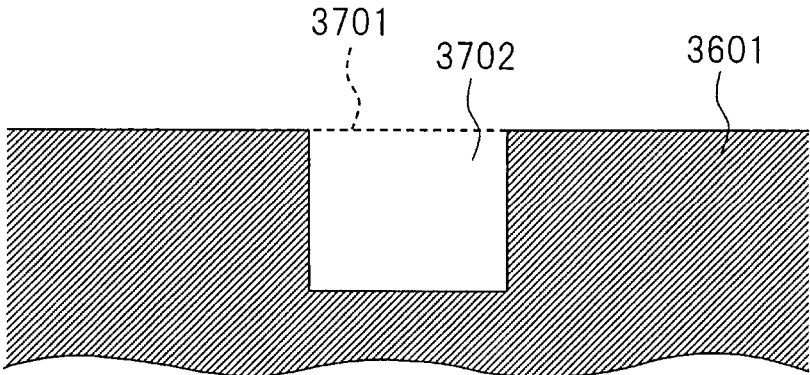
FIG. 31(b) is a schematic cross-sectional view showing the process of manufacturing the microscope slide following FIG. 31(a)
Figure 31C:
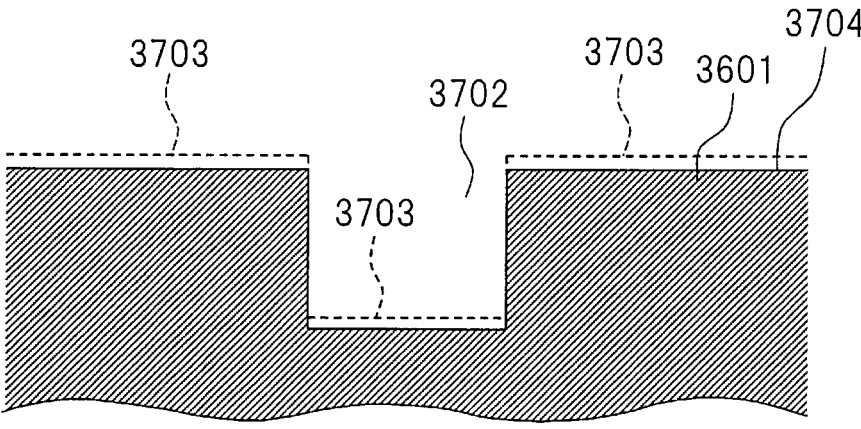
FIG. 31(c) is a schematic cross-sectional view showing the process of manufacturing the microscope slide following FIG. 31(b).

FIGS. 31(a) to 31(c) show schematic diagrams of a cross section in each manufacturing step when the alignment markers 3603-1 to 3603-6 are provided as the cavities. FIG. 31(a) is a schematic diagram of a cross section of the glass slide 3601 before the cavities are provided. FIG. 31(b) is a schematic diagram of a cross section after a cavity 3702 is provided by the laser marking, the FIB etching, the lithography technique or the like in order to form the alignment markers 3603-1 to 3603-6. The cavity 3702 is formed by cutting in a depth direction from a position 3701 of the front surface before the formation by using the lithography technique or the like. A shape of the cavity 3702 seen from above the glass slide 3601 may be a shape of a cross groove as the alignment markers 3603-1 to 3603-6 in FIG. 28, or may be a triangle, a square, or other shapes. Step S102 is performed in a state shown in FIG. 31(b). FIG. 31(c) is a diagram showing changes in the cross section of the cavity 3702 and its surroundings in step S102. The RIE is a method of anisotropic etching. During a change from a position 3703 on the front surface of the glass slide 3601 before step S102 to a position 3704 on the front surface of the glass slide 3601 after step S102, a change in shape of the cavity 3702 seen from above the glass slide 3601 is small since the change is mainly in the depth direction. For example, the depth of the cavity 3702 is several microns, and the magnitude of the change from the position 3703 on the surface to the position 3704 on the front surface of the glass slide 3601 after step S102 is at a submicron level. Therefore, it is possible to provide the alignment markers 3603-1 to 3603-6 with high accuracy. Therefore, it is possible to achieve an alignment with high accuracy of the observation region between different microscope observations, which uses the alignment markers 3603-1 to 3603-6.

Here, since the alignment markers 3603-3 to 3603-6 are in the region where the tissue section is attached, a part of the alignment markers may be hidden by the tissue section. However, by using three of the alignment markers 3603-1 to 3603-6 that are not hidden in the tissue section as alignment points, the alignment can be achieved with high accuracy.

As shown in FIG. 28, the alignment markers 3603-1 to 3603-6 are arranged such that by setting the number of the markers to be aligned on a straight line to two, even when any three of the alignment markers 3603-1 to 3603-6 are used as the alignment points, the three markers are not aligned on a straight line.

As described above, by preparing a substrate, forming cavities to be alignment markers on a front surface of the substrate, and etching the front surface of the substrate including a region of the formed cavities with reactive ions, it is possible to achieve the alignment with high accuracy of the observation region. In particular, as shown in FIG. 31(*c*), by setting the depth of the cavity 3702 larger than the depth at which the glass slide 3601 is cut in step S102, it is possible to make the change in the shape of the cavity 3702 in step S102 smaller, and it is possible to achieve the alignment with higher accuracy.

Since finishing of the manufacturing process of the glass slide 3601 is the ashing in step S103, a microscope slide can be provided in an ideal state where foreign matters on the surface are removed by the ashing.

FIG. 32 shows a glass slide 3609 as a modification of the alignment markers and the grid. The glass slide 3609 and the glass slide 3601 are different in material and shape of alignment markers 3610-1 to 3610-6, and in that information 3607 indicating rows of fractions and information 3608 indicating columns of the fractions are provided on a front surface of the slide glass 3609 on a side where the tissue section is attached instead of the grid 3605.

Figure 33A:
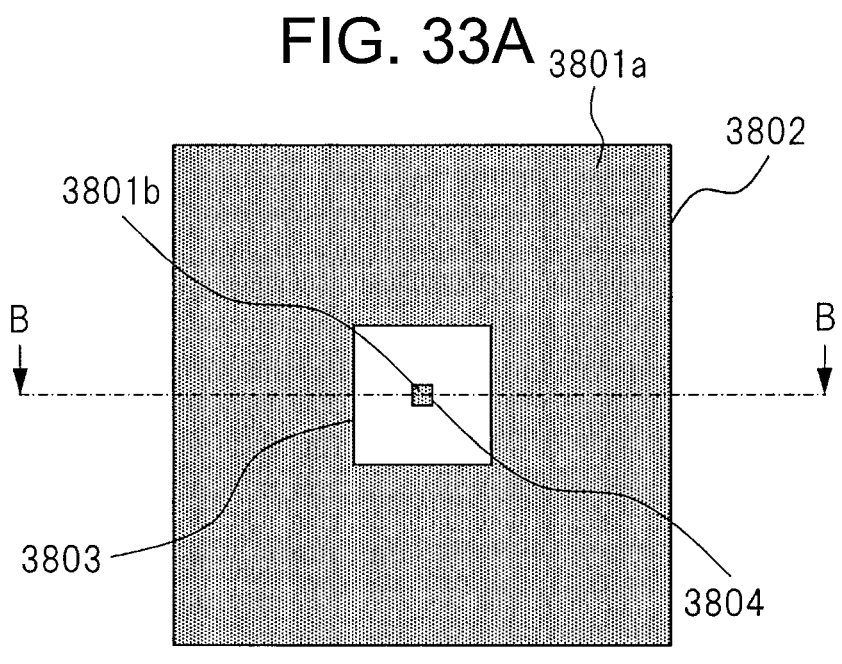
FIG. 33(a) is a diagram showing a modification of the microscope slide of the sixth embodiment.
Figure 33B:
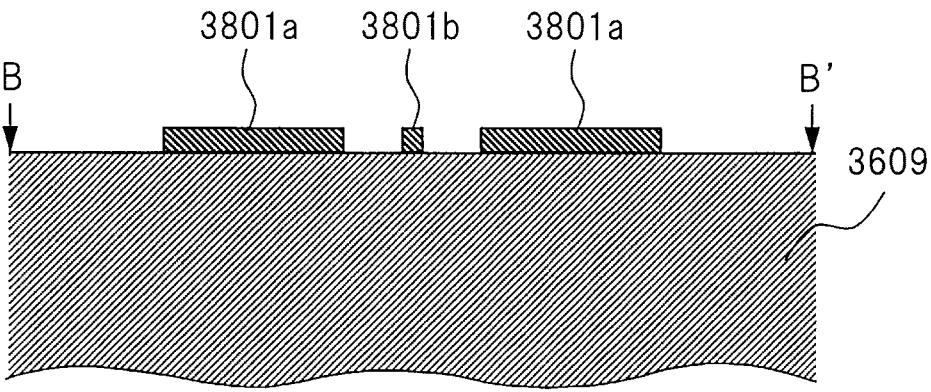
FIG. 33(b) is a schematic cross-sectional view showing a process of manufacturing a microscope slide according to the modification of the sixth embodiment.
Figure 33C:
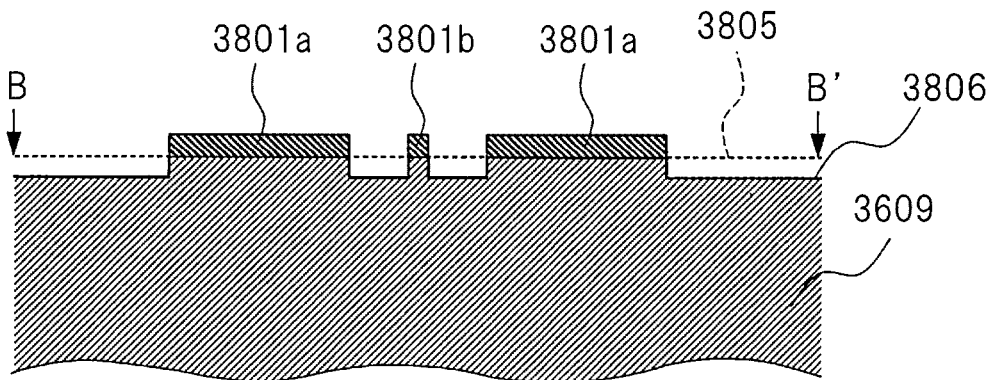
FIG. 33(c) is a schematic cross-sectional view showing the process of manufacturing the microscope slide following FIG. 33(b).

FIG. 33(*a*) shows a modification of the alignment marker provided for each of the alignment markers 3610-1 to 3610-6. Instead of the crosses of the alignment markers 3603-1 to 3603-6 of the glass slide 3601 in FIG. 28, an alignment mark 3801*a* and an alignment mark 3801*b* in FIG. 33(*a*) are arranged. The alignment mark 3801*a* and the alignment mark 3801*b* can be formed of a metal film of an element having an atomic number larger than that of silicon contained in the glass slide that is the substrate, such as titanium and chromium. As a result, the alignment marks are observed with a high contrast in a back-scattered electron image obtained by the SEM 1802 in a low vacuum. Center positions of the alignment mark 3801*a* and the alignment mark 3801*b* are the same. An outer circumference 3802 of the alignment mark 3801*a* functions as an alignment point for a low magnification, and an inner circumference 3803 functions as an alignment point for a medium magnification. An outer circumference 3804 of the alignment mark 3801*b* functions as an alignment point for a high magnification. The length of one side of the outer circumference 3802 of the alignment mark 3801*a* is, for example, 100 microns. The length of one side of the inner circumference 3803 of the alignment mark 3801*a* is, for example, 30 microns. The length of one side of the outer circumference 3804 of the alignment mark 3801*b* is, for example, 10 microns. The alignment mark 3801*a* and the alignment mark 3801*b* have a shape of square in FIG. 33(*a*), and may also have a shape of triangle.

FIG. 33(*b*) and FIG. 33(*c*) are schematic diagrams of a cross section of the alignment mark 3801*a* and the alignment mark 3801*b* in each manufacturing step. FIG. 33(*b*) and FIG. 33(*c*) are schematic diagrams of a cross section taken along a dashed-dotted line B-B' in FIG. 33(*a*).

FIG. 33(*b*) is a schematic diagram of a cross section of a stage in which the metal film to be the alignment mark 3801*a* and the alignment mark 3801*b* is formed on a substrate of the glass slide 3609 by vapor deposition or the lithography technique. Step S102 is performed in a state shown in FIG. 33(*b*).

FIG. 33(*c*) is a diagram showing a change in the cross section around the metal film to be the alignment mark 3801*a* and the alignment mark 3801*b* in step S102. The RIE is a method of the anisotropic etching. During a change from a position 3805 on the front surface of the glass slide 3609 before step S102 to a position 3806 on the front surface of the glass slide 3809 after step S102, the shapes of the alignment mark 3801*a* and the alignment mark 3801*b* are maintained since the change is mainly in the depth direction. Therefore, it is possible to provide the alignment markers 3610-1 to 3610-6 with high accuracy. Therefore, it is possible to achieve an alignment with high accuracy of the observation region between different microscope observations, which uses the alignment markers 3610-1 to 3610-6.

Since finishing of the manufacturing process of the glass slide 3609 is the asking in step S103, a microscope slide can be provided in an ideal state where the foreign matters on the surface are removed by the ashing.

In the back-scattered electron image of the low-vacuum scanning electron microscope, the alignment marks containing titanium or chromium having an atomic number higher than that of silicon as the main component of the substrate appear brightly, and thus the alignment marks are clearly observed and are advantageous for alignment with high accuracy.

In the ashing process of step S103, for example, even when the surfaces of the alignment mark 3801*a* and the alignment mark 3801*b* are oxidized, it is observed without any problem in the back-scattered electron image of the low-vacuum scanning electron microscope.

The alignment markers 3610-1 to 3610-6 can be useful, for example, in the correlative light and electron microscopy method (CLEM). For example, based on position information in which three of the alignment markers 3610-1 to 3610-6 are set as alignment marks for a targeted image region obtained by observing with an optical microscope such as the confocal laser microscope 1803, an SEM image of the corresponding image region can be easily obtained by controlling the XY stage 1808 and setting a scanning region for an electron beam on the sample by the SEM 1802. In addition, after the alignment with the optical microscope image by the CLEM, for example, as shown in FIGS. 3(*a*) to 3(*c*) of PTL 1, it is possible to further magnify and observe the image with the SEM in an order of a luminal structure of a renal corpuscle and tubules, a luminal structure of a renal glomerulus and a protruding structure of podocytes. In addition, a series of image capturing such as those in FIGS. 3(*a*) to 3(*c*) of PTL 1 that magnify an interest region can also be performed by artificial intelligence by using techniques of supervised learning, deep learning, image detection, image segmentation and the like.

When the image capturing is performed by artificial intelligence, the highly accurate position information in which three of the alignment markers 3610-1 to 3610-6 are obtained as the alignment marks is associated with the image obtained by the image capturing using artificial intelligence and is stored in the storage 1812 of the first server 1805, and then a person captures an image of the same region for a purpose of confirmation or the like. At this time, the position information can be used to capture an image easily. For example, in the case of the SEM 1802, by controlling the XY stage 1808 of the SEM 1802 and setting the scanning region by the electron beam on the sample by using the position information, it is possible to easily perform the image capturing in the same region as the image capturing region by artificial intelligence.

As shown in FIG. 32, in the glass slide 3609, the information 3607 indicating the rows of fractions and information 3608 indicating the columns of the fractions are provided around the region to which the tissue section is attached on the front surface of the glass slide 3609. As a result, even in the case of a microscope such as the scanning electron microscope by which the back surface cannot be observed, the location of the section observed by the microscope can be easily specified. At this time, although the grid is omitted because the grid overlaps with the tissue section, information on the fractions can be easily used by aligning an X-axis of the XY stage with an arrangement direction of the information 3608 indicating the columns of the fractions and a Y-axis with an arrangement direction of the information 3607 indicating the rows of the fractions.

Similar to the grid 3605, the information 3607 indicating the rows of the fractions and the information 3608 indicating the columns of the fractions in FIG. 32 can be printed with an ink having resistance to a liquid such as xylene used for observing a tissue section. In order to be clearly observed in a back-scattered electron image of the low-vacuum scanning electron microscope, the information may also be formed by using a metal film at the same time as the alignment mark 3801*a* and the alignment mark 3801*b*.

In the glass slide 3609, the grid 3605 on the back surface can be omitted. When the grid 3605 is further provided on the back surface, confusion can be prevented by using different symbols for specifying the fractions on the front surface and the back surface.

As a result of the etching with the reactive ions, unevenness is introduced onto the front surfaces of the glass slide 3601 and the glass slide 3609 manufactured in the present embodiment to which the tissue sections are attached. The front surface of the glass slide 3601 shows high hydrophilicity with a contact angle to water of about 10 degrees or less than 10 degrees. Since the change in the coloring of the frosted portion that is a colored film also occurs in the mark 3604-1 and the mark 3604-2 that are also colored films, the change in the coloring of the mark 3604-1 and the mark 3604-2 can also be used to identify that the glass slide is etched with the reactive ions as described above.

In the case of the glass slide 3601 and the glass slide 3609 of the present embodiment, the mark 3604-1 and the mark 3604-2 are targets for moving the tissue section 1002 in the direction of the arrow 1005 as shown in FIG. 15, and regardless of skills of a worker, the tissue section 1002 embedded with the paraffin 1101 can be placed at a desired position on the glass slide with good reproducibility as shown in FIG. 16.

Seventh Embodiment

The seventh embodiment of the invention will be described with reference to FIGS. 34 to 37. The first embodiment and the fourth embodiment described the machine learning using the training data obtained by labelling the image data of the tissue section stained by the H&E staining for the image capturing by the optical microscope or the image data of the tissue section stained with a heavy metal for the image capturing by the scanning electron microscope with the surface treatment information on the microscope slide to be selected. In the present embodiment, an example in which an appearance image of a cut surface of a biological sample is used instead of the image of the stained tissue section will be described.

FIG. 34 is a schematic diagram showing a state in which a sample block 3901 obtained by paraffin-embedding is cut by a cutter 3902 to cut out a tissue section. A cut surface 3903 of the biological sample at this time has a feature relating to the adhesiveness of the tissue section cut out to the microscope slide as a frosted glass appearance. The feature will be described below.

A tissue having a large amount of paraffin permeation has stronger light scattering due to the roughness of the cut surface 3903 on which the paraffin is permeated, and the cut surface 3903 shows a frosted glass appearance. As described above, the tissues of skin, lung and heart that are organs have high stretchability and high adhesiveness to the microscope slide have spaces between cells. A large amount of the paraffin is permeated into the spaces between cells, and the permeated paraffin shows the frosted glass appearance after cutting. In addition, in the case of the above-described brain tissue that is an example of the high adhesiveness to the microscope slide, a large amount of the paraffin is permeated since fats and oils contained in the brain tissue are removed by degreasing action of processes of dehydration, intermediate agent processing, and paraffin permeation, so that the cut surface 3903 has the frosted glass appearance. Therefore, when the cut surface 3903 shows the frosted glass appearance, it can be determined that a tissue section to be cut out has high adhesiveness to the microscope slide.

On the other hand, in the case of tissues of liver and kidney that are organs densely packed in cells and have low adhesiveness to the microscope slide, the amount of paraffin permeation is reduced, and thus the light scattering due to the roughness on the cut surface 3903 on which the paraffin is permeated is reduced. Therefore, in the case of the tissues of liver and kidney having a dominant part densely packed in cells and having low adhesiveness to the microscope slide, a part on the cutting surface 3903 that has the frosted glass appearance is reduced, and the cut surface 3903 has a glossy appearance.

If the lesion affects the amount of paraffin permeation into the tissue, the lesion affects the size of the part on the cut surface 3903 that has the frosted glass appearance. Therefore, even when there is a lesion, similar to the above description, the adhesiveness of the tissue section to be cut out to the microscope slide can be determined from the appearance of the cut surface 3903.

Therefore, the adhesiveness of the tissue section to be cut out to the microscope slide can be predicted by confirming the frosted glass appearance of the cut surface 3903. For example, in the observation of the tissue sections of organs such as skin, lung and heart that have a dominant frosted glass appearance on the cut surface 3903 and are predicted to have high adhesiveness to the microscopic slide, an untreated glass slide is used, and regarding organs that require the microscope slide to have the effect of preventing peeling, such as liver and kidney having a small part having the frosted glass appearance on the cut surface 3903, the glass slide 401 that is subjected to the reactive ion etching and is introduced with the unevenness on the front surface thereof can be used.

The confirmation of the frosted glass appearance of the cut surface 3903 can be performed on the microscope slide if the section cut out is placed on the microscope slide before the deparaffinization process. FIG. 35 is a diagram showing a state in which a section cut out from the sample block 3901 obtained by paraffin-embedding is placed on a glass slide 3907 and is not subjected to the deparaffinization process. A cut surface 3906 of the section cut out and attached is obtained by moving the cut surface 3903 onto the glass slide as the cut surface 3906 of the section. Thus, as in the case of the cut surface 3903, it is also possible to predict the adhesiveness of the tissue section to the microscope slide by confirming the frosted glass appearance of the cut surface 3906. The confirmation of the frosted glass appearance of the cut surface 3906 can also be performed at any stage before the extension and the drying are performed after a section having the cut surface 3906 is cut out and placed on a glass slide.

In particular, by confirming the frosted glass appearance of the cut surface 3906 while the tissue section is floating on the water on the glass slide, it is possible to re-float the section on the water surface after the confirmation and then attach the section to a microscope slide selected based on a result of the confirmation and subjected to an appropriate surface treatment. If the glass slide used to confirm the frosted glass appearance of the cut surface 3906 is not stained on the glass slide after the confirmation, an untreated glass slide can be used.

The frosted glass appearance of the cut surface 3903 can also be confirmed by observing a tissue section that is cut out and is still on the cutter 3902. FIG. 36 is a diagram showing an observation in a situation where the section cut out from the sample block 3901 obtained by paraffin-embedding is still on the cutter 3902. A cut surface 3908 of the section on the cutter 3902 is obtained by moving the cut surface 3903 onto the cutter 3902 by cutting. Thus, as in the case of the cut surface 3903, it is also possible to predict the adhesiveness of the tissue section to the microscope slide by confirming the frosted glass appearance of the cut surface 3908.

The frosted glass appearance of the cut surface 3903 can also be confirmed even in a state where the cut-out section is floating on the water surface. FIG. 37 is a diagram showing a state where the section cut out from the sample block 3901 obtained by paraffin-embedding is floating on a water surface 3909. A cut surface 3910 of the section floating on the water surface 3909 is obtained by moving the cut surface 3903 onto the water surface 3909 as the cut surface 3910 of the section. Thus, as in the case of the cut surface 3903, it is also possible to predict the adhesiveness of the tissue section to the microscope slide by confirming the frosted glass appearance of the cut surface 3910.

In particular, the confirmation of the frosted glass appearance of the cut surface 3903 shown in FIG. 34, the confirmation of the frosted glass appearance of the cut surface 3908 of the section on the cutter 3902 shown in FIG. 36 and the confirmation of the frosted glass appearance of the cut surface 3910 of the section floating on the water surface 3909 shown in FIG. 37 are useful because these allows the selection of a microscope slide subjected to an appropriate surface treatment before placing the section on the microscope slide.

A back surface of the cut surface 3906, the cut surface 3908 or the cut surface 3910 is also a cut surface of the paraffin-embedded biological sample obtained by the cutter 3902. Thus, the back surface can similarly be used to predict the adhesiveness of the tissue section to the microscope slide by confirming the frosted glass appearance.

Similar to the first embodiment and the fourth embodiment, in the present embodiment, it is also possible to apply the machine learning technique by acquiring image data, labeling the acquired image and creating training data. Similar to the first embodiment and the fourth embodiment, in the present embodiment, it is also possible to use the deep learning technique. The image data used for the machine learning in the present embodiment can be acquired as follows.

As shown in FIGS. 34 to 37, the image data used for the machine learning can be obtained by capturing the cut surface 3903, the cut surface 3906, the cut surface 3908, or the cut surface 3910 using a camera 3904 of the terminal 1821. At this time, the camera 3904 may capture an image with indoor light, and also may capture an image by using a light guide 3905 or the like to radiate light from a white LED or the like. The acquisition of image data is not limited to the camera 3904 of the terminal 1821, and for example, the image data can be acquired by an optical camera such as a CCD camera or a digital camera connected to a stereomicroscope.

Figure 38A:
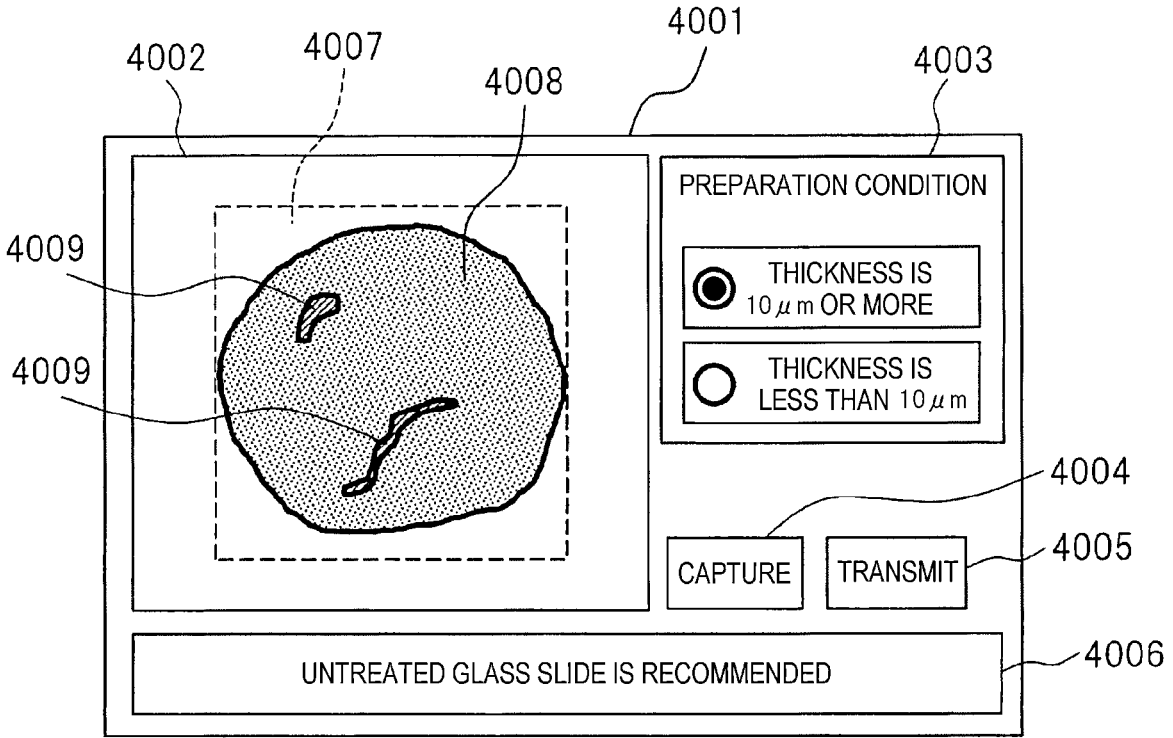
FIG. 38(a) and FIG. 38(b) show graphical user interfaces (GUIs) of an embodiment.
Figure 38B:
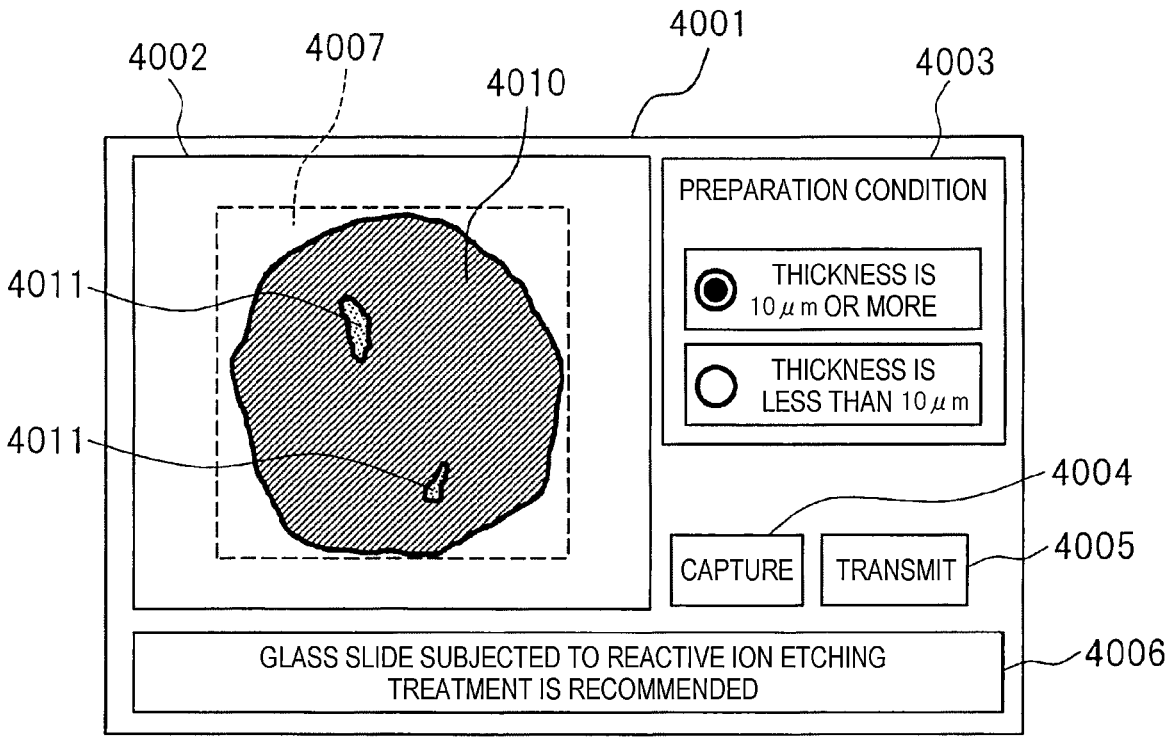

FIG. 38($a$) and FIG. 38($b$) show a GUI 4001 as an example of the GUI 1822 of the terminal 1821. FIG. 38($a$) is a diagram showing an example in which a region having the frosted glass appearance occupies most of the appearance of the cut surface 3903, the cut surface 3906, the cut surface 3908, or the cut surface 3910. FIG. 38($b$) is a diagram showing an example in which a region having the glossy appearance occupies most of the appearance of the cut surface 3903, the cut surface 3906, the cut surface 3908, or the cut surface 3910.

The GUI 4001 includes an image display region 4002 that displays an image of the cut surface 3903, the cut surface 3906, the cut surface 3908, or the cut surface 3910 captured by the camera 3904 of the terminal 1821, a condition receiving portion 4003 that receives input of preparation conditions to be transmitted to the second server 1815 that is an attachment condition estimation system, a capture button 4004 that executes the image capturing with the camera 3904, a transmit button 4005 that transmits the image data obtained by the image capturing, an identifier that indicates the image data of the cut surface of the biological sample, and the preparation conditions to the second server 1815, and a display portion 4006 that displays the output result of the learned model to be transmitted from the second server 1815.

The condition receiving portion 4003 receives, for example, conditions of the thickness of the section to be cut out. In FIG. 38($a$) and FIG. 38($b$), the condition of the thickness of the section to be cut out is selectable between 10 microns or more and less than 10 microns. In the case of the present embodiment, the microscope slide to be used is determined based on the appearance of the cut surface, and thus by setting the conditions of the thickness of the section that are not directly related to the appearance, and obtaining a learned model for the conditions of the thickness as described later, the output accuracy of the learned model can be improved.

The image display region 4002 is provided with a frame 4007 that is a target position in the image of the cut surface 3903, the cut surface 3906, the cut surface 3908, or the cut surface 3910. Therefore, conditions for the image capturing are prepared.

In an image 4008 of the cut surface of FIG. 38($a$) in which a region having the frosted glass appearance occupies a large part, a region 4009 having the glossy appearance occupies a small part. In an image 4010 of the cut surface of FIG. 38($b$) in which a region having the glossy appearance occupies a large part, a region 4011 having the frosted glass appearance occupies a small part.

In the case of capturing the cut surface 3903 in FIG. 34, in the region having the glossy appearance of the cut surface 3903, the color of the tissue due to blood remaining on the sample is visible. Therefore, in an image of the cut surface 3903 captured from above by the camera 3904, the region having the glossy appearance is captured with a darker color than the region having the frosted glass appearance.

In the case of capturing the cut surface 3906 in FIG. 35, in the region having the glossy appearance of the cut surface 3906, a color of a platform under the glass slide is visible. Therefore, by placing the glass slide on, for example, a mat black platform, in an image of the cut surface 3906 captured from above by the camera 3904, the region having the glossy appearance is captured darker than the region having the frosted glass appearance.

In the case of capturing the cut surface 3908 in FIG. 36, in the region having the glossy appearance of the cut surface 3908, a color of a cutter 3902 is visible. Therefore, in an image of the cut surface 3908 captured by the camera 3904 from above the cutter 3902, the region having the glossy appearance is captured with a darker color than the region having the frosted glass appearance. In the case of the cut surface 3908, since the frosted glass appearance and the glossy appearance can be determined by a difference in shades of the color depending on the degree to which the color of the cutter 3902 is visible, for example, even in a case of a sample having a light color such as a bloodless tissue prepared by regenerative medicine, it is possible to stably distinguish between the frosted glass appearance and the glossy appearance.

Here, the cutter 3902 includes a replaceable blade 3911 and a holder 3912 for the replaceable blade 3911. By making a color of an upper surface of the holder 3912 under the cut surface 3908 of the cutter 3902 mat black, the region having the glossy appearance is captured with a darker color than the region having the frosted glass appearance, and thus it is possible to stably distinguish between the frosted glass appearance and the glossy appearance.

In the case of capturing the cut surface 3910 in FIG. 37, in the region having the glossy appearance of the cut surface 3910, the water is visible. Therefore, for example, if a container filled with water is transparent, by placing the container on the mat black platform, in an image of the cut surface 3910 captured from above by the camera 3904, the region having the glossy appearance is captured darker than the region having the frosted glass appearance. Further, even when the bottom of the container filled with water is mat black, similarly, the region having the glossy appearance is captured darker than the region having the frosted glass appearance.

In the present embodiment as well, the database 3401 and the database 3403 of FIG. 20(*a*) and FIG. 20(*b*) can be used to create the training data used for the machine learning. In the present embodiment, instead of the microscope image of the stained section, the image data stored in the database 3401 and the database 3403 is image data for the appearance of the cut surface 3903, the cut surface 3906, the cut surface 3908, or the cut surface 3910. For example, the image data for the appearance of the cut surface 3908 can be input, and can be used as the training data that uses the surface treatment information on the microscope slide used for attaching the tissue section as an output.

Therefore, similar to the above-described fourth embodiment, the training data can be created by labeling the image data for the appearance of the cut surface 3903, the cut surface 3906, the cut surface 3908, or the cut surface 3910 with at least the information on the surface treatment 3402*b* of the microscope slide, and a learned model that outputs the recommended method for attaching the tissue section to the microscope slide, which includes at least the surface treatment information on the recommended microscope slide, can be generated regarding the input image data. Here, by using the information on the thickness 3404*d* to which the tissue section is cut out, creating the training data separately with each of the conditions of 10 microns or more and less than 10 microns for the thickness to which the section is cut out and performing the machine learning, and then generating a learned model for each of the conditions, the output accuracy of the learned model can be improved.

The present embodiment assumes that the output from the learned model includes two options of the recommendation of the untreated slide glass 201 and the recommendation of the slide glass 401 whose surface is etched with the reactive ions. Alternatively, similar to the fourth embodiment, the recommendation of the coating of aminosilane on the untreated glass slide can be added as an option.

Regarding the sample for which the image data of each cut surface is acquired, the surface treatment information on the microscope slide used for attachment in the training data may be the surface treatment information on the microscope slide actually used for microscopic observation of the tissue, and may be the surface treatment information on the microscope slide to be recommended that is given to the images of the cut surfaces by an expert.

The operations of the second server 1815 will be described with reference to the flowchart of FIG. 22. The second server 1815 is an attachment condition estimation system using the learned models generated according to the present embodiment.

In step S4201, the input and output receiving unit 4102 of the second server 1815 receives the image data of the appearance of the cut surface 3903, the cut surface 3906, the cut surface 3908 or the cut surface 3910 from the terminal 1821, the identifier that indicates the image data of the appearance of the cut surface 3903, the cut surface 3906, the cut surface 3908, or the cut surface 3910, and the preparation conditions received by the condition receiving portion 4003. Here, the identifier that indicates the image data of the appearance of the cut surface and the preparation conditions received by the condition receiving portion 4003 are used as the identification information for the selection of the learned model by the selector 4102. In the present embodiment, the preparation conditions are conditions of the thickness of the section described above.

Next, in step S4202, based on the identifier and the conditions received by the input and output receiving unit 4102 in step S4201, the selector 4102 selects the learned model learned with the corresponding training data, inputs the received image data to the selected learned model, and outputs the output from the learned model to the input and output receiving unit 4101.

In step S4203, the input and output receiving unit 4101 transmits the output from the learned model received from the selector 4102 in step S4202 to the terminal 1821. Based on the output from the learned model, a recommended method for attaching a section to a microscope slide is output to the display portion 4006 that displays the output result of the learned model as shown in FIG. 38(*a*) and FIG. 38(*b*). FIG. 38(*a*) shows an example of an output that the use of the untreated glass slide is recommended, and FIG. 38(*b*) shows an example of an output that the glass slide etched with the reactive ions is recommended.

When the recommended method for attaching a section to a microscope slide is displayed in the display portion 4006 that displays the output result of the learned model based on the output from the learned model, a method having higher probability in the output of the learned model by the use of the untreated glass slide 201 and the use of the glass slide 401 whose surface is etched with the reactive ions can be selected and displayed.

When it is desired to prevent the peeling of the tissue section more reliably, for example, when a probability of the use of the untreated glass slide 201 in the output from the learned model is 80% or more, a display recommending the use of the untreated glass slide 201 can be shown in the display portion 4006 that displays the output result of the learned model. In other cases, a display recommending the use of the glass slide 401 whose surface is etched with the reactive ions can be shown.

In a case of an intermediate appearance of the cut surface 4008 of FIG. 38(*a*) in which the frosted glass appearance occupies a large part and the cut surface 4010 of FIG. 38(*b*) in which the glossy appearance occupies a large part, for example, when there is the region 4009 having the more glossy appearance than the cut surface 4008 of FIG. 38(*a*) in which the frosted glass appearance occupies a large part or the region 4011 having the more frosted glass appearance than the cut surface 4010 of FIG. 38(*b*) in which the glossy appearance occupies a large part, the output of the recommended method for attaching the tissue section to the microscope slide, which includes at least the surface treatment information on the recommended microscope slide, can be obtained from the learned model by using the machine learning technique, and the attachment work of the tissue section by the user can be facilitated.

The learned model of the present embodiment can be applied to a section preparation apparatus such as the thin section sample preparation apparatus disclosed in PTL 3.

FIG. 39 shows a section preparation apparatus 4301 as an application example of the learned model of the present embodiment to the section preparation apparatus. The section preparation apparatus 4301 includes a sample block cutting unit 4302, a controller 4303, and a display device 4304.

The sample block cutting unit 4302 moves a sample block 4305 to a position C and cuts the sample block 4305 with a cutter 4306. A cut surface 4307 of a tissue section on the cutter 4306 is captured by a camera 4308 provided above the cutter 4306. At this time, the image capturing may be performed with the indoor light, and a light guide 4309 may illuminate the cut surface 4307 with light from a white LED or the like. Further, the sample block 4305 is moved to a position D so that an appearance of a cut surface 4310 of a biological sample can be captured by a camera 4311. At this time, the image capturing may be performed with the indoor light, and a light guide 4312 may illuminate the cut surface 4310 with light from a white LED or the like.

The controller 4303 controls the sample block cutting unit 4302, the camera 4308, and the camera 4311. The controller 4303 is connected to the second server 1815, which is an attachment condition estimation system using the learned model generated in the present embodiment, via the second network 1814, transmits image data of an appearance of the cut surface 4307 or the cut surface 4310 of the biological sample from the camera 4308 or the camera 4311 to the server 1815 instead of the terminal 1821 described above, and displays an output result of the learned model from the second server 1815 on the display device 4304. As described above, the section preparation apparatus 4301 displays the microscope slide recommended by the learned model, and thus it is possible to assist a user of the section preparation apparatus selecting a microscope slide.

As a modification of the present embodiment, by creating training data separately for the cut surface 3903, the cut surface 3906, the cut surface 3908, and the cut surface 3910 and performing the machine learning, and generating a learned model for each cut surface, the output accuracy of the learned model can be improved. In such a case, in step S4201, identification information is set to be transmitted from the terminal 1821 or the controller 4303 to the second server 1815, so that each learned model is selected by the selector 4102 in step S4202. The identification information identifies a case where the image data of the appearance of the cut surface 3903 is transmitted, a case where the image data of the appearance of the cut surface 3906 is transmitted, a case where the image data of the appearance of the cut surface 3908 is transmitted, and a case where the image data of the appearance of the cut surface 3910 is transmitted.

In the present embodiment as well, similar to the fourth embodiment, the second server 1815 can be accessed from the controller 4303 or the terminal 1821, and the data can be stored in the database 3401 and the database 3403. At this time, the image data stored in association with the identification information 3402*a* on the images is image data of the appearance of the cut surface 3903, the cut surface 3906, the cut surface 3908, or the cut surface 3910. The information on the surface treatment 3402*b* of the microscope slide can be surface treatment information on the microscope slide by which the tissue section can be actually and successfully attached, or surface treatment information on the microscope slide recommended by an expert.

As described above, the controller 4303 obtains the output result of the learned model from the connected second server 1815. Alternatively, the controller 4303 can also obtain the output of the learned model without connecting to the server 1815 by including the learned model. In the present embodiment, the light is radiated by using the light guide 4309 and the light guide 4312, and a light source itself such as the white LED can also be placed at the position of each light guide.

Further, in the present embodiment, an example is shown in which the position of the cutter 4306 is fixed and the sample block 4305 moves. Alternatively, in a case of a device configuration in which the sample block 4305 is fixed and the cutter 4306 moves to cut the sample block, a camera provided above the sample block 4305 can capture both the cut surface of the sample block 4305 and the cut surface on the cutter.

According to the above description, the machine learning technique is used. Alternatively, for example, since in the case of the section preparation apparatus 4301, conditions for radiating the cut surface with light and the position of the camera can be stabilized, for example, based on ratios of the areas of the region having the frosted glass appearance and the region having the glossy appearance in the cut surface from the image obtained by the camera, it is also possible for the controller 4303 to display the recommended microscope slide on the display device 4304 by rule-based programming.

For example, when the ratio of the area of the region having the frosted glass appearance in the cut surface is equal to or greater than a preset threshold value, the untreated slide glass 201 is displayed on the display device 4304 as the recommended information by the controller 4303, whereas when the ratio of the area is less than the threshold value, the glass slide 401 whose surface is etched with the reactive ions can be displayed on the display device 4304 as the recommended information by the controller 4303. At this time, it is also possible to obtain the ratios of the areas of the region having the frosted glass appearance and the region having the glossy appearance by using a result obtained by detecting at least one of the region having the frosted glass appearance and the region having the glossy appearance by the machine learning technique, for example, the image segmentation technique.

As described above, the invention made by the inventor is specifically described based on the embodiments, and the invention is not limited to the embodiments described above. It goes without saying that various modifications can be made without departing from the scope of the invention.

REFERENCE SIGN LIST 201 glass slide
202 frosted portion
301 RIE apparatus
302 chamber
303a upper electrode
303b lower electrode
401 glass slide
402 frosted portion
403 front surface
501 paraffin
502 tissue section
701 glass slide
702 frosted portion
703-1 alignment marker
703-2 alignment marker
801 mask member
901 glass slide
903a region
903b region
904 boundary
1001 water surface
1002 tissue section
1003 arrow
1005 arrow
1101 paraffin
1701 substrate
1702 ITO layer
1703 substrate
1704 silicon nitride layer
1705 silicon nitride layer
1801 observation system
1802 SEM
1803 CLM
1804 FOM
1805 first server
1806 interface
1807 first network
1808 XY stage
1809 stage controller
1810 central processing unit
1811 memory
1812 storage
1813 bus
1814 second network
1815 second server
1816 interface
1817 computing device
1818 memory
1819 storage
1820 bus
1821 terminal
1822 GUI
2001 glass slide
2002 frosted portion
2003-1 alignment marker
2003-2 alignment marker
2003-3 alignment marker
2003-4 alignment marker
2101 mask member
2201 glass slide
2202a frosted portion
2202b frosted portion
2203a region
2203b region
2204 boundary
2301 tissue section
3001 microscope slide
3101 schematic diagram
3102a to i convex portion
3103 groove
3105 thickness
3201 glass wafer
3202 scribe line
3203 chip
3204 frosted portion
3205 mark
3301 table
3401 database
3402a identification information
3402b surface treatment
3402c heating
3402d staining method
3402e microscope
3402f path information
3403 database
3404a species
3404b organ
3404c fixing strength
3404d thickness
3404e comment
3501 schematic diagram
3502 training data
3503 learned model
3504 image
3505 surface treatment information
3601 glass slide
3602 frosted portion
3603-1 alignment marker
3603-2 alignment marker
3603-3 alignment marker
3603-4 alignment marker
3603-5 alignment marker
3603-6 alignment marker
3604-1 mark
3604-2 mark
3605 grid
3606 fraction
3607 information
3608 information
3609 glass slide
3610-1 alignment marker
3610-2 alignment marker
3610-3 alignment marker
3610-4 alignment marker
3610-5 alignment marker
3610-6 alignment marker
3701 position
3702 cavity
3703 position
3704 position
3801a alignment mark
3801b alignment mark 3802 outer circumference
3803 inner circumference
3804 outer circumference
3805 position
3806 position
3901 sample block
3902 cutter
3903 cut surface
3904 camera
3905 light guide
3906 cut surface
3907 glass slide
3908 cut surface
3909 water surface
3910 cut surface
3911 replaceable blade
3912 holder
4001 GUI
4002 image display region
4003 condition receiving portion
4004 capture button
4005 transmit button
4006 display portion
4007 frame
4008 cut surface
4009 region
4010 cut surface
4011 region
4101 input and output receiving unit
4102 selector
4103 first learning model
4104 second learning model
4105 third learning model
4106 fourth learning model
4107 input and output receiving unit
4108 user interface unit
4109 image capturing unit
4301 section preparation apparatus
4302 sample block cutting unit
4303 controller
4304 display device
4305 sample block
4306 cutter
4307 cut surface
4308 camera
4309 light guide
4310 cut surface
4311 camera
4312 light guide
4401 GUI
4402 image display region
4403 condition receiving portion
4404 capture button
4405 transmit button
4406 display portion
4407 GUI
4408 input portion
4409 input portion
4410 condition receiving portion
4411 transmit button
4412 display portion

The invention claimed is:

1. An attachment method comprising:
changing an attachment condition for attaching a tissue section to a microscope slide depending on an organ from which the tissue section is derived, wherein the attachment condition is changed based on data registered in a database in association with at least one of an image of the tissue section and information on the organ from which the tissue section is derived, and surface treatment information on the microscope slide, and the attachment condition comprises at least one of: i) selecting the type of surface treatment of the microscope slide prior to attachment, ii) adjusting processing parameters configured to prepare the microscope slide prior to attachment, or iii) modifying extension or heating conditions during attachment of the tissue section to the microscope slide, wherein a microscope slide used for attaching the tissue section is selected, prior to the step of changing the attachment condition, based on an output of a learned model learned with training data, the training data using the image of the tissue section as an input and using data that includes at least surface treatment information on the microscope slide used for attaching the tissue section as an output.

2. The attachment method according to claim 1, wherein the attachment condition is a condition for changing surface roughness formed on a front surface of the microscope slide prepared prior to attachment of the tissue section.

3. The attachment method according to claim 2, wherein the attachment condition is a condition for changing the unevenness depending on stretchability of the organ to be attached.

4. The attachment method according to claim 2, wherein the unevenness is formed by dry-etching the front surface of the prepared microscope slide with reactive ions.

5. The attachment method according to claim 4, wherein the microscope slide on which the unevenness is formed is coated with a silane coupling agent or a polymer having an amino group after the dry-etching.

6. The attachment method according to claim 1, wherein the organ is derived from induced pluripotent stem cells.

7. An attachment method comprising:
changing an attachment condition for attaching a tissue section to a microscope slide depending on an organ from which the tissue section is derived, wherein the attachment condition is changed based on data registered in a database in association with at least one of an image of the tissue section and information on the organ from which the tissue section is derived, and surface treatment information on the microscope slide, and the attachment condition comprises at least one of: i) selecting the type of surface treatment of the microscope slide prior to attachment, ii) adjusting processing parameters configured to prepare the microscope slide prior to attachment, or iii) modifying extension or heating conditions during attachment of the tissue section to the microscope slide, wherein a microscope slide used for attaching the tissue section is selected, prior to the step of changing the attachment condition, based on an output of a learned model learned with training data, the training data using the information on the organ from which the tissue section is derived as an input, and using data that includes at least surface treatment information on the microscope slide used for attaching the tissue section as an output.

8. An attachment method comprising:

changing an attachment condition for attaching a tissue section to a microscope slide depending on an organ from which the tissue section is derived, wherein the attachment condition is changed based on data registered in a database in association with at least one of an image of the tissue section and information on the organ from which the tissue section is derived, and surface treatment information on the microscope slide, and the attachment condition comprises at least one of: i) selecting the type of surface treatment of the microscope slide prior to attachment, ii) adjusting processing parameters configured to prepare the microscope slide prior to attachment, or iii) modifying extension or heating conditions during attachment of the tissue section to the microscope slide, wherein the attachment condition is changed based on data registered in a database in association with an image of a cut surface of a paraffin-embedded sample and surface treatment information on the microscope slide.

9. The attachment method according to claim 8, wherein a microscope slide used for attaching the tissue section is selected, prior to the step of changing the attachment condition, based on an output of a learned model learned with training data, the training data using the image of the cut surface of the paraffin-embedded sample as an input, and using data that includes at least surface treatment information on the microscope slide used for attaching the tissue section as an output.

10. The attachment method according to claim 8, wherein the image of the cut surface is an image captured from above a sample block of the sample or above a cutter that cuts the sample block.

*    *    *    *    *